United States Patent
Mohammad et al.

(10) Patent No.: US 9,497,544 B2
(45) Date of Patent: Nov. 15, 2016

(54) SYSTEMS AND METHODS FOR SURROUND SOUND ECHO REDUCTION

(71) Applicant: QUALCOMM Incorporated, San Diego, CA (US)

(72) Inventors: Asif I. Mohammad, San Diego, CA (US); Lae-Hoon Kim, San Diego, CA (US); Erik Visser, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 345 days.

(21) Appl. No.: 13/933,005

(22) Filed: Jul. 1, 2013

(65) Prior Publication Data
US 2014/0003611 A1    Jan. 2, 2014

Related U.S. Application Data

(60) Provisional application No. 61/739,662, filed on Dec. 19, 2012, provisional application No. 61/681,474, filed on Aug. 9, 2012, provisional application No. 61/667,249, filed on Jul. 2, 2012.

(51) Int. Cl.
*H04B 3/20* (2006.01)
*H04R 3/00* (2006.01)
(Continued)

(52) U.S. Cl.
CPC .............. *H04R 3/005* (2013.01); *H04B 3/20* (2013.01); *G10L 2021/02082* (2013.01); *H04R 2430/23* (2013.01)

(58) Field of Classification Search
CPC .... H04R 3/02; H04R 3/005; H04R 2430/23; H04R 2499/13; H04S 7/305; H04S 7/301; H04S 7/302; H04S 7/30; H04S 5/005; G10L 2021/02082; G10L 19/008

USPC .......... 381/17, 66, 94.3, 92, 93, 71.1, 71.14; 379/406.01, 406.08, 406.14; 455/561; 375/260
See application file for complete search history.

(56) References Cited

U.S. PATENT DOCUMENTS 7,747,001 B2   6/2010   Kellermann et al.
7,881,460 B2   2/2011   Looney et al.
(Continued)

FOREIGN PATENT DOCUMENTS

EP     2393313 A2      12/2011
JP     2009260699 A    11/2009
WO    WO-2012046256 A2  4/2012

OTHER PUBLICATIONS

Kellermann W: "Strategies for combining acoustic echo cancellation and adaptive beamforming microphone arrays", IEEE International Conference on Acoustics, Speech, and Signal Processing, 1997. ICASSP—97, Munich, Germany Apr. 21-24, 1997, Los Alamitos, CA, USA,IEEE Comput. Soc; US, US, vol. 1,Apr. 21, 1997, pp. 219-222, XP010226174.*

(Continued)

*Primary Examiner* — Vivian Chin
*Assistant Examiner* — Ammar Hamid
(74) *Attorney, Agent, or Firm* — Austin Rapp & Hardman

(57) ABSTRACT

A method for echo reduction by an electronic device is described. The method includes nulling at least one speaker. The method also includes mixing a set of runtime audio signals based on a set of acoustic paths to determine a reference signal. The method also includes receiving at least one composite audio signal that is based on the set of runtime audio signals. The method further includes reducing echo in the at least one composite audio signal based on the reference signal.

64 Claims, 62 Drawing Sheets

(51) Int. Cl.
*H04B 15/00* (2006.01)
*G10L 21/0208* (2013.01)

(56) References Cited

U.S. PATENT DOCUMENTS

| | | | |
|---|---|---|---|
| 8,050,717 B2 | 11/2011 | Sugiyama | |
| 8,170,226 B2 | 5/2012 | Prakash et al. | |
| 8,218,757 B2 | 7/2012 | Takada | |
| 8,275,148 B2 | 9/2012 | Li et al. | |
| 8,385,557 B2 | 2/2013 | Tashev et al. | |
| 8,391,472 B2 | 3/2013 | Ghani et al. | |
| 8,879,747 B2 | 11/2014 | Christoph | |
| 2005/0254662 A1 | 11/2005 | Blank et al. | |
| 2008/0192946 A1 | 8/2008 | Faller | |
| 2009/0252343 A1 | 10/2009 | Mao | |
| 2009/0316923 A1* | 12/2009 | Tashev | H04M 9/082 381/66 |
| 2010/0183163 A1 | 7/2010 | Matsui et al. | |
| 2011/0178798 A1 | 7/2011 | Flaks et al. | |
| 2012/0030485 A1 | 2/2012 | Kawano | |
| 2012/0063609 A1 | 3/2012 | Triki et al. | |
| 2012/0201396 A1 | 8/2012 | Schmidt et al. | |
| 2012/0243698 A1 | 9/2012 | Elko et al. | |
| 2013/0272097 A1 | 10/2013 | Kim et al. | |
| 2013/0272538 A1 | 10/2013 | Kim et al. | |
| 2013/0272539 A1 | 10/2013 | Kim et al. | |
| 2013/0300648 A1 | 11/2013 | Kim et al. | |
| 2013/0301837 A1 | 11/2013 | Kim et al. | |
| 2013/0304476 A1 | 11/2013 | Kim et al. | |
| 2014/0003635 A1 | 1/2014 | Mohammad et al. | |

OTHER PUBLICATIONS

Eneman K., "Subband and Frequency-Domain Adaptive Filtering techniques for Speech Enhancement in Hands-Free Communication," Katholieke Universiteit Leuven, Heverlee, Belgium, Mar. 2002, 323 Pages.

Friedlander B. et al., "Performance analysis of a null-steering algorithm based on direction-of-arrival estimation", IEEE Transactions on Acoustics, Speech and Signal Processing, Apr. 1, 1989, vol. 37, No. 4, IEEE Inc. New York, USA, pp. 461-466, XP011477921, ISSN: 0096-3518, DOI: 10.1109/29.17526.

International Search Report and Written Opinion—PCT/US2013/049055—ISA/EPO—Sep. 17, 2013.

Kellermann, W., "Strategies for Combining Acoustic Echo Cancellation and Adaptive Beamforming Microphone Arrays," IEEE International Conference on Acoustics, Speech, and Signal Processing, ICASSP—97., vol. 1, pp. 219-222, Apr. 1997.

Reed, et al., "Time Delay Estimation Using the LMS Adaptive Filter—Static Behavior," IEEE Transactions on Acoustics, Speech, and Signal Processing, vol. ASSP-29, No. 3, Jun. 1981, pp. 561-571.

Riva., et al., "Efficient Interferer Cancelation Based on Geometrical Information of the Reverberant Environment," European Signal Processing Conference, 2008, 5 Pages.

* cited by examiner

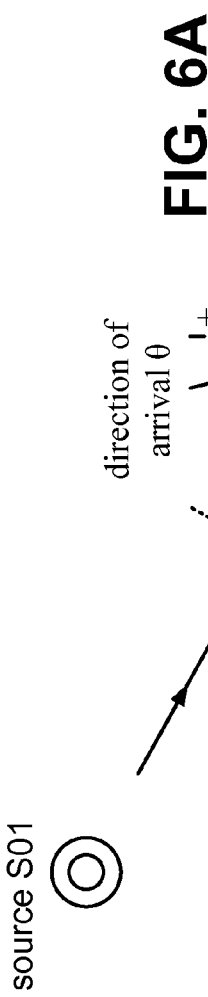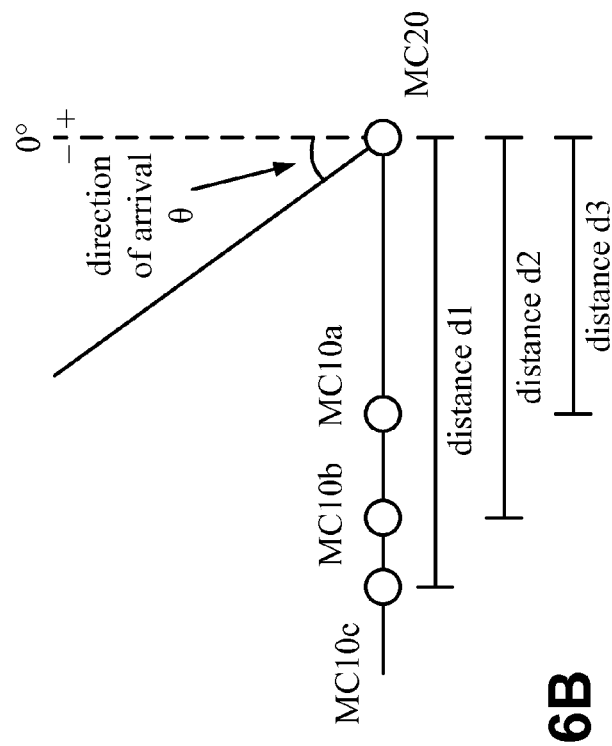
FIG. 6A
FIG. 6B

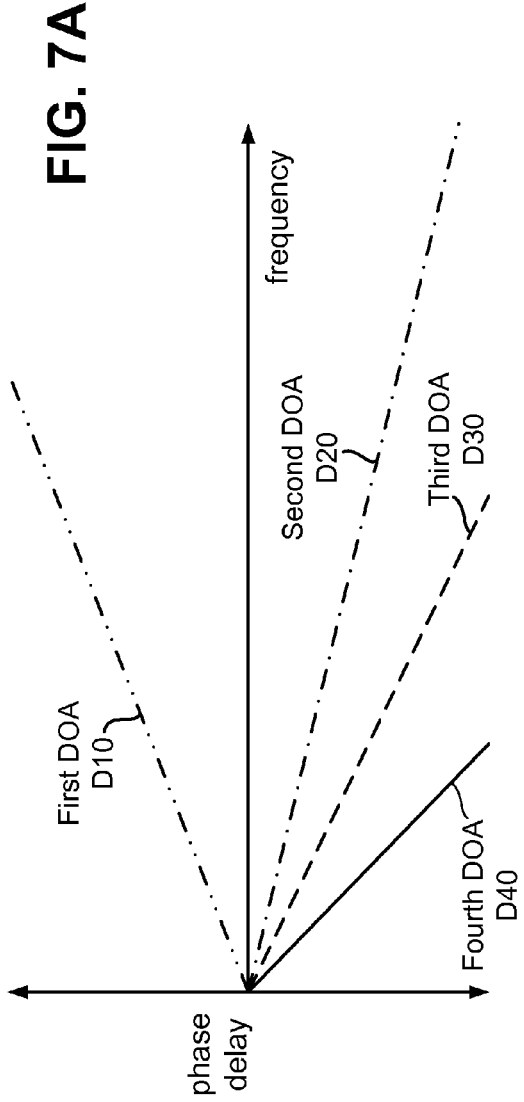
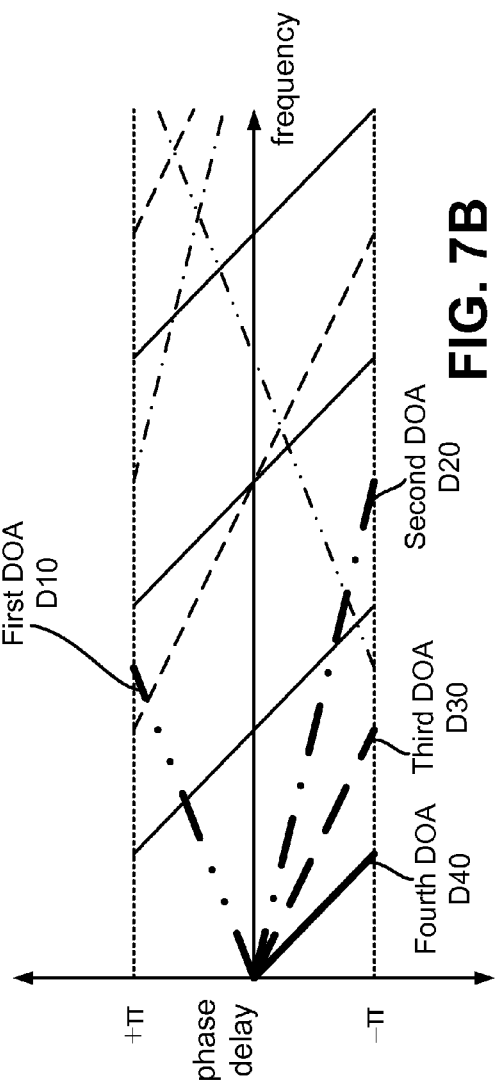

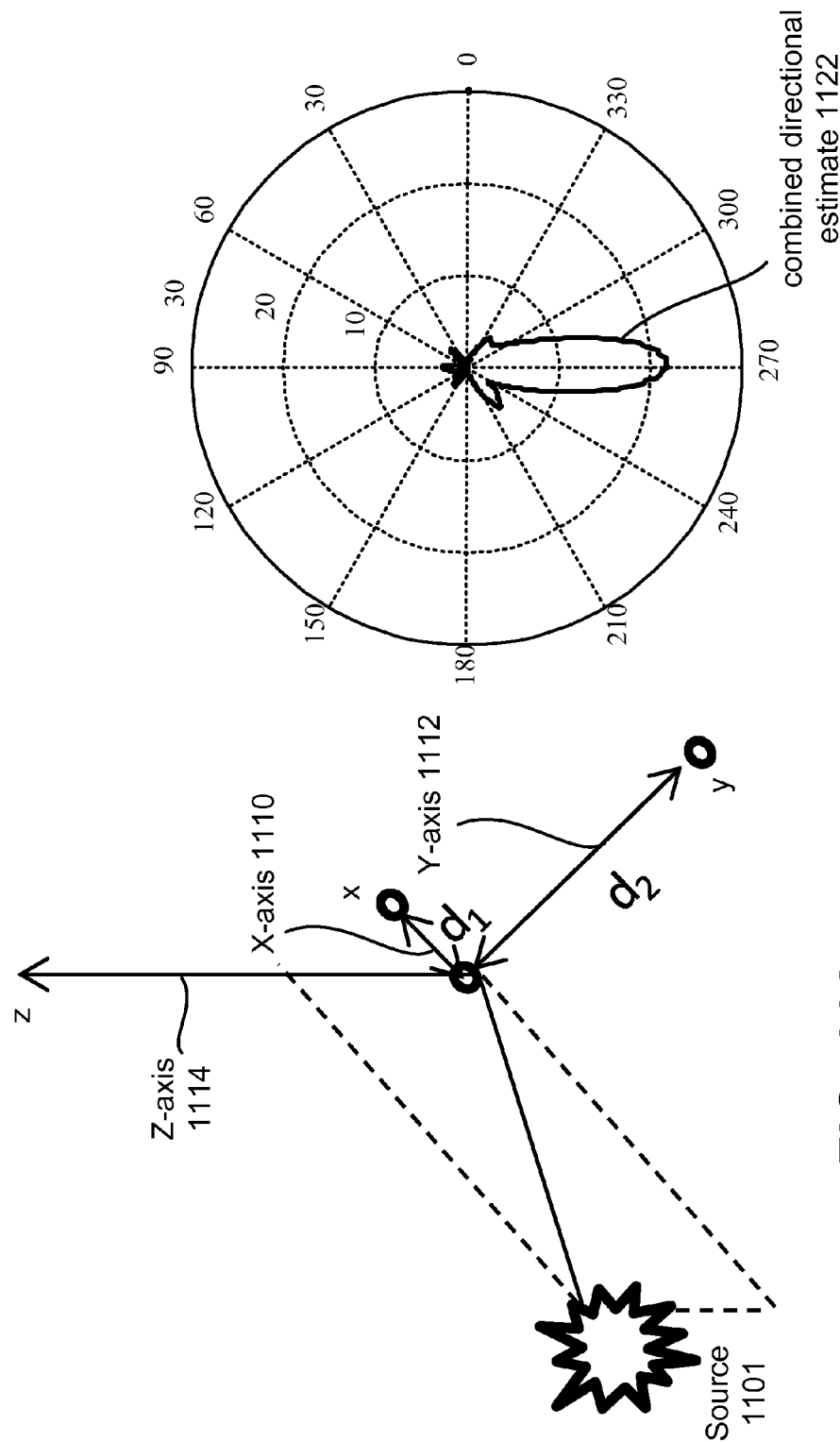

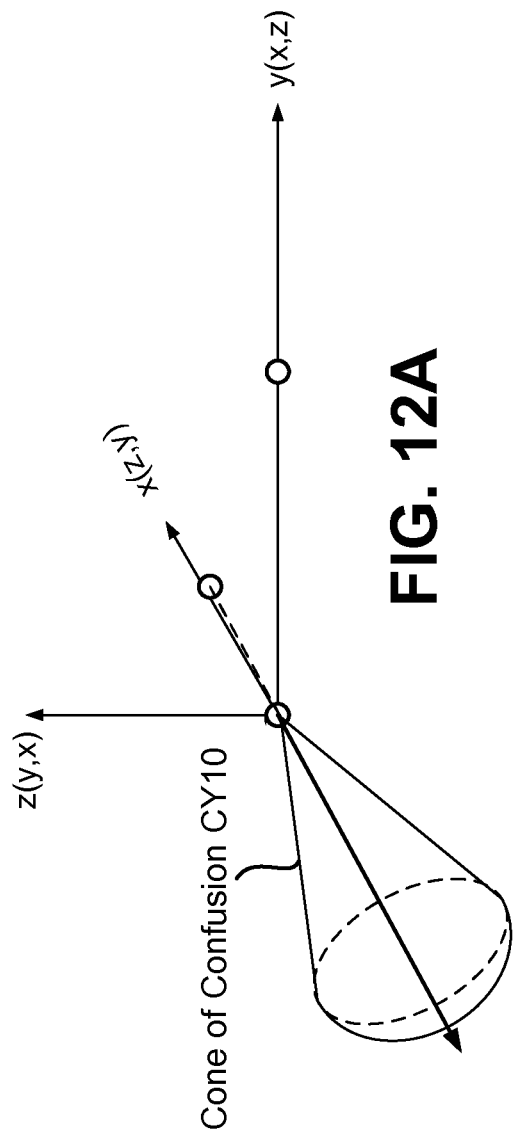
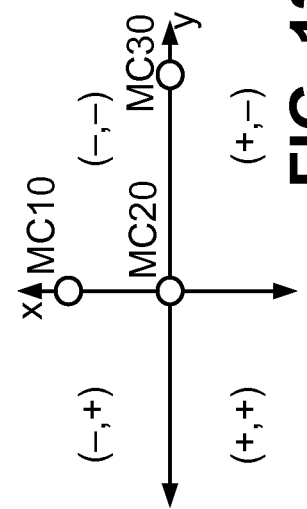
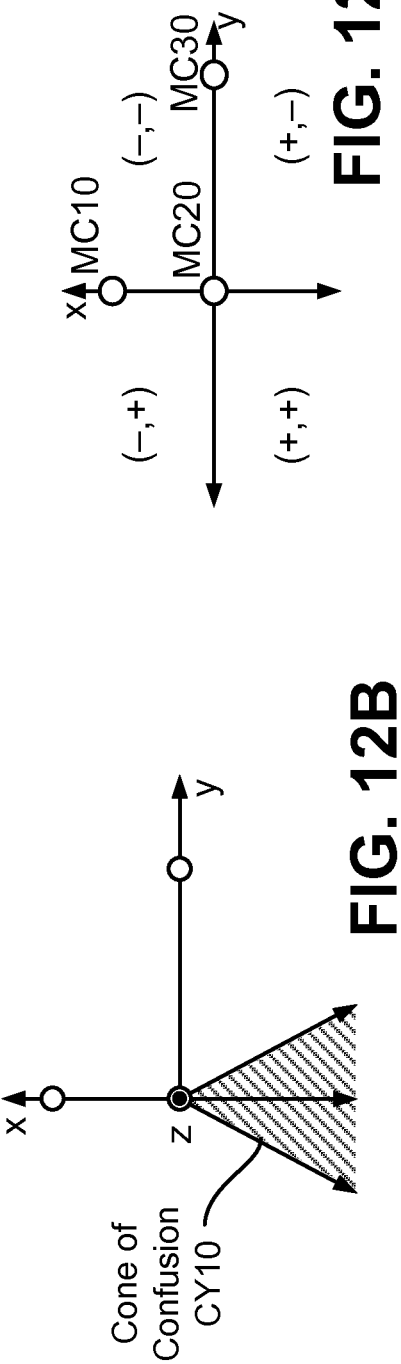
FIG. 12A
FIG. 12B
FIG. 12C

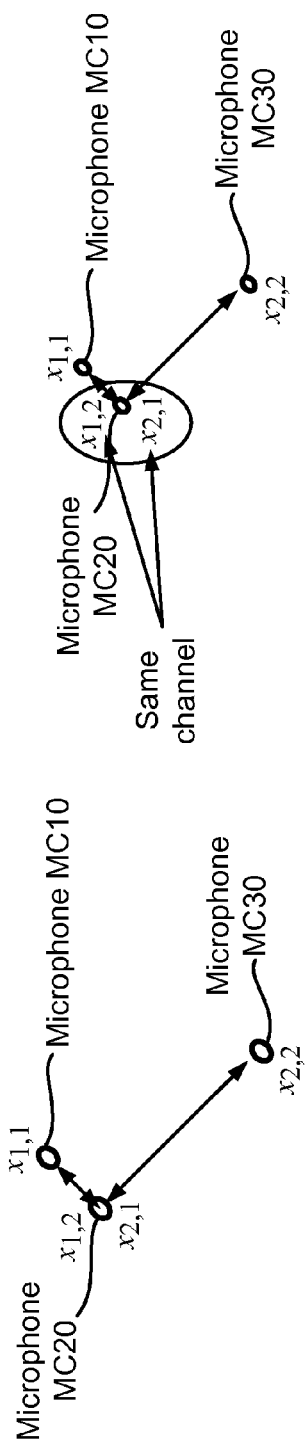

$$\underbrace{\begin{bmatrix} d_{1,1}^1 & \cdots & d_{1,1}^N \\ d_{1,2}^1 & \cdots & d_{1,2}^N \\ d_{2,1}^1 & \cdots & d_{2,1}^N \\ d_{2,2}^1 & \cdots & d_{2,2}^N \\ \vdots & \ddots & \vdots \\ d_{M,1}^1 & \cdots & d_{M,1}^N \\ d_{M,2}^1 & \cdots & d_{M,2}^N \end{bmatrix}}_{\text{steering vector per pair}} \left( \begin{bmatrix} d_{1,1}^1 & \cdots & d_{1,1}^N \\ d_{1,2}^1 & \cdots & d_{1,2}^N \\ d_{2,1}^1 & \cdots & d_{2,1}^N \\ d_{2,2}^1 & \cdots & d_{2,2}^N \\ \vdots & \ddots & \vdots \\ d_{M,1}^1 & \cdots & d_{M,1}^N \\ d_{M,2}^1 & \cdots & d_{M,2}^N \end{bmatrix}^H \begin{bmatrix} d_{1,1}^1 & \cdots & d_{1,1}^N \\ d_{1,2}^1 & \cdots & d_{1,2}^N \\ d_{2,1}^1 & \cdots & d_{2,1}^N \\ d_{2,2}^1 & \cdots & d_{2,2}^N \\ \vdots & \ddots & \vdots \\ d_{M,1}^1 & \cdots & d_{M,1}^N \\ d_{M,2}^1 & \cdots & d_{M,2}^N \end{bmatrix} + \lambda \cdot I \right)^{-1} \underbrace{\begin{bmatrix} x_{1,1} \\ x_{1,2} \\ x_{2,1} \\ x_{2,2} \\ \cdots \\ x_{M,1} \\ x_{M,2} \end{bmatrix}}_{\text{Beamformer BF10}} = \begin{bmatrix} y_1 \\ y_2 \\ y_3 \end{bmatrix}$$

Target source number 1,2, ..., N, where N (number of sources) ≤ M (number of pairs)

steering vector per pair pair number
mic number

FIG. 16A

$$\text{Steering Vector SV10a} \left\{ (d^1_{1,1}, d^1_{1,2}) = \left( \exp\left( -\frac{j2\pi f \ 0.073 \ \sin(\theta_1)}{c} \right), 1 \right) \right.$$

$$\text{Steering Vector SV10b} \left\{ (d^1_{2,1}, d^1_{2,2}) = \left( \exp\left( -\frac{j2\pi f \ 0.036 \ \sin(\theta_2)}{c} \right), 1 \right) \right.$$

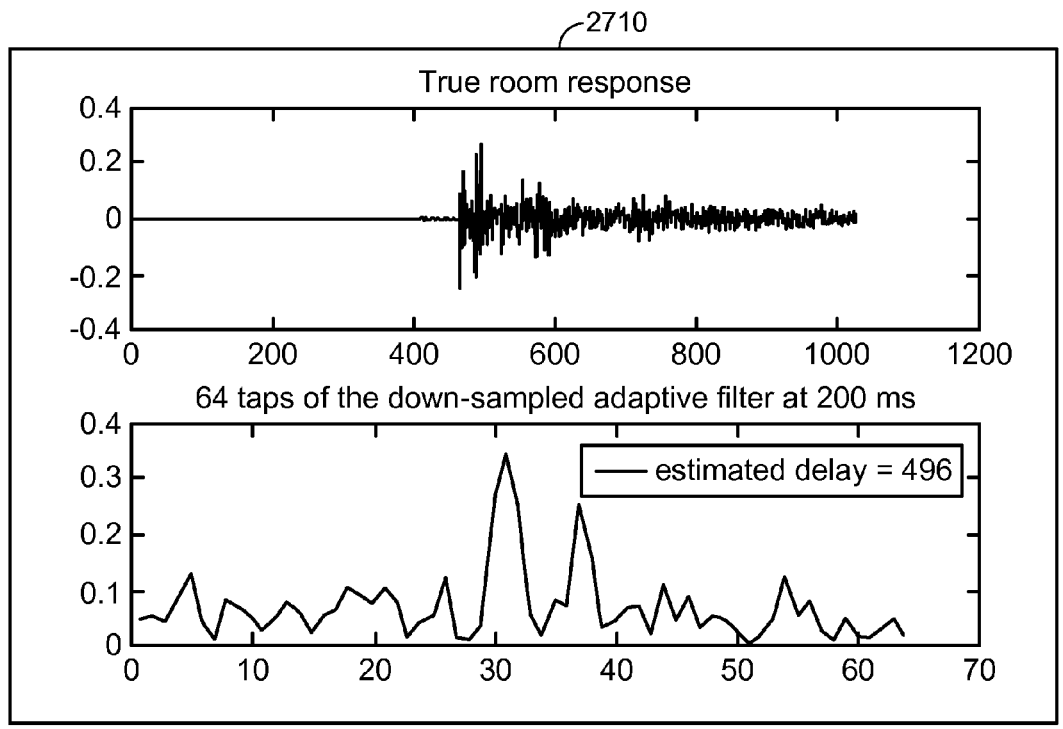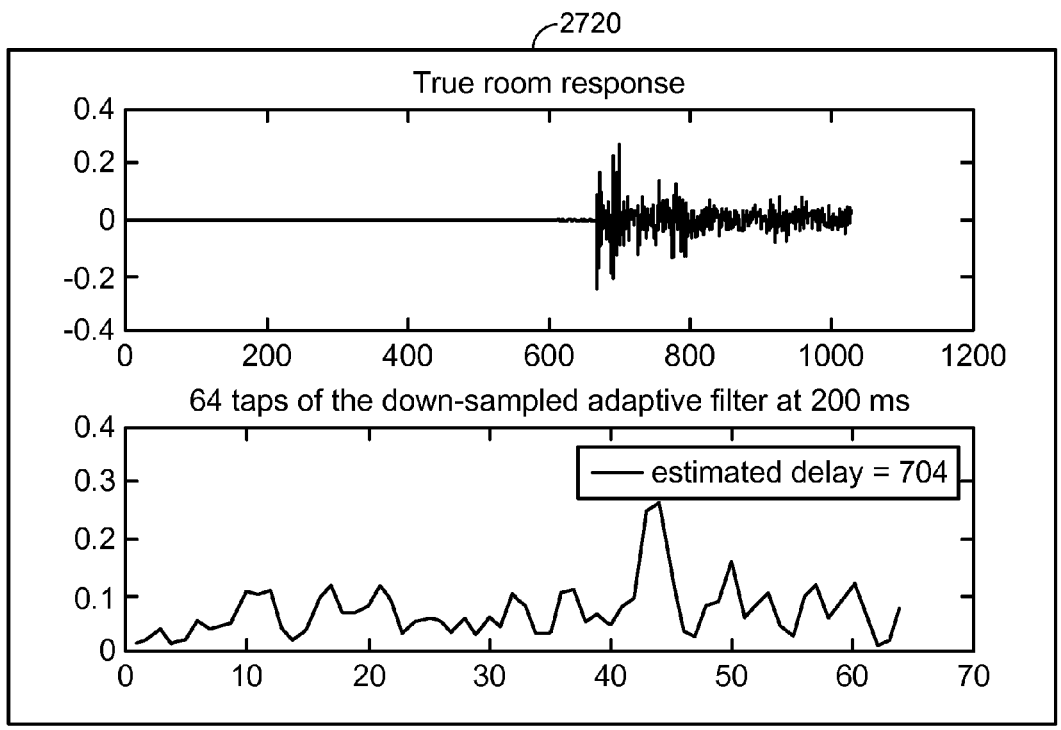
FIG. 27

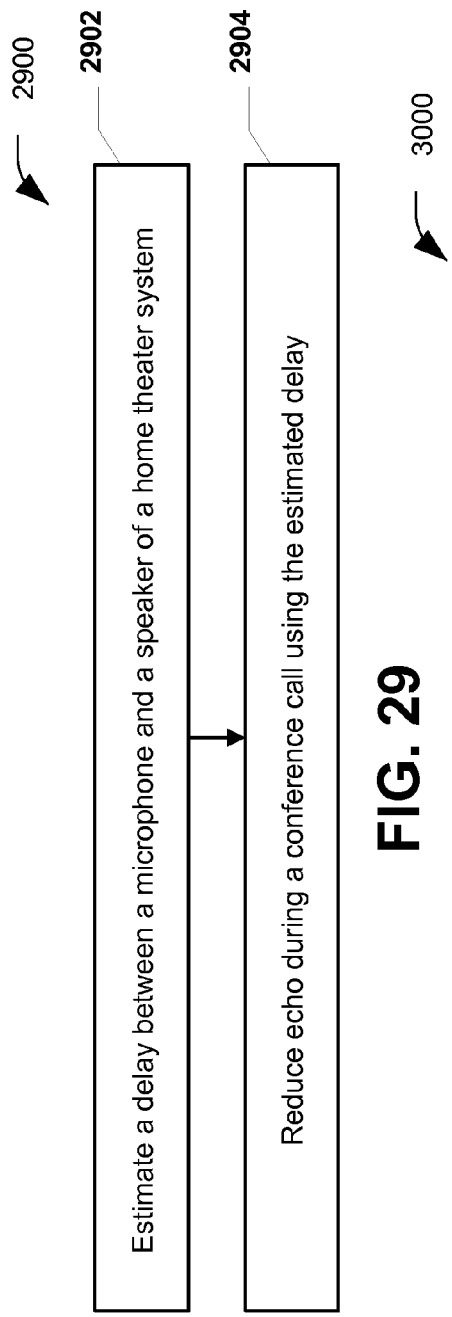
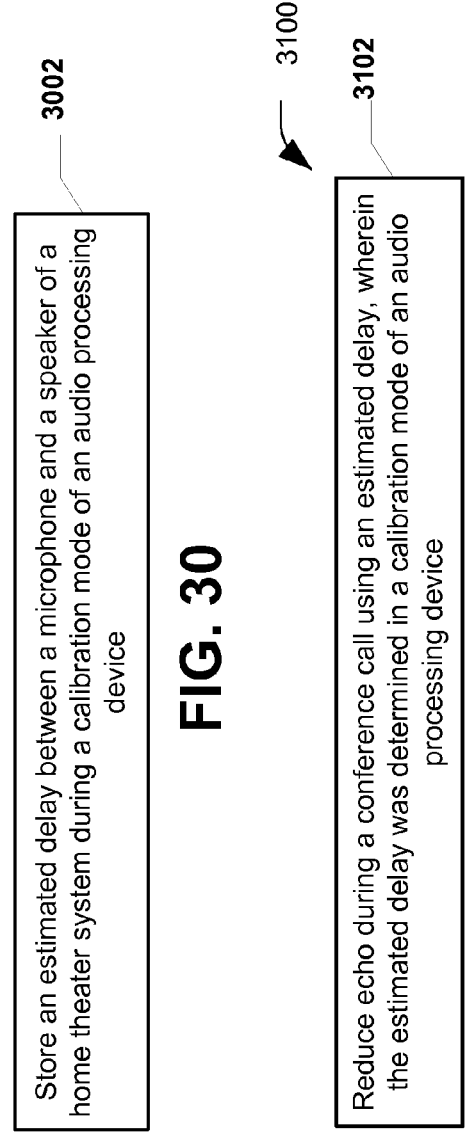
FIG. 29
FIG. 30
FIG. 31

SYSTEMS AND METHODS FOR SURROUND SOUND ECHO REDUCTION

RELATED APPLICATIONS

This application is related to and claims priority to U.S. Provisional Patent Application Ser. No. 61/739,662 filed Dec. 19, 2012, for "SYSTEMS AND METHODS FOR ECHO REDUCTION," to U.S. Provisional Patent Application Ser. No. 61/681,474 filed Aug. 9, 2012, for "AUDIO SIGNAL PROCESSING DEVICE CALIBRATION" and to U.S. Provisional Patent Application Ser. No. 61/667,249 filed Jul. 2, 2012, for "AUDIO SIGNAL PROCESSING DEVICE CALIBRATION."

TECHNICAL FIELD

The present disclosure relates generally to electronic devices. More specifically, the present disclosure relates to systems and methods for surround sound echo reduction.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform new functions and/or that perform functions faster, more efficiently or with higher quality are often sought after.

Some electronic devices (e.g., cellular phones, smart phones, computers, televisions, audio receivers, etc.) process audio signals. For example, a surround sound system may output multiple audio signals from multiple speakers.

While processing multiple audio signals may be beneficial, it poses certain problems. For example, audio signals from multiple speakers may generate an echo. As can be observed from this discussion, systems and methods that improve audio signal processing may be beneficial.

SUMMARY

A method for echo reduction by an electronic device is described. The method includes nulling at least one speaker. The method also includes mixing a set of runtime audio signals based on a set of acoustic paths to determine a reference signal. The method also includes receiving at least one composite audio signal that is based on the set of runtime audio signals. The method further includes reducing echo in the at least one composite audio signal based on the reference signal.

The method may include outputting a set of output calibration audio signals. The method may also include receiving a set of input calibration audio signals based on the set of output calibration audio signals. The method may further include determining the set of acoustic paths based on the set of input calibration audio signals. Each of the set of output calibration audio signals may be output individually in an output sequence. Each of the set of input calibration audio signals may be received individually in an input sequence.

At least one composite audio signal may be received by two or more microphones in a wireless communication device. Mixing the set of runtime audio signals and reducing the echo may be performed by an audio processing device.

The method may include applying a first acoustic path to multiple runtime audio signals. At least one composite audio signal may be received by two or more microphones in a wireless communication device. A mixed-down source per each microphone may be communicated. Enhanced speech with echo cancellation/noise suppression may be communicated.

The method may include determining coefficients for a set of filters that filter speaker audio signals. At least two filters may share coefficients. Coefficients from a first filter may be utilized as coefficients for a second filter. At least one filter may be configured to only change an amplitude and delay of an input signal. At least one filter may be based on an impulse response. The method may include determining whether to recalibrate based on an adaptive filter.

An electronic device for echo reduction is described. The electronic device includes nulling circuitry that nulls at least one speaker. The electronic device also includes mixing circuitry that mixes a set of runtime audio signals based on a set of acoustic paths to determine a reference signal. The electronic device also includes two or more microphones that receive at least one composite audio signal that is based on the set of runtime audio signals. The electronic device further includes echo reduction circuitry that reduces echo in the at least one composite audio signal based on the reference signal.

An apparatus for echo reduction is described. The apparatus includes means for nulling at least one speaker. The apparatus also includes means for mixing a set of runtime audio signals based on a set of acoustic paths to determine a reference signal. The apparatus also includes means for receiving at least one composite audio signal that is based on the set of runtime audio signals. The apparatus further includes means for reducing echo in the at least one composite audio signal based on the reference signal.

A computer-program product for echo reduction is described. The computer-program product includes a non-transitory tangible computer-readable medium with instructions. The instructions include code for causing an electronic device to null at least one speaker. The instructions also include code for causing an electronic device to mix a set of runtime audio signals based on a set of acoustic paths to determine a reference signal. The instructions also include code for causing the electronic device to receive at least one composite audio signal that is based on the set of runtime audio signals. The instructions further include code for causing the electronic device to reduce echo in the at least one composite audio signal based on the reference signal.

A method for determining a delay by an electronic device is described. The method includes performing calibration for surround sound echo reduction. The method also includes determining an inter-loudspeaker delay based on the calibration. The method further includes nulling at least one speaker based on the inter-loudspeaker delay.

The inter-loudspeaker delay may be a difference between a time of arrival of a speaker audio signal and a time of arrival of a reference speaker audio signal. The reference speaker audio signal may correspond to a speaker with a shortest delay. The method may include mixing at least two signals based on the inter-loudspeaker delay.

An electronic device for determining a delay is described. The electronic device includes calibration circuitry that performs calibration for surround sound echo reduction and determines an inter-loudspeaker delay based on the calibration. The electronic device also includes beamforming circuitry that nulls at least one speaker based on the inter-loudspeaker delay.

An apparatus for determining a delay is described. The apparatus includes means for performing calibration for surround sound echo reduction. The apparatus also includes means for determining an inter-loudspeaker delay based on the calibration. The apparatus further includes means for nulling at least one speaker based on the inter-loudspeaker delay.

A computer-program product for determining a delay is described. The computer-program product includes a non-transitory tangible computer-readable medium with instructions. The instructions include code for causing an electronic device to perform calibration for surround sound echo reduction. The instructions also include code for causing the electronic device to determine an inter-loudspeaker delay based on the calibration. The instructions further include code for causing the electronic device to null at least one speaker based on the inter-loudspeaker delay.

BRIEF DESCRIPTION OF THE DRAWINGS

FIG. 6A shows a far-field model of plane wave propagation relative to a microphone pair;

FIG. 6B shows multiple microphone pairs in a linear array;

FIG. 7A shows plots of unwrapped phase delay vs. frequency for four different directions of arrival (DOAs);

FIG. 7B shows plots of wrapped phase delay vs. frequency for the same DOAs;

FIG. 11A shows an example of a particular application;

FIG. 11B shows a mapping of pair-wise DOA estimates to a 360° range in the plane of the microphone array;

FIGS. 12A and 12B show an ambiguity in the DOA estimate;

FIG. 12C shows a relation between signs of observed DOAs and quadrants of an x-y plane;

FIG. 15A shows an example of a two-pair microphone array;

FIG. 15B shows an example of a pair-wise normalized minimum variance distortionless response (MVDR) BFNF;

FIG. 16A shows an example of a pair-wise BFNF for frequencies in which the matrix $A^H A$ is not ill-conditioned;

FIG. 27 illustrates charts of simulated true room response showing third and fourth delays and simulated down-sampled adaptive filter outputs associated with the simulated true room responses;

FIG. 29 is a flowchart of a second particular embodiment of a method of operation of the audio processing device of FIGS. 22-25;

FIG. 30 is a flowchart of a third particular embodiment of a method of operation of the audio processing device of FIGS. 22-25;

FIG. 31 is a flowchart of a fourth particular embodiment of a method of operation of the audio processing device of FIGS. 22-25;

DETAILED DESCRIPTION

For understanding, more detail of the surround sound far-field echo cancellation problem is given below. First, some of the motivation for seeking stereo/surround echo cancellation is given. In other words, detail about why a stereo/surround echo canceller may be beneficial is given. This may begin with a discussion of why people have two ears and not just one. Assume that a person is in a room with several people talking, laughing or just communicating with each other. Thanks to humans' binaural auditory system, people can concentrate on one particular talker in such an environment. Furthermore, people can localize or identify which person is talking, and are capable of processing a noisy or a reverberant speech signal in order to make it intelligible. One possible application of surround/stereo echo cancellation is stereo sound teleconferencing systems, which may provide a realistic presence that mono-channel systems cannot offer. For instance, the systems and methods disclosed herein may offer something similar to what two ears can do.

Some configurations of the systems and methods disclosed herein may provide far-field multi-channel surround sound echo cancellation. For example, the systems and methods disclosed herein may be implemented in one or more electronic devices to provide echo cancellation and/or noise suppression, where the desired talker can be in close proximity to the device or many feet away.

The systems and methods disclosed herein may be applied to a variety of electronic devices. Examples of electronic devices include cellular phones, smartphones, voice recorders, video cameras, audio players (e.g., Moving Picture Experts Group-1 (MPEG-1) or MPEG-2 Audio Layer 3 (MP3) players), video players, audio recorders, desktop computers, laptop computers, personal digital assistants (PDAs), gaming systems, televisions, audio receivers, set-top devices, etc. One kind of electronic device is a communication device, which may communicate with another device. Examples of communication devices include telephones, laptop computers, desktop computers, cellular phones, smartphones, wireless or wired modems, e-readers, tablet devices, gaming systems, cellular telephone base stations or nodes, access points, wireless gateways and wireless routers, conferencing systems, smart televisions, etc.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely

Figure 1:
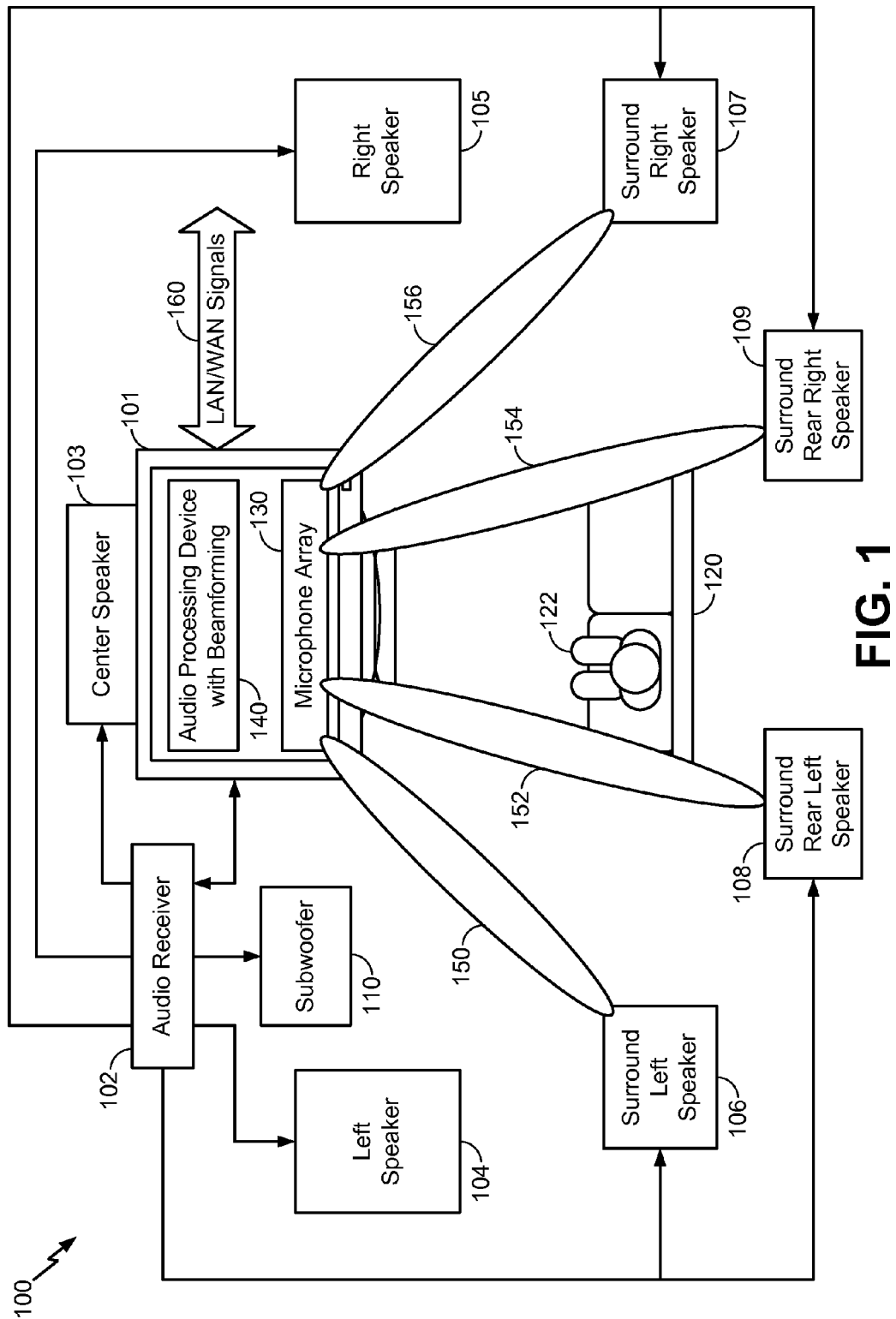
FIG. 1 is a block diagram of a particular illustrative embodiment of a home theater system adapted for teleconferencing.

A. Systems, Methods and Apparatus for Audio Signal Processing Device Calibration Using Null Beams FIG. 1 is a block diagram of a particular illustrative embodiment of a home theater system 100. The home theater system 100 is adapted for receiving voice interaction from a user 122. For example, the home theater system 100 may be used for teleconferencing (e.g., audio or video teleconferencing), to receive voice commands (e.g., to control a component of the home theater system 100 or another device), or to output voice input received from the user 122 (e.g., for voice amplification or audio mixing).

The home theater system 100 may include an electronic device 101 (e.g., a television) coupled to an external audio receiver 102. For example, the electronic device 101 may be a networking-enabled "smart" television that is capable of communicating local area network (LAN) and/or wide area network (WAN) signals 160. The electronic device 101 may include or be coupled to a microphone array 130 and an audio processing component 140. The audio processing component 140 may be an audio processing device operable to implement beamforming to reduce echo due to output of particular loudspeakers of the home theater system 100. As depicted in FIG. 1, one or more of the loudspeakers may be speakers arranged to provide surround sound (e.g., center, left, right, surround left, surround rear, surround rear left and surround rear right speakers and subwoofer).

The audio receiver 102 may receive audio signals from an audio output of the electronic device 101, process the audio signals and send signals to each of a plurality of external loudspeakers 103-109 and/or a subwoofer 110 for output. For example, the audio receiver 102 may receive a composite audio signal from the electronic device 101 via a multimedia interface, such as a high-definition multimedia interface (HDMI). The audio receiver 102 may process the composite audio signal to generate separate audio signals for each loudspeaker 103-109 and/or subwoofer 110. In the embodiment of FIG. 1, seven loudspeakers 103-109 and a subwoofer 110 are shown. It should be noted, however, that the embodiments of the present disclosure may include more or fewer loudspeakers 103-109 and/or subwoofers 110.

When the home theater system 100 is set up, each component may be positioned relative to a seating area 120 to facilitate use of the home theater system 100 (e.g., to improve surround-sound performance). Of course, other arrangements of the components of the home theater system 100 are also possible and are within the scope of the present disclosure. When voice input is to be received from the user 122 (e.g., in an audio/video conferencing scenario) at a device in which a microphone and loudspeaker(s) are located close to each other or are incorporated into a single device, a delay between a reference signal (e.g., a far-end audio signal) and a signal received at the microphone (e.g., a near-end audio signal) is typically within an expected echo cancellation range. Thus, an echo cancellation device (e.g., an adaptive filter) receiving the near-end and far-end signals may be capable of performing acoustic echo cancellation. However, in home theater systems, the speaker-microphone distances and the presence of the audio receiver 102 may increase the delay between the near-end and far-end signals to an extent that a conventional adaptive filter can no longer perform acoustic echo cancellation effectively. Echo cancellation is further complicated in the home theater system 100 because the home theater system 100 includes multiple loudspeakers that typically output signals that are correlated.

To implement acoustic echo cancellation in the home theater system 100 of FIG. 1, the audio processing component 140 may be configured to operate in a calibration mode. For example, the calibration mode may be initiated based on user input or automatically upon detecting a configuration change (e.g., an addition or removal of a component of the home theater system). During operation in the calibration mode, the electronic device 101 may estimate delay values used that are subsequently used for echo cancellation, as described in U.S. Provisional Patent Application No. 61/667,249. Additionally, during operation in the calibration mode, the electronic device 101 may determine direction of arrival (DOA) information that is used subsequently for echo cancellation. To illustrate, the electronic device 101 may output an audio pattern (e.g., white noise) for a particular period of time (e.g., five seconds) to the audio receiver 102. The audio receiver 102 may process the audio pattern and provide signals to the loudspeakers 103-109 and the subwoofer 110, one at a time. For example, a first loudspeaker (e.g., a center speaker 103) may output the audio pattern while the rest of the loudspeakers 104-109 and the subwoofer 110 are silent. Subsequently, another of the loudspeakers, such as a second loudspeaker (e.g., a left speaker 104), may output the audio pattern while the rest of the loudspeakers 103 and 105-109 and the subwoofer 110 are silent. This process may continue until each loudspeaker 103-109 and optionally the subwoofer 110 have output the audio pattern. While a particular loudspeaker 103-109 or the subwoofer 110 outputs the audio pattern, the microphone array 130 may receive acoustic signals output from the particular loudspeaker or the subwoofer 110. The audio processing component 140 may determine DOA of the acoustic signals, which corresponds to a direction from the microphone array 130 to the particular loudspeaker. After determining a DOA for each of the loudspeakers 103-109 and the subwoofer 110 (or a subset thereof), calibration is complete.

During operation in a non-calibration (e.g., use or runtime) mode after calibration is complete, the audio processing component 140 may perform beamforming to null out signals received from particular directions of arrival (DOAs). In a particular embodiment, nulls are generated corresponding to forward facing loudspeakers, such as the loudspeakers 106-109. For example, as illustrated in FIG. 1, the audio processing component 140 has generated nulls 150, 152, 154, 156 corresponding to loudspeakers 106-109. Thus, although acoustic signals from loudspeakers 106-109 are received at the microphone array 130, audio data corresponding to these acoustic signals is suppressed using beamforming based on the DOA associated with each of the loudspeakers 106-109. Suppressing audio data from particular loudspeakers decreases processing that is performed by the audio processing component to reduce echo associated with the home theater system 100. Operation in the use mode is further described with reference to FIG. 3.

When a subsequent configuration change is detected (e.g., a different audio receiver or a different speaker is introduced into the home theater system 100), the calibration mode may be initiated again and one or more new DOAs or updated DOAs may be determined by the audio processing component 140.

The device depicted in FIG. 1 may null out some of the loudspeakers 103-109. According to this approach, echo cancellation (e.g., linear adaptive filters) may be run on the remaining loudspeakers 103-109. This may alleviate the non-uniqueness problem by nulling out the direct paths of some of the loudspeakers 103-109. It should be noted that in this approach, the adaptive filters may be run after the null-forming.

Figure 2:
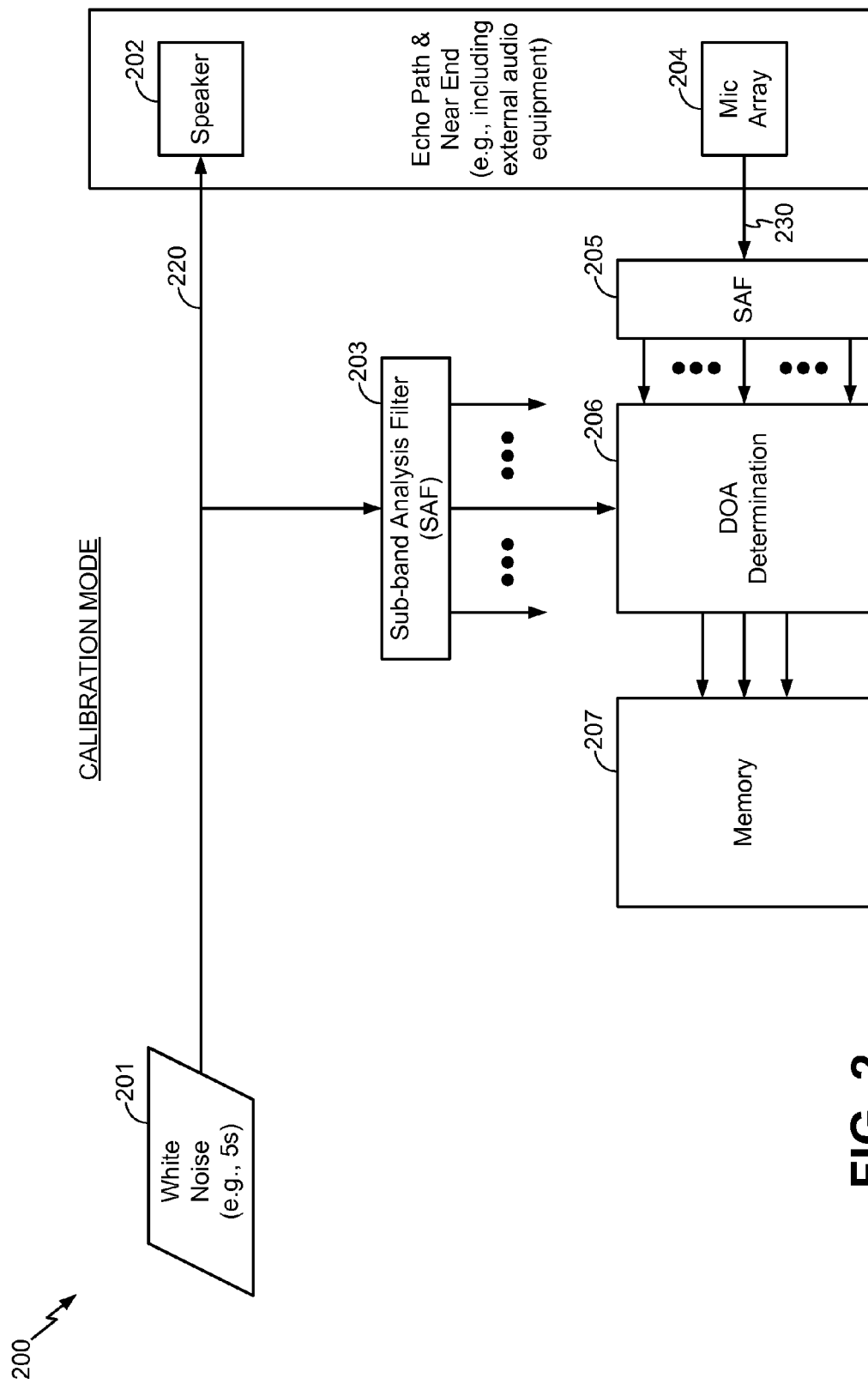
FIG. 2 is a block diagram of a particular illustrative embodiment of an audio processing device operating in a calibration mode.

FIG. 2 is a block diagram of a particular illustrative embodiment of an audio processing device 200 operating in a calibration mode. The audio processing device 200 may include or be included within the audio processing component 140 of FIG. 1. The audio processing device 200 includes an audio output interface 220 that is configured to be coupled to one or more acoustic output devices (such as a speaker 202). For example, the audio output interface 220 may include an audio bus coupled to or terminated by one or more speaker connectors, a multimedia connector (such as a high definition multimedia interface (HDMI) connector), or a combination thereof. Although more than one speaker may be present, the description that follows describes determining a direction of arrival (DOA) for the speaker 202 to simplify the description. Directions of arrival (DOAs) for other speakers may be determined before or after the DOA of the speaker 202 is determined. While the following description describes determining the DOA for the speaker 202 in detail, in a particular embodiment, in the calibration mode, the audio processing device 200 may also determine delay values that are subsequently used for echo cancellation, as described in U.S. Provisional Patent Application No. 61/667,249. For example, the delay values may be determined before the DOA for the speaker 202 is determined or after the DOA for the speaker 202 is determined. The audio processing device 200 may also include an audio input interface 230 that is configured to be coupled to one or more acoustic input devices (such as a microphone array 204). For example, the audio input interface 230 may include an audio bus coupled to or terminated by one or more microphone connectors, a multimedia connector (such as an HDMI connector), or a combination thereof.

In a use mode, the microphone array 204 may be operable to detect speech from a user (such as the user 122 of FIG. 1). However, sound output by the speaker 202 (and one or more other speakers that are not shown in FIG. 2) may also be received at the microphone array 204 causing echo. Further, the sound output by the speakers may be correlated, making the echo particularly difficult to suppress. To reduce correlated audio data from the various speakers, the audio processing device 200 may include a beamformer (such as a beamformer 320 of FIG. 3). The beamformer may use DOA data determined by a DOA determination device 206 to suppress audio data from particular speakers, such as the speaker 202.

In a particular embodiment, the DOA determination device 206 may include a plurality of DOA determination circuits. Each of the plurality of DOA determination circuits may be configured to determine DOA associated with a particular sub-band. Note that while the received audio signal is relatively narrowband (e.g., about 8 KHz within a human auditory range), the sub-bands are still narrower bands. For example, the audio processing device 200 may include a first sub-band analysis filter 205 coupled to the audio input interface 230. The first sub-band analysis filter 205 may divide the received audio signal into a plurality of sub-bands (e.g., frequency ranges) and provide each sub-band of the received audio signal to a corresponding DOA determination circuit of the DOA determination device 206. The audio processing device 200 may also include a second sub-band analysis filter 203 coupled between the audio output interface 220 and the DOA determination device 206.

The second sub-band analysis filter 203 may divide an output signal of the audio processing device 200 (such as white noise signal 201 when the audio processing device is in the calibration mode) into the plurality of sub-bands (e.g., frequency ranges) and provide each sub-band of the output signal to a corresponding DOA determination circuit of the DOA determination device 206.

To illustrate, in the calibration mode, the audio processing device 200 may output a calibration signal, such as the white noise signal 201 for a time period (e.g., 5 seconds), to the speaker 202 via the audio output interface 220. The calibration signal may also be provided to the second sub-band analysis filter 203 to be divided into output sub-bands. In response to the white noise signal 201, the speaker 202 may generate acoustic white noise, which may be detected at the microphone array 204. The white noise detected at the microphone array 204 may be modified by a transfer function (associated, for example, with echo paths and near end audio paths) that is related to relative positions of the speaker 202 and the microphone array 204. A detected white noise signal may be provided by the microphone array 204 to the audio input interface 230. The detected white noise signal may be divided into input sub-bands by the first sub-band analysis filter 205. DOA determination circuits of the DOA determination device 206 may process the input sub-bands (based on the detected white noise signal) and the output sub-bands (based on the white noise signal) to determine a DOA associated with each sub-band. DOA data corresponding to the DOA for each sub-band may be stored at a memory 207. Alternately, or in addition, DOA data that is a function of the DOA for each sub-band (e.g., an average or another function of the sub-band DOAs) may be stored at a memory 207. If the audio processing device 200 is coupled to one or more additional speakers, calibration of the other speakers continues as DOAs for the one or more additional speakers are determined during the calibration mode. Otherwise, the calibration mode may be terminated and the audio processing device 200 may be ready to be operated in a use mode.

Figure 3:
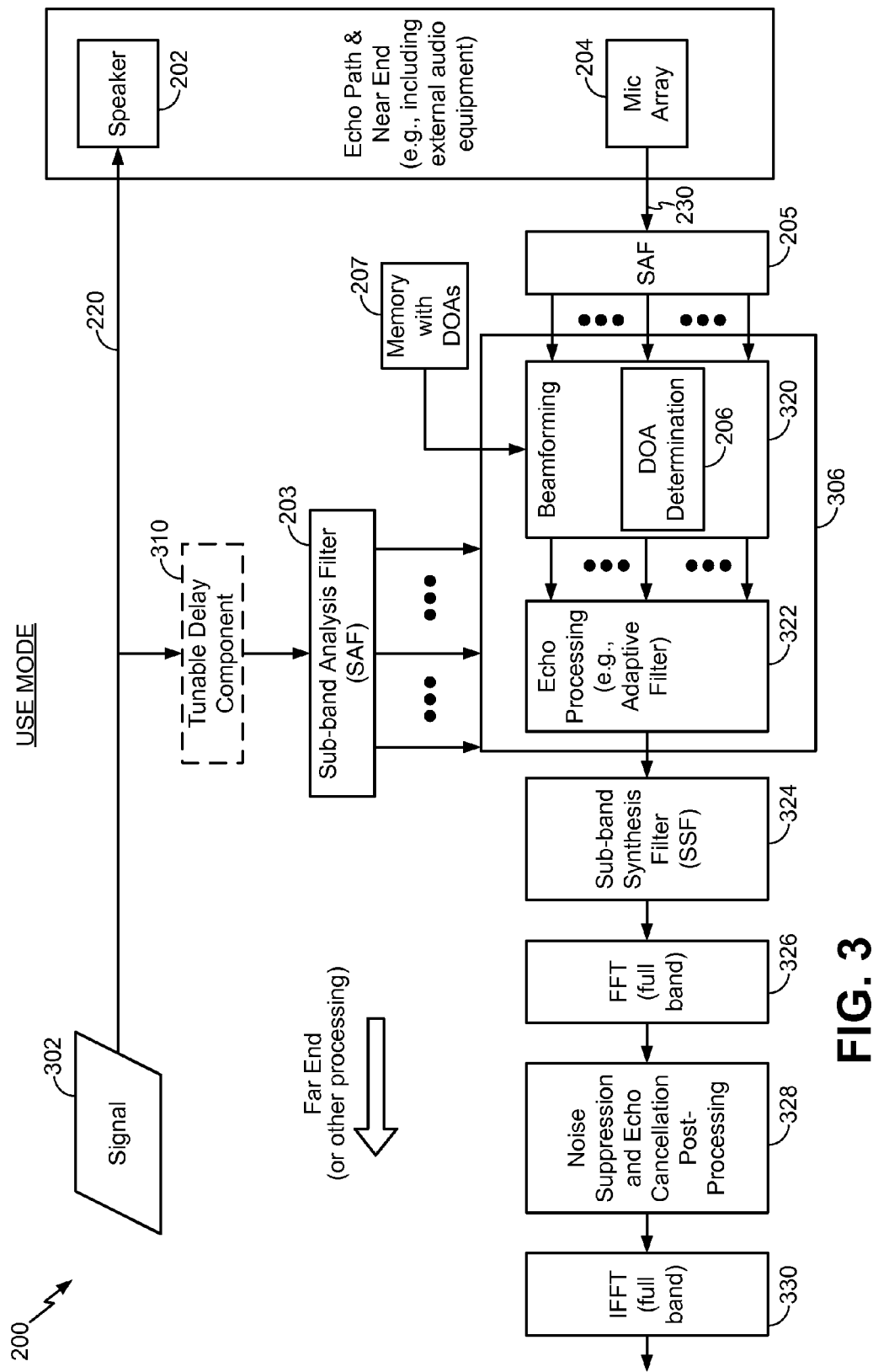
FIG. 3 is a block diagram of a particular illustrative embodiment of the audio processing device of FIGS. 1 and 2 operating in a use mode.

FIG. 3 is a block diagram of a particular illustrative embodiment of the audio processing device 200 operating in a use mode. For example, the audio processing device 200 may operate in the use mode, after completion of calibration using the calibration mode, to conduct a teleconference, to received voice commands from a user 122, or to output voice input from the user 122 (e.g., for karaoke or other voice amplification or mixing).

In the use mode, a signal 302 may be received from a far end (e.g., audio input received from another party to a teleconference call) or may be received from a local audio source (e.g., audio output of a television or of another media device). The signal 302 may be provided to the speaker 202 via the audio output interface 220. The signal or another signal may also be provided to one or more additional speakers (not shown in FIG. 3). The speaker 202 may generate an output acoustic signal responsive to the signal 302. A received acoustic signal at the microphone array 204 may include the output acoustic signal as modified by a transfer function as well as other audio (such as speech from the user 122 and acoustic signals from the one or more other speakers). The received signal corresponding to the received acoustic signal may be output by the microphone array 204 to the audio input interface 230. Thus, the received signal may include echo from the signal 302.

In a particular embodiment, the signal 302 is provided to a tunable delay component 310. The tunable delay component 310 may delay providing the signal 302 for subsequent processing for a delay amount that corresponds to a delay value or delay values determined during the calibration mode 210. A particular method of determining the data value is described in U.S. Provisional Patent Application No. 61/667,249. The signal 302 is subsequently provided to echo cancellation components to reduce the echo. For example, the signal 302 may be provided to the second sub-band analysis filter 203 to be divided into output sub-bands, which are provided to an echo cancellation device 306. In this example, the received signal from the audio input interface 230 may be provided to the first sub-band analysis filter 205 to be divided into input sub-bands, which are also provided to the echo cancellation device 306.

The echo cancellation device 306 may include beamforming components 320 and echo processing components 322. In the embodiment illustrated in FIG. 3, an audio signal is received from the audio input interface 230 at the beamforming components 320 before being provided to the echo processing components 322; however, in other embodiments, the beamforming components 320 are downstream of the echo processing components 322 (i.e., the audio signal is received from the audio input interface 230 at the echo processing components 322 before being provided to the beamforming components 320).

The beamforming components 320 are operable to use the direction of arrival (DOA) data from the memory 207 to suppress audio data associated with acoustic signals received at the microphone array 204 from particular directions. For example, audio data associated with the acoustic signals received from speakers that face the microphone array 204, such as the loudspeakers 106-109 of FIG. 1, may be suppressed by using the DOA data to generated nulls in the audio data received from the audio input interface 230. The echo processing components 322 may include adaptive filters or other processing components to reduce echo in the audio data based on a reference signal received from the audio output interface 220.

In a particular embodiment, the beamforming components 320, an echo cancellation post-procession component 328, another component of the audio processing device 200, or a combination thereof, may be operable to track a user 122 that is providing voice input at the microphone array 204. For example, the beamforming components 320 may include the DOA determination device 206. The DOA determination device 206 may determine a direction of arrival of sounds produced by the user 122 that are received at the microphone array 204. Based on the DOA of the user 122, the beamforming components 320 may track the user 122 by modifying the audio data to focus on audio from the user 122, as described further with reference to FIGS. 6A-16C. In a particular embodiment, the beamforming components 320 may determine whether the DOA of the user 122 coincides with a DOA of a speaker, such as the speaker 202, before suppressing audio data associated with the DOA of the speaker. When the DOA of the user 122 coincides with a DOA of a particular speaker, the beamforming components 320 may use the DOA data to determine beamforming parameters that do not suppress a portion of the audio data that is associated with the particular speaker and the user 122 (e.g., audio received from the coincident DOAs of the speaker and the user 122). The beamforming components 320 may also provide data to the echo processing components 322 to indicate to the echo processing components 322 whether particular audio data has been suppressed via beamforming.

After echo cancellation is performed on individual sub-bands, the echo cancelled sub-bands may be provided by the echo cancellation device 306 to a sub-band synthesis filter 324 to combine the sub-bands to form a full bandwidth echo cancelled received signal. In a particular embodiment, additional echo cancellation and noise suppression are performed by providing the echo cancelled received signal to a full-band fast Fourier transform (FFT) component 326, a frequency space noise suppression and echo cancellation post-procession component 328, and an inverse FFT component 330 before sending the signal to the far end or to other audio processing components (such as mixing or voice recognition processing components). Alternately, or in addition, additional analog domain audio processing may be performed. For example, the noise suppression and echo cancellation post-procession component 328 may be positioned between the echo processing components 322 and the sub-band synthesis filter 324. In this example, no FFT component 326 or inverse FFT component 330 may be used.

Figure 4:
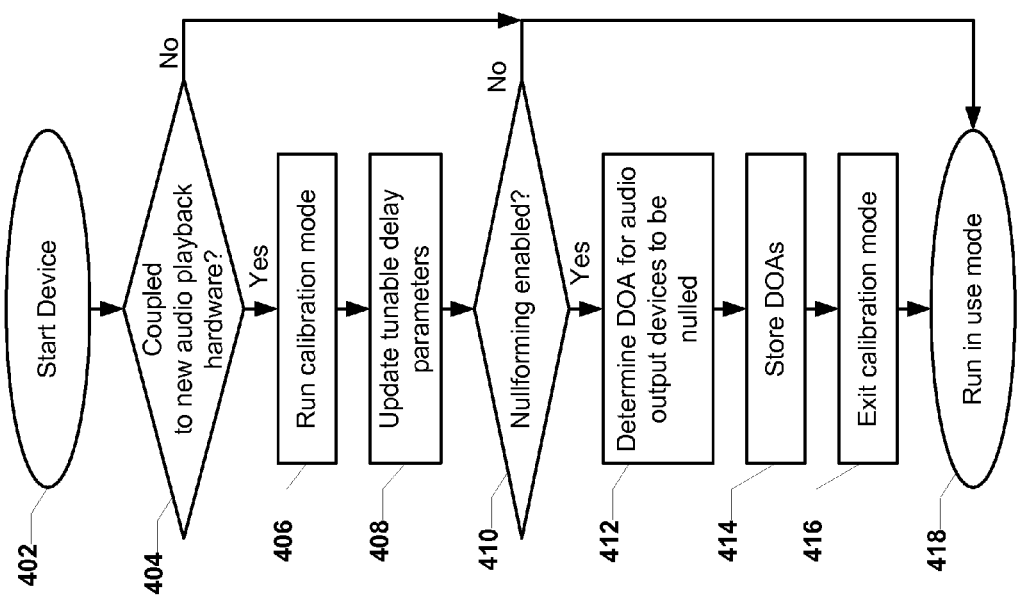
FIG. 4 is a flowchart of a first particular embodiment of a method of operation of the audio processing device of FIGS. 1-3.

FIG. 4 is a flowchart of a first particular embodiment of a method of operation of the audio processing device of FIGS. 1-3. The method includes, at 402, starting the audio processing device. The method may also include, at 404, determining whether new audio playback hardware has been coupled to the audio processing device. For example, when new audio playback hardware is coupled to the audio processing device, the new audio playback hardware may provide an electrical signal that indicates presence of the new audio playback hardware. In another example, at start-up or at other times, the audio processing device may poll audio playback hardware that is coupled to the audio processing device to determine whether new audio playback hardware is present. In another example, a user 122 may provide input that indicates presence of the new audio playback hardware. When no new audio playback hardware is present, the method ends, and the audio processing device is ready to run in a use mode, at 418.

When new audio playback hardware is detected, the method may include running 406 in a first calibration mode. The first calibration mode may be used to determine acoustic delay between one or more loudspeakers coupled to the audio processing device and one or more microphones coupled to the audio processing device. The acoustic delay may be used, at 408, to update tunable delay parameters. In a particular embodiment, the tunable delay parameters are used to delay providing a reference signal (such as the signal 302) to the echo cancellation device 306 to increase an effective echo cancellation time range of the echo processing components 322.

The method may also include determining whether nullforming (i.e., beamforming to suppress audio data associated with one or more particular audio output devices) is enabled, at 410. When nullforming is not enabled, the method ends, and the audio processing device is ready to run in a use mode, at 418. When nullforming is enabled, the method includes, at 412, determining a direction of arrival (DOA) for each audio output device that is to be nulled. At 414, the DOAs may be stored (e.g., at the memory 207 of FIG. 2) after they are determined. After a DOA is determined for each audio output device that is to be nulled, the audio processing device exits the calibration mode, at 416, and is ready to run in a use mode, at 418.

Figure 5:
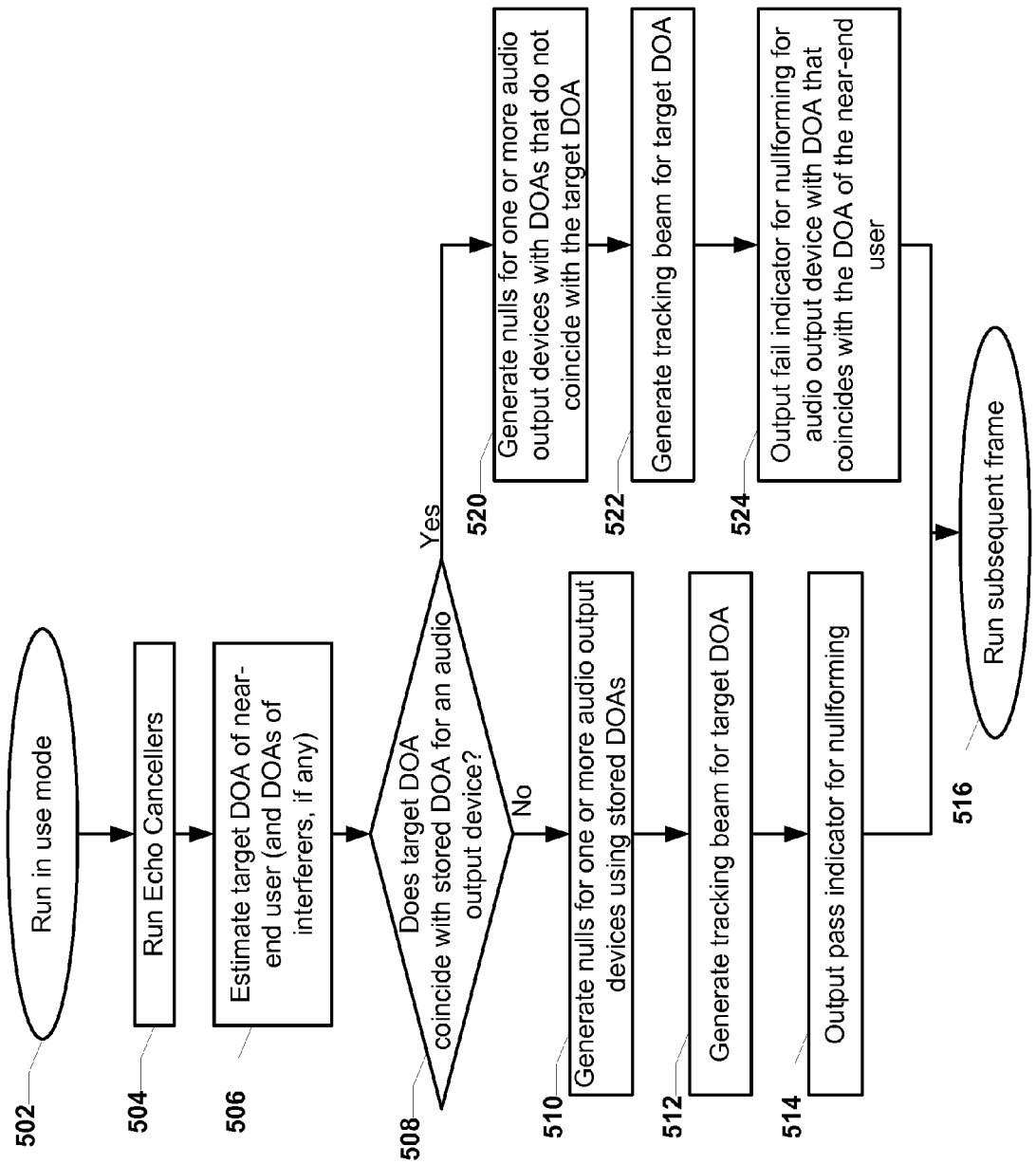
FIG. 5 is a flowchart of a second particular embodiment of a method of operation of the audio processing device of FIGS. 1-3.

FIG. 5 is a flowchart of a second particular embodiment of a method of operation of the audio processing device of FIGS. 1-3. The method includes, at 502, activating (e.g., running) a use mode of the audio processing device. The method also includes, at 504, activating (e.g., running) echo cancellers, such as echo cancellation circuits of the echo processing device 322 of FIG. 3. The method also includes, at 506, estimating a target direction of arrival (DOA) of a near-end user (e.g., the user 122 of FIG. 1). Directions of arrival (DOAs) of interferers may also be determined if interferers are present.

The method may include, at 508, determining whether the target DOA coincides with a stored DOA for an audio output device. The stored DOAs may have been determined during a calibration mode of the audio processing device. When the target DOA does not coincide with a stored DOA for any audio output device, the method includes, at 510, generating nulls for one or more audio output devices using the stored DOAs. In a particular embodiment, nulls may be generated for each front facing audio output device, where front facing refers to having a direct acoustic path (as opposed to a reflected acoustic path) from the audio output device to a microphone array 130. To illustrate, in FIG. 1, there is a direct acoustic path between the loudspeaker 106 and the microphone array 130, but there is not a direct acoustic path between the right loudspeaker 105 and the microphone array 130.

The method also includes, at 512, generating a tracking beam for the target DOA. The tracking beam may improve reception and/or processing of audio data associated with acoustic signals from the target DOA, for example, to improve processing of voice input from the user. The method may also include outputting (e.g., sending) a pass indicator for nullforming, at 514. The pass indicator may be provided to the echo cancellers to indicate that a null has been formed in audio data provided to the echo cancellers, where the null corresponds to the DOA of a particular audio output device. When multiple audio output devices are to be nulled, multiple pass indicators may be provided to the echo cancellers, one for each audio output device to be nulled. Alternately, a single pass indicator may be provided to the echo cancellers to indicate that nulls have been formed corresponding to each of the audio output devices to be nulled. The echo cancellers may include linear echo cancellers (e.g., adaptive filters), non-linear post processing (e.g., echo cancellation post processing (EC PP) echo cancellers), or both. In an embodiment that includes linear echo cancellers, the pass indicator may be used to indicate that echo associated with the particular audio output device has been removed via beamforming; accordingly, no linear echo cancellation of the signal associated with the particular audio output device may be performed by the echo cancellers. The method then proceeds to run a subsequent frame of audio data, at 516.

When the target DOA coincides with a stored DOA for any audio output device, at 508, the method includes, at 520, generating nulls for one or more audio output devices that do not coincide with the target DOA using the stored DOAs. For example, referring to FIG. 1, if the user 122 moves a bit to his or her left, the user's DOA at the microphone array 130 will coincide with the DOA of the loudspeaker 108. In this example, the audio processing component 140 may form the nulls 150, 154 and 156 but not form the null 152 so that the null 152 does not suppress audio input from the user 122.

The method also includes, at 522, generating a tracking beam for the target DOA. The method may also include outputting (e.g., sending) a fail indicator for nullforming for the audio output device with a DOA that coincides with the target DOA, at 524. The fail indicator may be provided to the echo cancellers to indicate that at least one null that was to be formed has not been formed. In an embodiment that includes linear echo cancellers, the fail indicator may be used to indicate that echo associated with the particular audio output device has not been removed via beamforming; accordingly, linear echo cancellation of the signal associated with the particular audio output device may be performed by the echo cancellers. The method then proceeds to run a subsequent frame, at 516.

It is a challenge to provide a method for estimating a three-dimensional direction of arrival (DOA) for each frame of an audio signal for concurrent multiple sound events that is sufficiently robust under background noise and reverberation. Robustness can be improved by increasing the number of reliable frequency bins. It may be desirable for such a method to be suitable for arbitrarily shaped microphone array geometry, such that specific constraints on microphone geometry may be avoided. A pair-wise 1-D approach as described herein can be appropriately incorporated into any geometry.

Such an approach may be implemented to operate without a microphone placement constraint. Such an approach may also be implemented to track sources using available frequency bins up to Nyquist frequency and down to a lower frequency (e.g., by supporting use of a microphone pair having a larger inter-microphone distance). Rather than being limited to a single pair of microphones for tracking, such an approach may be implemented to select a best pair of microphones among all available pairs of microphones. Such an approach may be used to support source tracking even in a far-field scenario, up to a distance of three to five meters or more, and to provide a much higher DOA resolution. Other potential features include obtaining a 2-D representation of an active source. For best results, it may be desirable that each source is a sparse broadband audio source and that each frequency bin is mostly dominated by no more than one source.

For a signal received by a pair of microphones directly from a point source in a particular DOA, the phase delay differs for each frequency component and also depends on the spacing between the microphones. The observed value of the phase delay at a particular frequency bin may be calculated as the inverse tangent of the ratio of the imaginary term of the complex FFT coefficient to the real term of the complex FFT coefficient.

As shown in FIG. 6A, the phase delay value $\Delta\phi_f$ for a source S01 for at least one microphone MC10, MC20 at a particular frequency, f, may be related to a source DOA under a far-field (i.e., plane-wave) assumption as $$\Delta\varphi_f = 2\pi f \frac{d\sin\theta}{c},$$

where d denotes the distance between the microphones MC10, MC20 (in meters), θ denotes the angle of arrival (in radians) relative to a direction that is orthogonal to the array axis, f denotes frequency (in hertz), and c denotes the speed of sound (in meters/second). As will be described below, the DOA estimation principles described herein may be extended to multiple microphone pairs in a linear array (e.g., as shown in FIG. 6B). For the ideal case of a single point source with no reverberation, the ratio of phase delay to frequency $$\frac{\Delta\omega}{f}$$

will have the same value $$2\pi \frac{d\sin\theta}{c}$$

over all frequencies.

Such an approach may be limited in practice by the spatial aliasing frequency for the microphone pair, which may be defined as the frequency at which the wavelength of the signal is twice the distance d between the microphones. Spatial aliasing causes phase wrapping, which puts an upper limit on the range of frequencies that may be used to provide reliable phase delay measurements for a particular microphone pair.

FIG. 7A shows plots of unwrapped phase delay vs. frequency for four different DOAs D10, D20, D30, D40. FIG. 7B shows plots of wrapped phase delay vs. frequency for the same DOAs D10, D20, D30, D40, where the initial portion of each plot (i.e., until the first wrapping occurs) are shown in bold. Attempts to extend the useful frequency range of phase delay measurement by unwrapping the measured phase are typically unreliable.

Figure 8A:
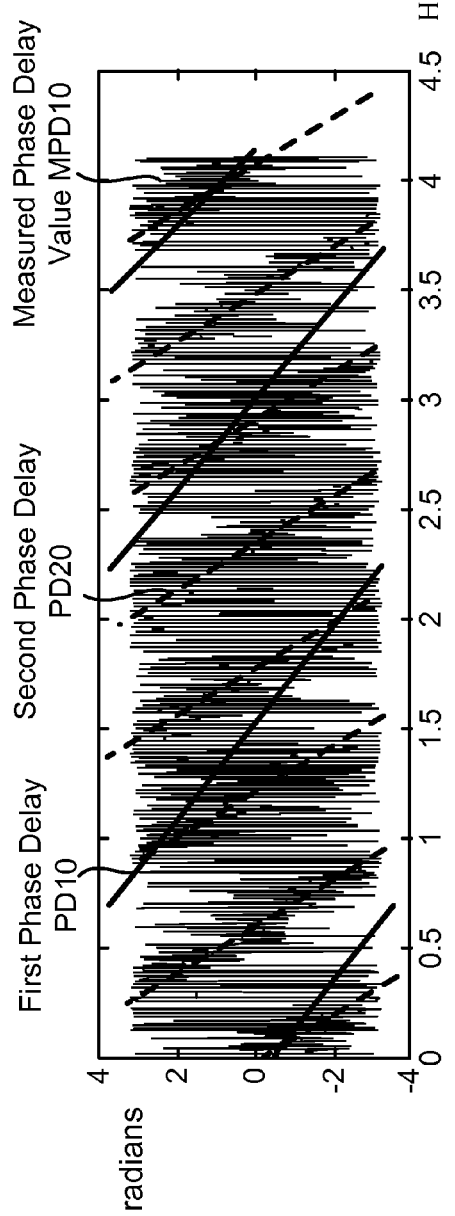
FIG. 8A shows an example of measured phase delay values and calculated values for two DOA candidates.

Instead of phase unwrapping, a proposed approach compares the phase delay as measured (e.g., wrapped) with pre-calculated values of wrapped phase delay for each of an inventory of DOA candidates. FIG. 8A shows such an example that includes angle-vs.-frequency plots of the (noisy) measured phase delay values MPD10 and the phase delay values PD10, PD20 for two DOA candidates of the inventory (solid and dashed lines), where phase is wrapped to the range of pi to minus pi. The DOA candidate that is best matched to the signal as observed may then be determined by calculating, for each DOA candidate, $\theta_i$, a corresponding error, $e_i$, between the phase delay values $\Delta\phi_{if}$ for the i-th DOA candidate and the observed phase delay values $\Delta\phi_{ob_f}$ over a range of frequency components f, and identifying the DOA candidate value that corresponds to the minimum error. In one example, the error $e_i$ is expressed as $\|\Delta\phi_{ob_f} - \Delta\phi_{if}\|_f^2$, i.e., as the sum $$e_i = \sum_{f \in F} \left(\Delta\varphi_{ob_f} - \Delta\varphi_{i_f}\right)^2$$

of the squared differences between the observed and candidate phase delay values over a desired range or other set F of frequency components. The phase delay values $\Delta\phi_{if}$ for each DOA candidate $\theta_i$ may be calculated before runtime (e.g., during design or manufacture), according to known values of c and d and the desired range of frequency components f, and retrieved from storage during use of the device. Such a pre-calculated inventory may be configured to support a desired angular range and resolution (e.g., a uniform resolution, such as one, two, five, or ten degrees; or a desired nonuniform resolution) and a desired frequency range and resolution (which may also be uniform or nonuniform).

It may be desirable to calculate the error $e_i$ across as many frequency bins as possible to increase robustness against noise. For example, it may be desirable for the error calculation to include terms from frequency bins that are beyond the spatial aliasing frequency. In a practical application, the maximum frequency bin may be limited by other factors, which may include available memory, computational complexity, strong reflection by a rigid body at high frequencies, etc.

A speech signal is typically sparse in the time-frequency domain. If the sources are disjoint in the frequency domain, then two sources may be tracked at the same time. If the sources are disjoint in the time domain, then two sources can be tracked at the same frequency. It may be desirable for the array to include a number of microphones that is at least equal to the number of different source directions to be distinguished at any one time. The microphones may be omnidirectional (e.g., as may be typical for a cellular telephone or a dedicated conferencing device) or directional (e.g., as may be typical for a device such as a set-top box).

Such multichannel processing is generally applicable, for example, to source tracking for speakerphone applications. Such a technique may be used to calculate a DOA estimate for a frame of a received multichannel signal. Such an approach may calculate, at each frequency bin, the error for each candidate angle with respect to the observed angle, which is indicated by the phase delay. The target angle at that frequency bin is the candidate having the minimum error. In one example, the error is then summed across the frequency bins to obtain a measure of likelihood for the candidate. In another example, one or more of the most frequently occurring target DOA candidates across all frequency bins is identified as the DOA estimate (or estimates) for a given frame.

Such a method may be applied to obtain instantaneous tracking results (e.g., with a delay of less than one frame). The delay is dependent on the FFT size and the degree of overlap. For example, for a 512-point FFT with a 50% overlap and a sampling frequency of 16 kilohertz (kHz), the resulting 256-sample delay corresponds to sixteen milliseconds. Such a method may be used to support differentiation of source directions typically up to a source-array distance of two to three meters, or even up to five meters.

The error may also be considered as a variance (i.e., the degree to which the individual errors deviate from an expected value). Conversion of the time-domain received signal into the frequency domain (e.g., by applying an FFT) has the effect of averaging the spectrum in each bin. This averaging is even more obvious if a sub-band representation is used (e.g., mel scale or Bark scale). Additionally, it may be desirable to perform time-domain smoothing on the DOA estimates (e.g., by applying as recursive smoother, such as a first-order infinite-impulse-response filter).

It may be desirable to reduce the computational complexity of the error calculation operation (e.g., by using a search strategy, such as a binary tree, and/or applying known information, such as DOA candidate selections from one or more previous frames).

Even though the directional information may be measured in terms of phase delay, it is typically desired to obtain a result that indicates source DOA. Consequently, it may be desirable to calculate the error in terms of DOA rather than in terms of phase delay.

An expression of error $e_i$ in terms of DOA may be derived by assuming that an expression for the observed wrapped phase delay as a function of DOA, such as $$\Psi_{f_{wr}}(\theta) = \mathrm{mod}\left(-2\pi f \frac{d\sin\theta}{c} + \pi, 2\pi\right) - \pi,$$

is equivalent to a corresponding expression for unwrapped phase delay as a function of DOA, such as $$\Psi_{f_{un}}(\theta) = -2\pi f \frac{d\sin\theta}{c},$$

except near discontinuities that are due to phase wrapping. The error $e_i$ may then be expressed as $e_i = \|\Psi_{f_{wr}}(\theta_{ob}) - \Psi_{f_{wr}}(\theta_i)\|_f^2 \equiv \|\Psi_{f_{un}}(\theta_{ob}) - \Psi_{f_{un}}(\theta_i)\|_f^2$, where the difference between the observed and candidate phase delay at frequency f is expressed in terms of DOA as $$\Psi_{f_{un}}(\theta_{ob}) - \Psi_{f_{un}}(\theta_i) = \frac{-2\pi f d}{c}(\sin\theta_{ob_f} - \sin\theta_i).$$

A Taylor series expansion may be performed to obtain the following first-order approximation:

$$\frac{-2\pi f d}{c}(\sin\theta_{ob_f} - \sin\theta_i) \approx (\theta_{ob_f} - \theta_i) - \frac{2\pi f d}{c}\cos\theta_i,$$

which is used to obtain an expression of the difference between the DOA $\theta_{ob_f}$ as observed at frequency f and DOA candidate $\theta_i$:

$$(\theta_{ob_f} - \theta_i) \cong \frac{\Psi_{f_{un}}(\theta_{ob}) - \Psi_{f_{un}}(\theta_i)}{\frac{2\pi f d}{c}\cos\theta_i}.$$

This expression may be used, with the assumed equivalence of observed wrapped phase delay to unwrapped phase delay, to express error $e_i$ in terms of DOA:

$$e_i = \|\theta_{ob} - \theta_i\|_f^2 \cong \frac{\|\Psi_{f_{wr}}(\theta_{ob}) - \Psi_{f_{wr}}(\theta_i)\|_f^2}{\left\|\frac{2\pi f d}{c}\cos\theta_i\right\|_f^2},$$

where the values of $\lfloor\Psi_{f_{wr}}(\theta_{ob}),\Psi_{f_{wr}}(\theta_i)\rfloor$, are defined as $\lfloor\Delta\psi_{ob_f},\Delta\psi_{k_j}\rfloor$.

To avoid division with zero at the endfire directions ($\theta=+/-90°$), it may be desirable to perform such an expansion using a second-order approximation instead, as in the following:

$$|\theta_{ob} - \theta_i| \cong \begin{cases} |-C/B|, & \theta_i = 0 (\text{broadside}) \\ \left|\frac{-B+\sqrt{B^2-4AC}}{2A}\right|, & \text{otherwise} \end{cases},$$

where $A=(\pi f d \sin\theta_i)/c$, $B=(-2\pi f d \cos\theta_i)/c$ and $C=-(\Psi_{f_{un}}(\theta_{ob})-\Psi_{f_{un}}(\theta_i))$.

As in the first-order example above, this expression may be used, with the assumed equivalence of observed wrapped phase delay to unwrapped phase delay, to express error $e_i$ in terms of DOA as a function of the observed and candidate wrapped phase delay values.

Figure 9B:
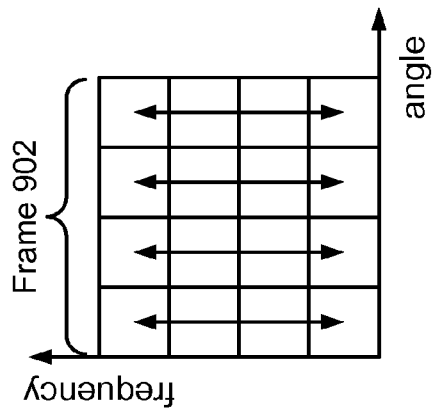
FIG. 9B shows an example of calculating a DOA estimate.
Figure 9C:
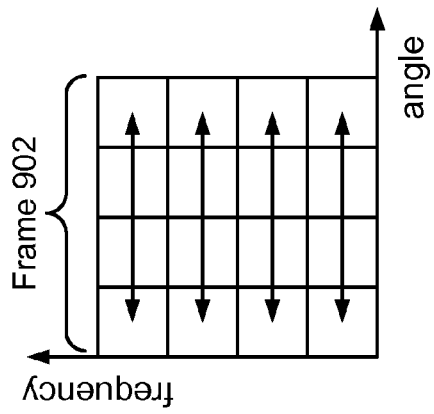
FIG. 9C shows an example of identifying a DOA estimate for each frequency.
Figure 9A:
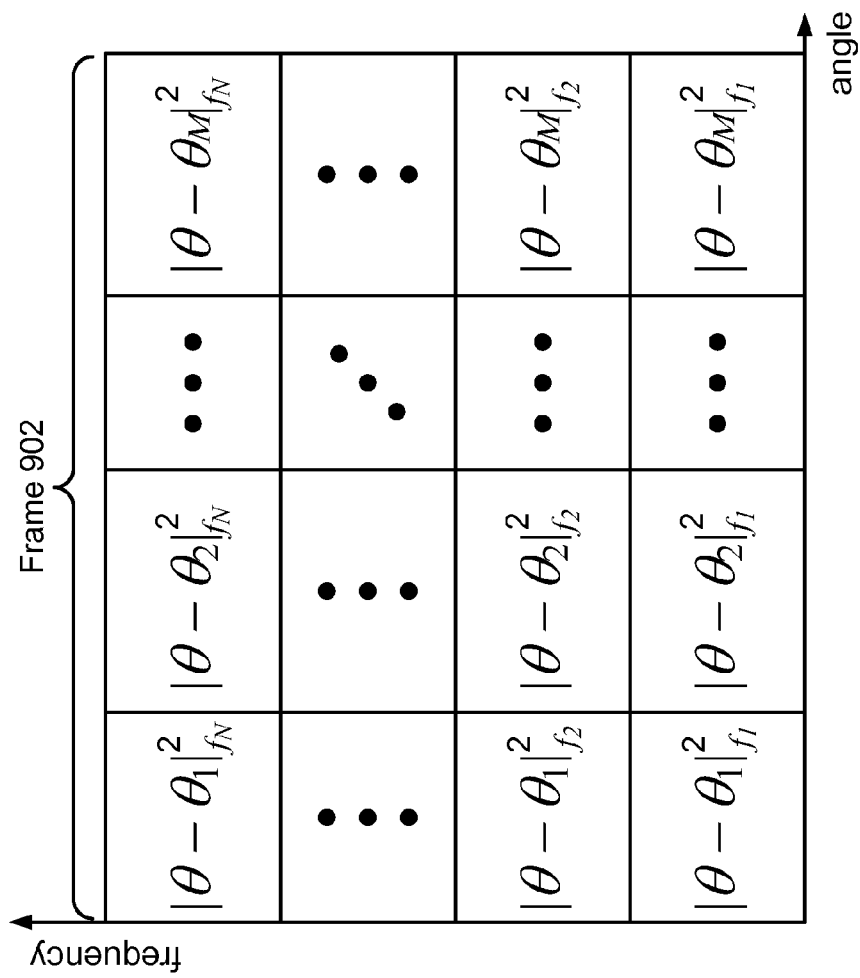
FIG. 9A shows an example of calculating DOA differences for a frame.

FIGS. 9A-9C depict a plurality of frames 902. As shown in FIG. 9A, a difference between observed and candidate DOA for a given frame of the received signal may be calculated in such manner at each of a plurality of frequencies f of the received microphone signals (e.g., $\forall f \in F$) and for each of a plurality of DOA candidates $\theta_i$. As demonstrated in FIG. 9B, a DOA estimate for a given frame may be determined by summing the squared differences for each candidate across all frequency bins in the frame to obtain the error $e_i$ and selecting the DOA candidate having the minimum error. Alternatively, as demonstrated in FIG. 9C, such differences may be used to identify the best-matched (e.g., minimum squared difference) DOA candidate at each frequency. A DOA estimate for the frame may then be determined as the most frequent DOA across all frequency bins.

Figure 10B:
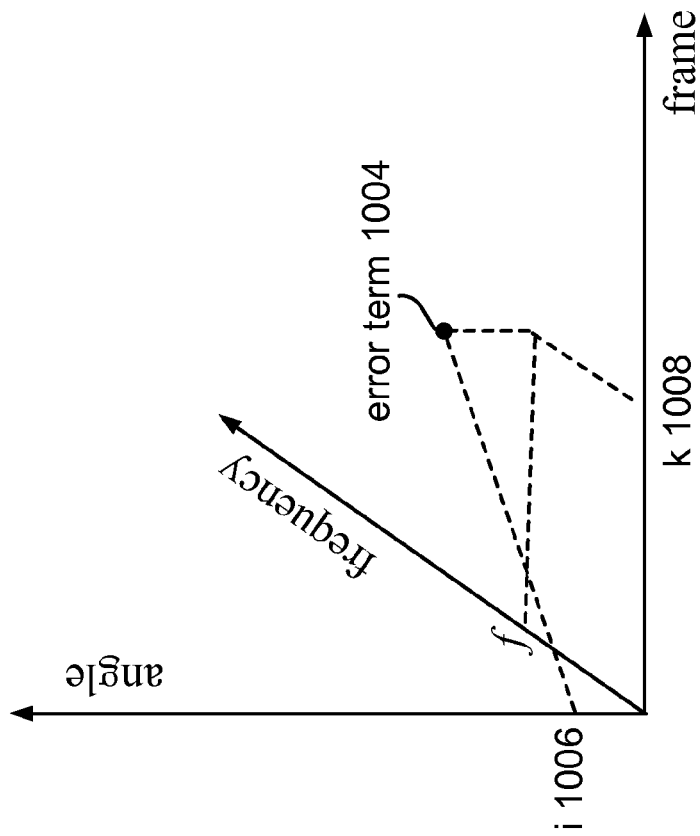
FIG. 10B shows an example of likelihood calculation.
Figure 10A:
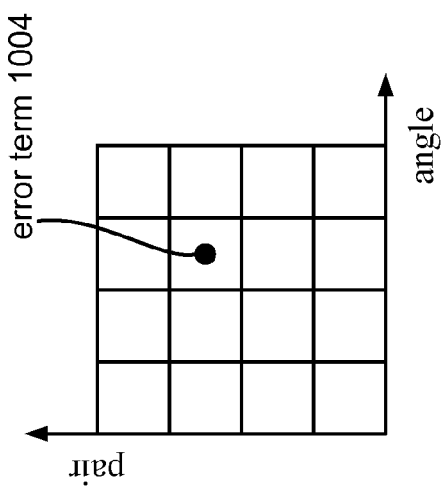
FIG. 10A shows an example of using calculated likelihoods to identify a best microphone pair and best DOA candidate for a given frequency.

As shown in FIGS. 10A and 10B, an error term 1004 may be calculated for each candidate angle 1006, i, and each of a set F of frequencies for each frame, 1008, k. It may be desirable to indicate a likelihood of source activity in terms of a calculated DOA difference or error term 1004. One example of such a likelihood L may be expressed, for a particular frame, frequency, and angle, as $$L(i, f, k) = \frac{1}{|\theta_{ob} - \theta_i|_{f,k}^2}. \quad (1)$$

For expression (1), an extremely good match at a particular frequency may cause a corresponding likelihood to dominate all others. To reduce this susceptibility, it may be desirable to include a regularization term $\lambda$, as in the following expression:

$$L(i, f, k) = \frac{1}{|\theta_{ob} - \theta_i|_{f,k}^2 + \lambda}. \quad (2)$$

Speech tends to be sparse in both time and frequency, such that a sum over a set of frequencies F may include results from bins that are dominated by noise. It may be desirable to include a bias term $\beta$, as in the following expression:

$$L(i, f, k) = \frac{1}{|\theta_{ob} - \theta_i|_{f,k}^2 + \lambda} - \beta. \quad (3)$$

The bias term, which may vary over frequency and/or time, may be based on an assumed distribution of the noise (e.g., Gaussian). Additionally or alternatively, the bias term may be based on an initial estimate of the noise (e.g., from a noise-only initial frame). Additionally or alternatively, the bias term may be updated dynamically based on information from noise-only frames, as indicated, for example, by a voice activity detection module.

The frequency-specific likelihood results may be projected onto a (frame, angle) plane to obtain a DOA estimation per frame $$\theta_{est\_k} = \max_i \sum_{f \in F} L(i, f, k)$$

that is robust to noise and reverberation because only target dominant frequency bins contribute to the estimate. In this summation, terms in which the error is large have values that approach zero and thus become less significant to the estimate. If a directional source is dominant in some frequency bins, the error value at those frequency bins will be nearer to zero for that angle. Also, if another directional source is dominant in other frequency bins, the error value at the other frequency bins will be nearer to zero for the other angle.

The likelihood results may also be projected onto a (frame, frequency) plane to indicate likelihood information per frequency bin, based on directional membership (e.g., for voice activity detection). This likelihood may be used to indicate likelihood of speech activity. Additionally or alternatively, such information may be used, for example, to support time- and/or frequency-selective masking of the received signal by classifying frames and/or frequency components according to their direction of arrival.

An anglogram representation is similar to a spectrogram representation. An anglogram may be obtained by plotting, at each frame, a likelihood of the current DOA candidate at each frequency.

A microphone pair having a large spacing is typically not suitable for high frequencies, because spatial aliasing begins at a low frequency for such a pair. A DOA estimation approach as described herein, however, allows the use of phase delay measurements beyond the frequency at which phase wrapping begins, and even up to the Nyquist frequency (i.e., half of the sampling rate). By relaxing the spatial aliasing constraint, such an approach enables the use of microphone pairs having larger inter-microphone spacings. As an array with a large inter-microphone distance typically provides better directivity at low frequencies than an array with a small inter-microphone distance, use of a larger array typically extends the range of useful phase delay measurements into lower frequencies as well.

Figure 8B:
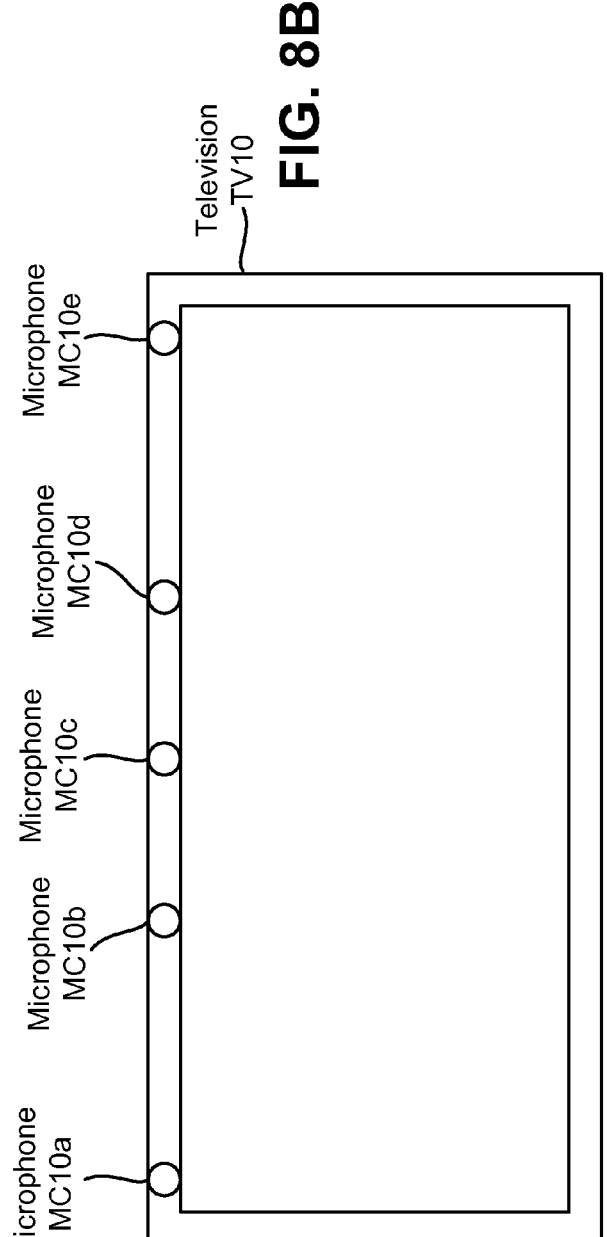
FIG. 8B shows a linear array of microphones arranged along a top margin of a television screen.

The DOA estimation principles described herein may be extended to multiple microphone pairs MC10a-c in a linear array (e.g., as shown in FIG. 6B). One example of such an application for a far-field scenario is a linear array of microphones MC10a-e arranged along the margin of a television TV10 or other large-format video display screen (e.g., as shown in FIG. 8B). It may be desirable to configure such an array to have a nonuniform (e.g., logarithmic) spacing between microphones, as in the examples of FIGS. 6B and 8B.

For a far-field source, the multiple microphone pairs of a linear array will have essentially the same DOA. Accordingly, one option is to estimate the DOA as an average of the DOA estimates from two or more pairs in the array. However, an averaging scheme may be affected by mismatch of even a single one of the pairs, which may reduce DOA estimation accuracy. Alternatively, it may be desirable to select, from among two or more pairs of microphones of the array, the best microphone pair for each frequency (e.g., the pair that gives the minimum error $e_i$ at that frequency), such that different microphone pairs may be selected for different frequency bands. At the spatial aliasing frequency of a microphone pair, the error will be large. Consequently, such an approach will tend to automatically avoid a microphone pair when the frequency is close to its wrapping frequency, thus avoiding the related uncertainty in the DOA estimate. For higher-frequency bins, a pair having a shorter distance between the microphones will typically provide a better estimate and may be automatically favored, while for lower-frequency bins, a pair having a larger distance between the microphones will typically provide a better estimate and may be automatically favored. In the four-microphone example shown in FIG. 6B, six different pairs of microphones are possible (i.e., $$\left(\text{i.e.,} \binom{4}{2} = 6\right).$$

In one example, the best pair for each axis is selected by calculating, for each frequency f, P×I values, where P is the number of pairs, I is the size of the inventory, and each value $e_{pi}$ is the squared absolute difference between the observed angle $\theta_{pf}$ (for pair p and frequency f) and the candidate angle $\theta_{if}$. For each frequency f, the pair p that corresponds to the lowest error value $e_{pi}$ is selected. This error value also indicates the best DOA candidate $\theta_i$ at frequency f (as shown in FIG. 10A).

The signals received by a microphone pair may be processed as described herein to provide an estimated DOA, over a range of up to 180 degrees, with respect to the axis of the microphone pair. The desired angular span and resolution may be arbitrary within that range (e.g. uniform (linear) or nonuniform (nonlinear), limited to selected sectors of interest, etc.). Additionally or alternatively, the desired frequency span and resolution may be arbitrary (e.g. linear, logarithmic, mel-scale, Bark-scale, etc.).

In the model shown in FIG. 6B, each DOA estimate between 0 and +/−90 degrees from a microphone pair indicates an angle relative to a plane that is orthogonal to the axis of the pair. Such an estimate describes a cone around the axis of the pair, and the actual direction of the source along the surface of this cone is indeterminate. For example, a DOA estimate from a single microphone pair does not indicate whether the source is in front of or behind the microphone pair. Therefore, while more than two microphones may be used in a linear array to improve DOA estimation performance across a range of frequencies, the range of DOA estimation supported by a linear array is typically limited to 180 degrees.

The DOA estimation principles described herein may also be extended to a two-dimensional (2-D) array of microphones. For example, a 2-D array may be used to extend the range of source DOA estimation up to a full 360 degrees (e.g., providing a similar range as in applications such as radar and biomedical scanning). Such an array may be used in a particular embodiment, for example, to support good performance even for arbitrary placement of the telephone relative to one or more sources.

The multiple microphone pairs of a 2-D array typically will not share the same DOA, even for a far-field point source. For example, source height relative to the plane of the array (e.g., in the z-axis) may play an important role in 2-D tracking. FIG. 11A shows an example of an embodiment in which the x-y plane as defined by the microphone axes is parallel to a surface (e.g., a tabletop) on which the microphone array is placed. In this example, the source 1101 is a person speaking from a location that is along the x axis 1110 but is offset in the direction of the z axis 1114 (e.g., the speaker's mouth is above the tabletop). With respect to the x-y plane as defined by the microphone array, the direction of the source 1101 is along the x axis 1110, as shown in FIG. 11A. The microphone pair along the y axis 1112 estimates a DOA of the source as zero degrees from the x-z plane. Due to the height of the speaker above the x-y plane, however, the microphone pair along the x axis 1110 estimates a DOA of the source as 30 degrees from the x axis 1110 (i.e., 60 degrees from the y-z plane), rather than along the x axis 1110. FIGS. 12A and 12B show two views of the cone of confusion CY10 associated with this DOA estimate, which causes an ambiguity in the estimated speaker direction with respect to the microphone axis. An expression such as $$\left[\tan^{-1}\left(\frac{\sin\theta_1}{\sin\theta_2}\right), \tan^{-1}\left(\frac{\sin\theta_2}{\sin\theta_2}\right)\right], \quad (4)$$

(4) where $\theta_1$ and $\theta_2$ are the estimated DOA for pair 1 and 2, respectively, may be used to project all pairs of DOAs to a 360° range in the plane in which the three microphones are located. Such projection may be used to enable tracking directions of active speakers over a 360° range around the microphone array, regardless of height difference. Applying the expression above to project the DOA estimates (0°, 60°) of FIG. 11A into the x-y plane produces $$\left[\tan^{-1}\left(\frac{\sin 0°}{\sin 60°}\right), \tan^{-1}\left(\frac{\sin 60°}{\sin 0°}\right)\right] = (0°, 90°),$$

which may be mapped to a combined directional estimate 1122 (e.g., an azimuth) of 270° as shown in FIG. 11B.

Figure 13B:
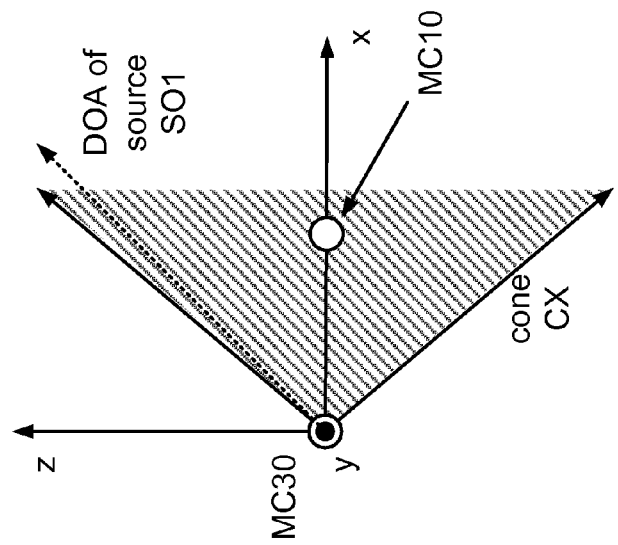
FIGS. 13A-13D show an example in which the source is located above the plane of the microphones.
Figure 13C:
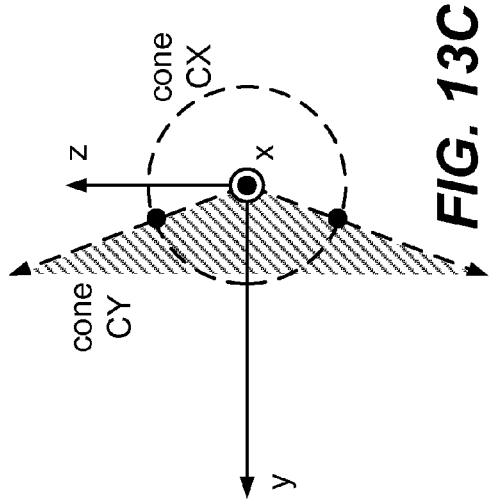
Figure 13D:
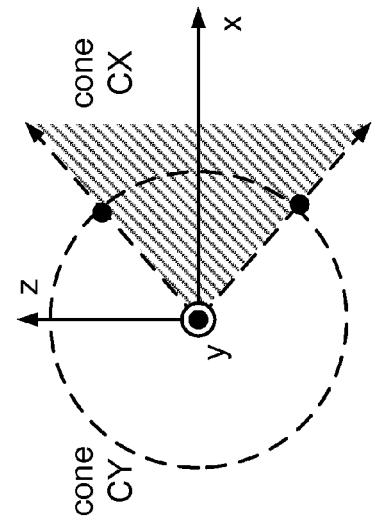
Figure 13A:
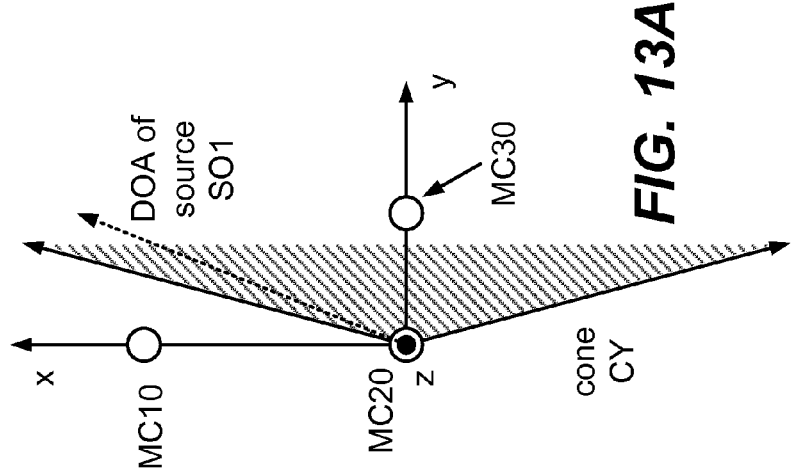

In a typical use case, the source will be located in a direction that is not projected onto a microphone axis. FIGS. 13A-13D show such an example in which the source is located above the plane of the microphones MC10, MC20, MC30. In this example, the DOA of the source signal passes through the point (x, y, z)=(5, 2, 5). FIG. 13A shows the x-y plane as viewed from the +z direction, FIGS. 13B and 13D show the x-z plane as viewed from the direction of microphone MC30, and FIG. 13C shows the y-z plane as viewed from the direction of microphone MC10. The shaded area in FIG. 13A indicates the cone of confusion CY associated with the DOA $\theta_1$ as observed by the y-axis microphone pair MC20-MC30, and the shaded area in FIG. 13B indicates the cone of confusion CX associated with the DOA $\theta_2$ as observed by the x-axis microphone pair MC10-MC20. In FIG. 13C, the shaded area indicates cone CY, and the dashed circle indicates the intersection of cone CX with a plane that passes through the source and is orthogonal to the x axis. The two dots on this circle that indicate its intersection with cone CY are the candidate locations of the source. Likewise, in FIG. 13D the shaded area indicates cone CX, the dashed circle indicates the intersection of cone CY with a plane that passes through the source and is orthogonal to the y axis, and the two dots on this circle that indicate its intersection with cone CX are the candidate locations of the source. It may be seen that in this 2-D case, an ambiguity remains with respect to whether the source is above or below the x-y plane.

For the example shown in FIGS. 13A-13D, the DOA observed by the x-axis microphone pair MC10-MC20 is $\theta_2 = \tan^{-1}(-5/\sqrt{25+4}) \approx -42.9°$ and the DOA observed by the y-axis microphone pair MC20-MC30 is $\theta_1 = \tan^{-1}(-2/\sqrt{25+25}) \approx -15.8°$. Using expression (4) to project these directions into the x-y plane produces the magnitudes (21.8°, 68.2°) of the desired angles relative to the x and y axes, respectively, which corresponds to the given source location (x, y, z)=(5, 2, 5). The signs of the observed angles indicate the x-y quadrant in which the source is located, as shown in FIG. 12C.

In fact, almost 3D information is given by a 2D microphone array, except for the up-down confusion. For example, the directions of arrival observed by microphone pairs MC10-MC20 and MC20-MC30 may also be used to estimate the magnitude of the angle of elevation of the source relative to the x-y plane. If d denotes the vector from microphone MC20 to the source, then the lengths of the projections of vector d onto the x-axis, the y-axis, and the x-y plane may be expressed as $d \sin(\theta_2)$, $d \sin(\theta_1)$ and $d \sqrt{\sin^2(\theta_1)+\sin^2(\theta_2)}$, respectively. The magnitude of the angle of elevation may then be estimated as $\hat{\theta}_h = \cos^{-1}\sqrt{\sin^2(\theta_1)+\sin^2(\theta_2)}$.

Although the microphone pairs in the particular examples of FIGS. 11A-11B and 13A-13D have orthogonal axes, it is noted that for microphone pairs having non-orthogonal axes, expression (4) may be used to project the DOA estimates to those non-orthogonal axes, and from that point it is straightforward to obtain a representation of the combined directional estimate with respect to orthogonal axes. FIG. 13E shows an example of microphone array MC10, MC20, MC30 in which the axis 1 of pair MC20-MC30 lies in the x-y plane and is skewed relative to the y axis by a skew angle $\theta_0$.

Figure 13F:
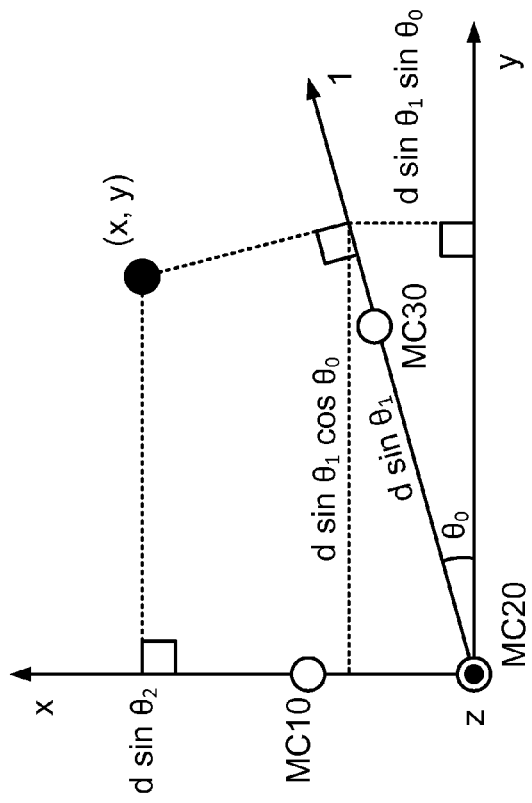
FIG. 13F shows an example of the use of the array to obtain a DOA estimate with respect to the orthogonal x and y axes.
Figure 13E:
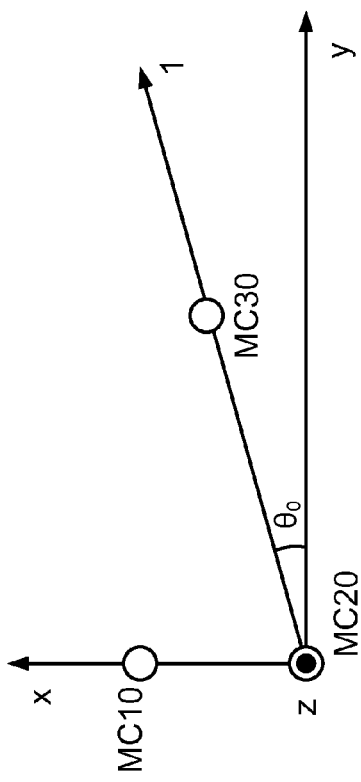
FIG. 13E shows an example of microphone pairs along non-orthogonal axes.

FIG. 13F shows an example of obtaining a combined directional estimate in the x-y plane with respect to orthogonal axes x and y with observations ($\theta_1$, $\theta_2$) from an array, as shown in FIG. 13E. If d denotes the vector from microphone MC20 to the source, then the lengths of the projections of vector d onto the x-axis and axis 1 may be expressed as $d \sin(\theta_2)$ and $d \sin(\theta_1)$, respectively. The vector (x,y) denotes the projection of vector d onto the x-y plane. The estimated value of x is known, and it remains to estimate the value of y.

The estimation of y may be performed using the projection $p_1 = (d \sin \theta_1 \sin \theta_0, d \sin \theta_1 \cos \theta_0)$ of vector (x,y) onto axis 1. Observing that the difference between vector (x,y) and vector $p_1$ is orthogonal to $p_1$, calculate y as $$y = d\frac{\sin\theta_1 - \sin\theta_2\sin\theta_0}{\cos\theta_0}.$$

The desired angles of arrival in the x-y plane, relative to the orthogonal x and y axes, may then be expressed respectively as $$\left(\tan^{-1}\left(\frac{y}{x}\right), \tan^{-1}\left(\frac{x}{y}\right)\right) = \left(\tan^{-1}\left(\frac{\sin\theta_1 - \sin\theta_2\sin\theta_0}{\sin\theta_2\cos\theta_2}\right), \tan^{-1}\left(\frac{\sin\theta_2\cos\theta_0}{\sin\theta_1 - \sin\theta_2\sin\theta_0}\right)\right).$$

Extension of DOA estimation to a 2-D array is typically well-suited to and sufficient for certain embodiments. However, further extension to an N-dimensional array is also possible and may be performed in a straightforward manner. For tracking applications in which one target is dominant, it may be desirable to select N pairs for representing N dimensions. Once a 2-D result is obtained with a particular microphone pair, another available pair can be utilized to increase degrees of freedom. For example, FIGS. 13A-13F illustrate use of observed DOA estimates from different microphone pairs in the x-y plane to obtain an estimate of the source direction as projected into the x-y plane. In the same manner, observed DOA estimates from an x-axis microphone pair and a z-axis microphone pair (or other pairs in the x-z plane) may be used to obtain an estimate of the source direction as projected into the x-z plane, and likewise for the y-z plane or any other plane that intersects three or more of the microphones.

Estimates of DOA error from different dimensions may be used to obtain a combined likelihood estimate, for example, using an expression such as $$\frac{1}{\max(|\theta - \theta_{0,1}|^2_{f,1}, |\theta - \theta_{0,2}|^2_{f,2}) + \lambda}$$

or $$\frac{1}{\operatorname{mean}(|\theta - \theta_{0,1}|^2_{f,1}, |\theta - \theta_{0,2}|^2_{f,2}) + \lambda},$$

where $\theta_{0,i}$ denotes the DOA candidate selected for pair i. Use of the maximum among the different errors may be desirable to promote selection of an estimate that is close to the cones of confusion of both observations, in preference to an estimate that is close to only one of the cones of confusion and may thus indicate a false peak. Such a combined result may be used to obtain a (frame, angle) plane, as described herein, and/or a (frame, frequency) plot, as described herein.

The DOA estimation principles described herein may be used to support selection among multiple users that are speaking. For example, location of multiple sources may be combined with a manual selection of a particular user 122 that is speaking (e.g., push a particular button to select a particular corresponding user 122) or automatic selection of a particular user 122 (e.g., by speaker recognition). In one such application, an audio processing device (such as the audio processing device of FIGS. 1-3) is configured to recognize the voice of a particular user 122 and to automatically select a direction corresponding to that voice in preference to the directions of other sources.

A source DOA may be easily defined in 1-D, e.g. from −90 degrees to +90 degrees. For more than two microphones at arbitrary relative locations, it is proposed to use a straightforward extension of 1-D as described above, e.g. $(\theta_1, \theta_2)$ in two-pair case in 2-D, $(\theta_1, \theta_2, \theta_3)$ in three-pair case in 3-D, etc.

Figures 14A, 14B:
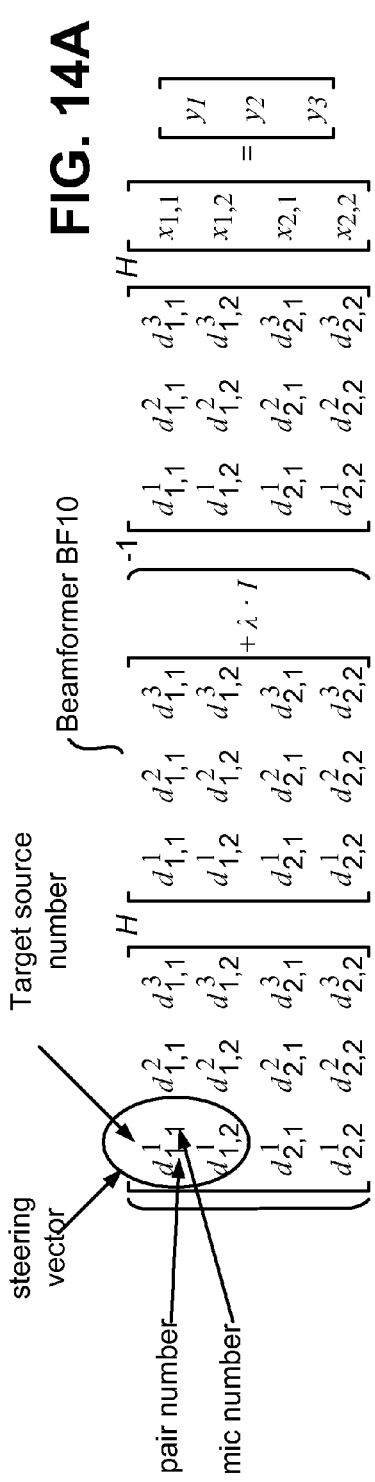
FIGS. 14A and 14B show examples of pair-wise normalized beamformer/null beamformers (BFNFs) for a two-pair microphone array (e.g., as shown in FIG. 15A)

To apply spatial filtering to such a combination of paired 1-D DOA estimates, a beamformer/null beamformer (BFNF) BF10 as shown in FIG. 14A may be applied by augmenting the steering vector for each pair. In FIG. 14A, $A^H$ denotes the conjugate transpose of A, x denotes the microphone channels, and y denotes the spatially filtered channels. Using a pseudo-inverse operation $A^+=(A^HA)^{-1}A^H$ as shown in FIG. 14A allows the use of a non-square matrix. For a three-microphone MC10, MC20, MC30 case (i.e., two microphone pairs) as illustrated in FIG. 15A, for example, the number of rows 2*2=4 instead of 3, such that the additional row makes the matrix non-square.

As the approach shown in FIG. 14A is based on robust 1-D DOA estimation, complete knowledge of the microphone geometry is not required, and DOA estimation using all microphones at the same time is also not required. Such an approach is well-suited for use with anglogram-based DOA estimation as described herein, although any other 1-D DOA estimation method can also be used. FIG. 14B shows an example of the BFNF BF10 as shown in FIG. 14A which also includes a normalization factor N10 to prevent an ill-conditioned inversion at the spatial aliasing frequency.

FIG. 15B shows an example of a pair-wise (PW) normalized MVDR (minimum variance distortionless response) BFNF BF10, in which the manner in which the steering vector (array manifold vector) is obtained differs from the conventional approach. In this case, a common channel is eliminated due to sharing of a microphone between the two pairs. The noise coherence matrix Γ may be obtained either by measurement or by theoretical calculation using a sinc function. It is noted that the examples of FIGS. 14A, 14B, and 15B may be generalized to an arbitrary number of sources N such that N<=M, where M is the number of microphones.

Figures 16B, 16C:
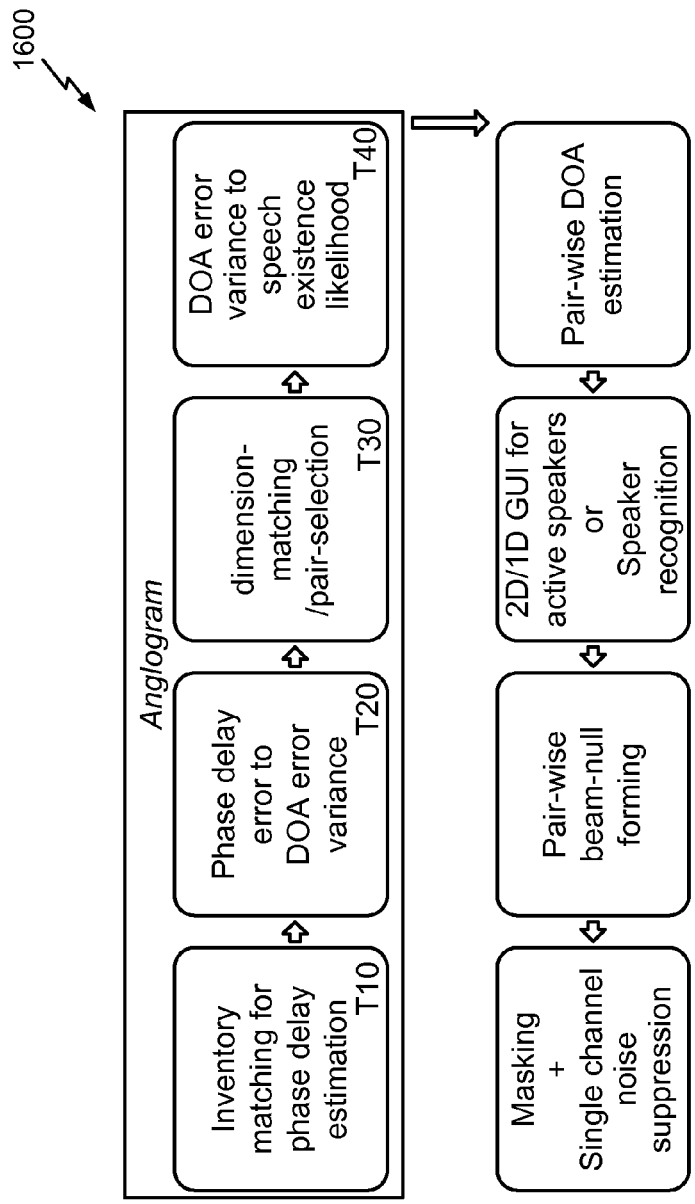
FIG. 16B shows examples of steering vectors.
FIG. 16C shows a flowchart of an integrated method of source direction estimation as described herein.

FIG. 16A shows another example of a BFNF BF10 that may be used if the matrix $A^HA$ is not ill-conditioned, which may be determined using a condition number or determinant of the matrix. If the matrix is ill-conditioned, it may be desirable to bypass one microphone signal for that frequency bin for use as the source channel, while continuing to apply the method to spatially filter other frequency bins in which the matrix $A^HA$ is not ill-conditioned. This option saves computation for calculating a denominator for normalization. The methods in FIGS. 14A-16A demonstrate BFNF BF10 techniques that may be applied independently at each frequency bin. The steering vectors are constructed using the DOA estimates for each frequency and microphone pair as described herein. For example, each element of the steering vector for pair p and source n for DOA $\theta_i$ frequency f, and microphone number m (1 or 2) may be calculated as $$d^n_{p,m} = \exp\left(\frac{-j\omega f_s(m-1)l_p}{c}\cos\theta_i\right),$$

where $l_p$ indicates the distance between the microphones of pair p, ω indicates the frequency bin number, and $f_s$ indicates the sampling frequency. FIG. 16B shows examples of steering vectors SV10*a-b* for an array as shown in FIG. 15A.

A pair-wise beamformer/null beamformer (PWBFNF) scheme may be used for suppressing the direct path of interferers up to the available degrees of freedom (instantaneous suppression without smooth trajectory assumption, additional noise-suppression gain using directional masking, additional noise-suppression gain using bandwidth extension). Single-channel post-processing of quadrant framework may be used for stationary noise and noise-reference handling.

It may be desirable to obtain instantaneous suppression but also to provide minimization of artifacts, such as musical noise. It may be desirable to maximally use the available degrees of freedom for BFNF. One DOA may be fixed across all frequencies, or a slightly mismatched alignment across frequencies may be permitted. Only the current frame may be used, or a feed-forward network may be implemented. The BFNF may be set for all frequencies in the range up to the Nyquist rate (e.g., except ill-conditioned frequencies). A natural masking approach may be used (e.g., to obtain a smooth natural seamless transition of aggressiveness).

FIG. 16C shows a flowchart for one example of an integrated method 1600 as described herein. This method includes an inventory matching task T10 for phase delay estimation, a variance calculation task T20 to obtain DOA error variance values, a dimension-matching and/or pair-selection task T30, and a task T40 to map DOA error variance for the selected DOA candidate to a source activity likelihood estimate. The pair-wise DOA estimation results may also be used to track one or more active speakers, to perform a pair-wise spatial filtering operation, and or to perform time- and/or frequency-selective masking. The activity likelihood estimation and/or spatial filtering operation may also be used to obtain a noise estimate to support a single-channel noise suppression operation.

Figure 17:
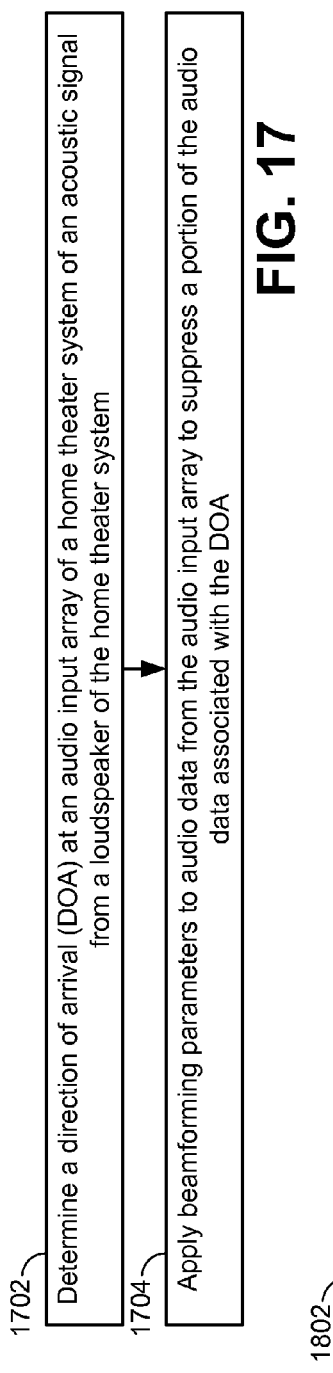
FIG. 17 is a flowchart of a third particular embodiment of a method of operation of the audio processing device of FIGS. 1-3.

FIG. 17 is a flowchart of a third particular embodiment of a method of operation of the audio processing device of FIGS. 1-3. As described with reference to FIGS. 1-3, the audio processing device may be a component of a television (such as a "smart" television that includes a processor capable of executing a teleconferencing application) or another home theater component.

The method includes, at 1702, determining a direction of arrival (DOA) at an audio input array of a home theater system of an acoustic signal from a loudspeaker of the home theater system. For example, the audio processing component 140 of the home theater system 100 may determine a DOA to one or more of the loudspeakers 103-109 or the subwoofer 110 by supplying a calibration signal, one-by-one, to each of the loudspeakers 103-109 or the subwoofer 110 and detecting acoustic output at the microphone array 130.

The method may also include, at 1704, applying beamforming parameters to audio data from the audio input array to suppress a portion of the audio data associated with the DOA. For example, the audio processing component 140 may form one or more nulls, such as the nulls 150-156, in the audio data using the determined DOA.

Figure 18:
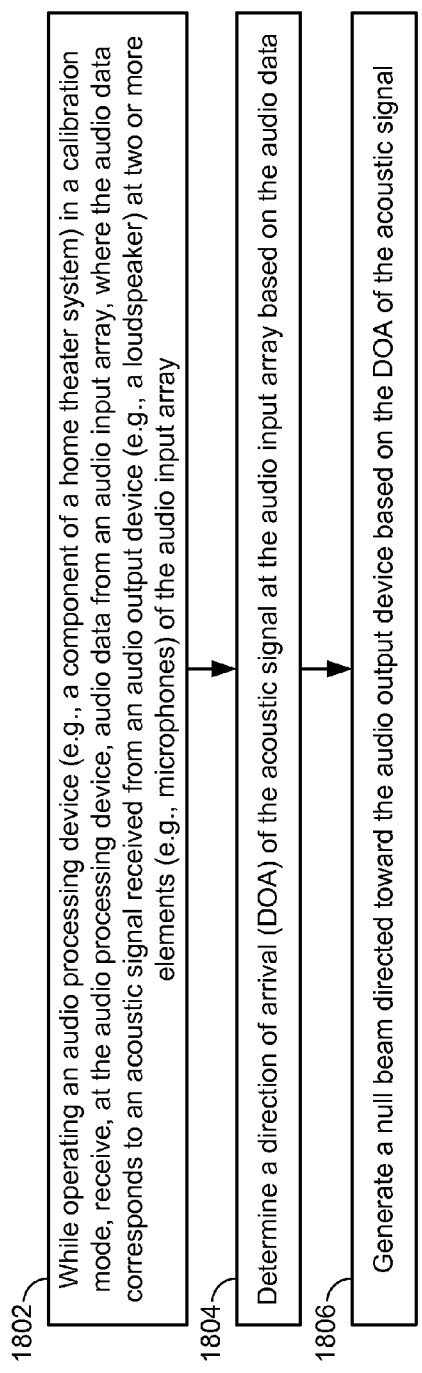
FIG. 18 is a flowchart of a fourth particular embodiment of a method of operation of the audio processing device of FIGS. 1-3.

FIG. 18 is a flowchart of a fourth particular embodiment of a method of operation of the audio processing device of FIGS. 1-3. As described with reference to FIGS. 1-3, the audio processing device may be a component of a television (such as a "smart" television that includes a processor capable of executing a teleconferencing application) or another home theater component.

The method includes, at 1802, while operating an audio processing device (e.g., a component of a home theater system) in a calibration mode, receiving audio data at the audio processing device from an audio input array. The audio data may correspond to an acoustic signal received from an audio output device (e.g., a loudspeaker) at two or more elements (e.g., microphones) of the audio input array. For example, when the audio receiver 102 of FIG. 1 sends audio data (e.g., the white noise signal 201) to the loudspeaker 106, the microphone array 130 may detect an acoustic output of the loudspeaker 106 (e.g., acoustic white noise).

The method also includes, at 1804, determining a direction of arrival (DOA) of the acoustic signal at the audio input array based on the audio data. In a particular embodiment, the DOA may be stored in a memory as DOA data, which may be used subsequently in a use mode to suppress audio data associated with the DOA. The method also includes, at 1806, generating a null beam directed toward the audio output device based on the DOA of the acoustic signal.

Figure 19:
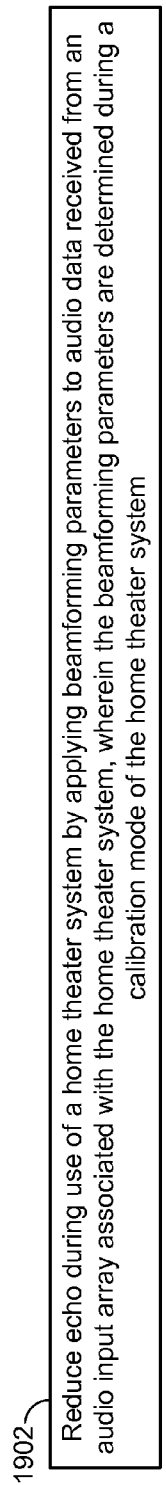
FIG. 19 is a flowchart of a fifth particular embodiment of a method of operation of the audio processing device of FIGS. 1-3.

FIG. 19 is a flowchart of a fifth particular embodiment of a method of operation of the audio processing device of FIGS. 1-3. As described with reference to FIGS. 1-3, the audio processing device may be a component of a television (such as a "smart" television that includes a processor capable of executing a teleconferencing application) or another home theater component. The method includes, at 1902, reducing echo during use of a home theater system by applying beamforming parameters to audio data received from an audio input array associated with the home theater system. The beamforming parameters may be determined in a calibration mode of the home theater system. For example, the audio processing component 140 may use beamforming parameters determined based on a DOA of the loudspeaker 106 to generate the null 150 in the audio data. The null 150 may suppress audio data associated with the DOA of the loudspeaker 106, thereby reducing echo associated with acoustic output of the loudspeaker 106 received at the microphone array 130.

Figure 20:
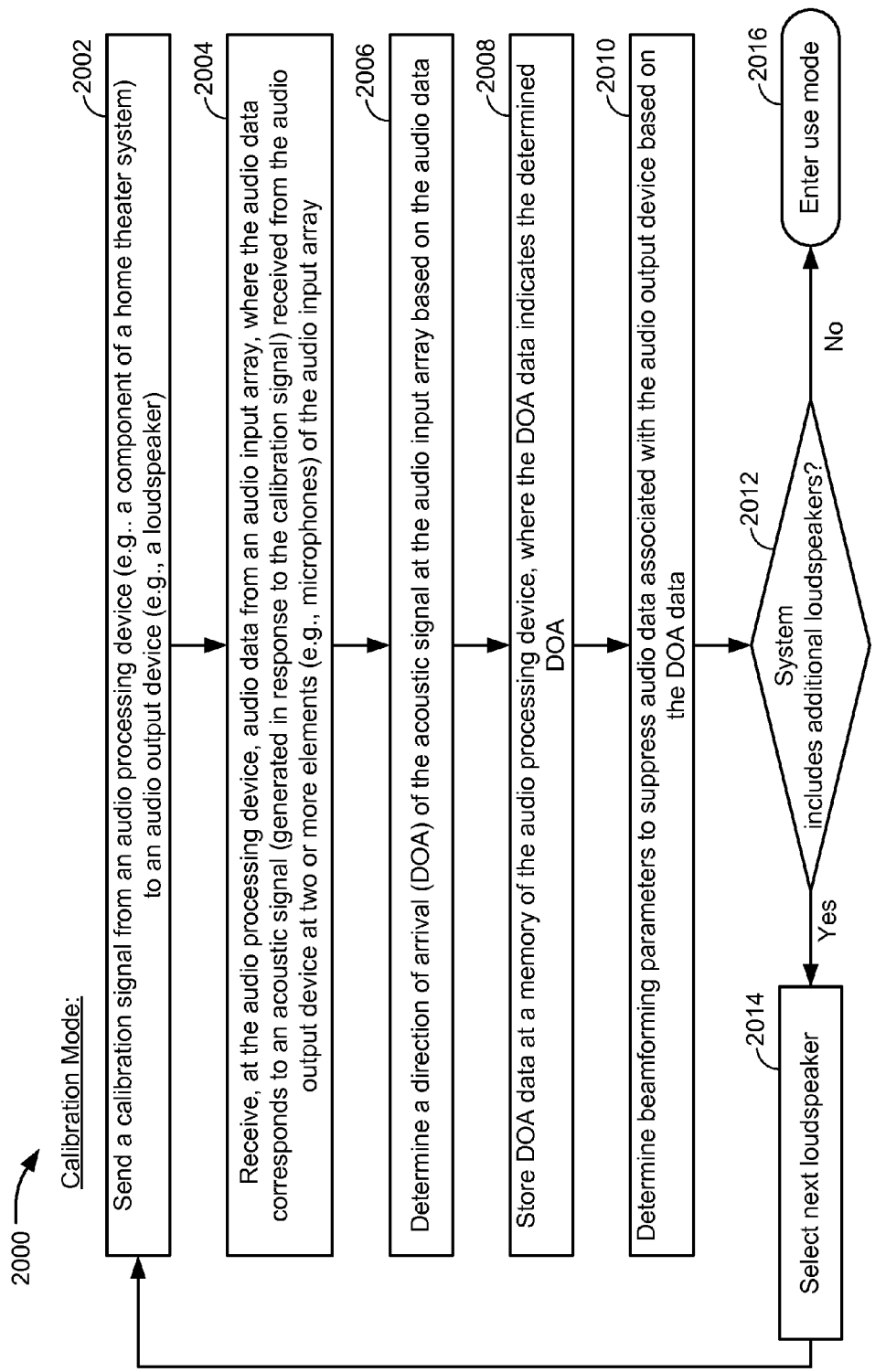
FIG. 20 is a flowchart of a sixth particular embodiment of a method of operation of the audio processing device of FIGS. 1-3.

FIG. 20 is a flowchart of a sixth particular embodiment of a method of operation of the audio processing device of FIGS. 1-3. As described with reference to FIGS. 1-3, the audio processing device may be a component of a television (such as a "smart" television that includes a processor capable of executing a teleconferencing application) or another home theater component. The method of FIG. 20 may be performed while an audio processing device is operating in a calibration mode.

The method includes sending a calibration signal from an audio processing device to the audio output device, at 2002. The acoustic signal is generated by the audio output device in response to the calibration signal. For example, the calibration signal may be the white noise signal 201 of FIG. 2 and the acoustic signal may include acoustic white noise generated by the speaker 202 in response to the white noise signal 201.

The method may also include receiving, at the audio processing device, audio data from an audio input array, at 2004. The audio data corresponds to an acoustic signal received from an audio output device at two or more elements of the audio input array. For example, the audio processing device may be a component of a home theater system, such as the home theater system 100 of FIG. 1, and the audio output device may be a loudspeaker of the home theater system. In this example, the two or more elements of the audio input array may include microphones associated with the home theater system, such as microphones of the microphone array 130 of FIG. 1.

The method also includes, at 2006, determining a direction of arrival (DOA) of the acoustic signal at the audio input array based on the audio data. For example, the DOA may be determined as described with reference to FIGS. 6A-16C. The method may also include, at 2008, storing DOA data at a memory of the audio processing device, where the DOA data indicates the determined DOA. The method may further include, at 2010, determining beamforming parameters to suppress audio data associated with the audio output device based on the DOA data.

The method may include, at 2012, determining whether the home theater system includes additional loudspeakers. When the home theater system does not include additional loudspeakers, the method ends, at 2016, and the audio processing device is ready to enter a use mode (such as the use mode described with reference to FIG. 21). When the home theater system does include additional loudspeakers, the method may include selecting a next loudspeaker, at 2014, and repeating the method with respect to the selected loudspeaker. For example, the calibration signal may be sent to a first loudspeaker during a first time period, and, after the first time period, a second calibration signal may be sent from the audio processing device to a second audio output device (e.g., the selected loudspeaker). In this example, second audio data may be received at the audio processing device from the audio input array, where the second audio data corresponds to a second acoustic signal received from the second audio output device at the two or more elements of the audio input array. A second DOA of the second acoustic signal at the audio input array may be determined based on the second audio data. Afterwards, the audio processing device may enter the use mode or select yet another loudspeaker and repeat the calibration process for the other loudspeaker.

Figure 21:
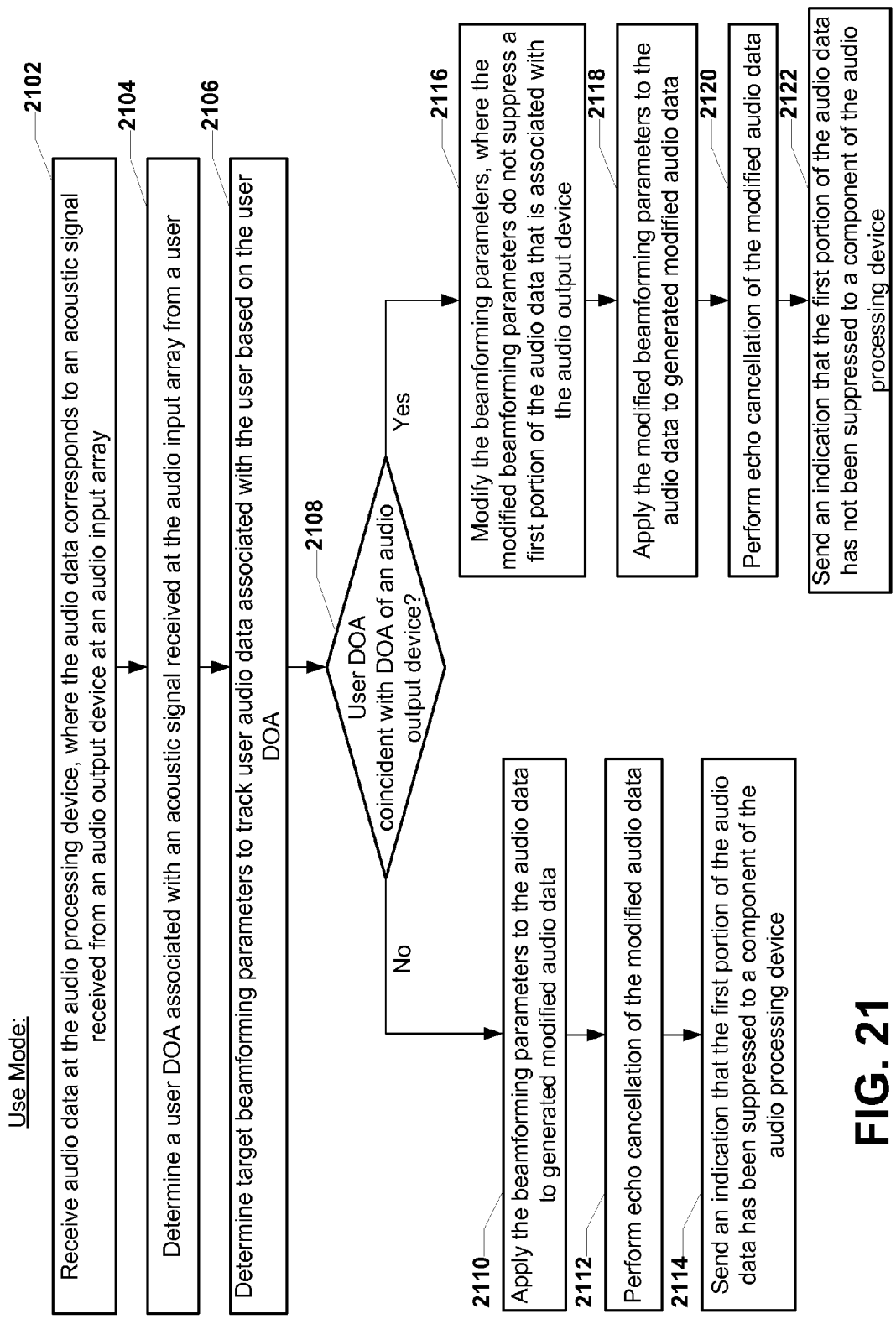
FIG. 21 is a flowchart of a seventh particular embodiment of a method of operation of the audio processing device of FIGS. 1-3.

FIG. 21 is a flowchart of a seventh particular embodiment of a method of operation of the audio processing device of FIGS. 1-3. As described with reference to FIGS. 1-3, the audio processing device may be a component of a television (such as a "smart" television that includes a processor capable of executing a teleconferencing application) or another home theater component. The method of FIG. 21 may be performed while an audio processing device is operating in a use mode (e.g., at least after storing the DOA data, at 2008 of FIG. 20.

The method includes, at 2102, receiving audio data at the audio processing device. The audio data corresponds to an acoustic signal received from an audio output device at an audio input array. For example, the audio data may be received from the microphone array 204 of FIG. 3 in response to an acoustic signal generated by the speaker 202 in response to the signal 302.

The method may include, at 2104, determining a user DOA, where the user DOA is associated with an acoustic signal (e.g., voice input) received at the audio input array from a user 122. The user DOA may also be referred to herein as a target DOA. The method may include, at 2106, determining target beamforming parameters to track user audio data associated with the user 122 based on the user DOA. For example, the target beamforming parameters may be determined as described with reference to FIGS. 14A-16B.

The method may include, at 2108, determining whether the user DOA is coincident with the DOA of the acoustic signal from the audio output device. For example, in FIG. 1, the user DOA of the user 122 is not coincident with the DOA of any of the loudspeakers 103-109; however, if the user 122 moved a bit to his or her left, the user DOA of the user 122 would be coincident with the DOA associated with the loudspeaker 108.

In response to determining that the user DOA is not coincident with the DOA of the acoustic signal from the audio output device, the method may include, at 2110, applying the beamforming parameters to the audio data to generated modified audio data. In a particular embodiment, the audio data may correspond to acoustic signals received at the audio input array from the audio output device and from one or more additional audio output devices, such as the loudspeakers 103-109 of FIG. 1. In this embodiment, applying the beamforming parameters to the audio data may suppress a first portion of the audio data that is associated with the audio output device and may not eliminate a second portion of the audio data that is associated with the one or more additional audio output devices. To illustrate, referring to FIG. 1, the microphone array 130 may detect acoustic signals from each of the loudspeakers 103-109 to form the audio data. The audio data may be modified by applying beamforming parameters to generate the nulls 150-156 to suppress (e.g., eliminate) a portion of the audio data that is associated with the DOAs of the front loudspeakers 106-109; however, the portion of the audio data that is associated with the rear facing loudspeakers 103-105 and the subwoofer may not be suppressed, or may be partially suppressed, but not eliminated.

The method may also include, at 2112, performing echo cancellation of the modified audio data. For example, the echo processing components 322 of FIG. 3 may perform echo cancellation on the modified audio data. The method may include, at 2114, sending an indication that the first portion of the audio data has been suppressed to a component of the audio processing device. For example, the indication may include the pass indicator of FIG. 5. In a particular embodiment, echo cancellation may be performed on the audio data before the beamforming parameters are applied rather than after the beamforming parameters are applied. In this embodiment, the indication that the first portion of the audio data has been suppressed may not be sent.

In response to determining that the user DOA is coincident with the DOA of the acoustic signal from the audio output device, the method may include, at 2116, modifying the beamforming parameters before applying the beamforming parameters to the audio data. The beamforming parameters may be modified such that the modified beamforming parameters do not suppress a first portion of the audio data that is associated with the audio output device. For example, referring to FIG. 1, when the user DOA of the user 122 is coincident with the DOA of the loudspeaker 108, the beamforming parameters may be modified such that audio data associated with the DOA of the loudspeaker 108 is not suppressed (e.g., to avoid also suppressing audio data from the user 122). The modified beamforming parameters may be applied to the audio data to generate modified audio data, at 2118. Audio data associated with one or more DOAs, but not the DOA that is coincident with the user DOA, may be suppressed in the modified audio data. To illustrate, continuing the previous example, the audio data may be modified to suppress a portion of the audio data that is associated with the loudspeakers 106, 107 and 109, but not the loudspeaker 108, since the DOA of the loudspeaker 108 is coincident with the user DOA in this example.

The method may include, at 2120, performing echo cancellation of the modified audio data. The method may also include, at 2122, sending an indication that the first portion of the audio data has not been suppressed to a component of the audio processing device. The indication that the first portion of the audio data has not been suppressed may include the fail indicator of FIG. 5.

Accordingly, embodiments disclosed herein enable echo cancellation in circumstances where multiple audio output devices, such as loudspeakers, are sources of echo. Further, the embodiments reduce computation power used for echo cancellation by using beamforming to suppress audio data associated with one or more of the audio output devices.

Figure 22:
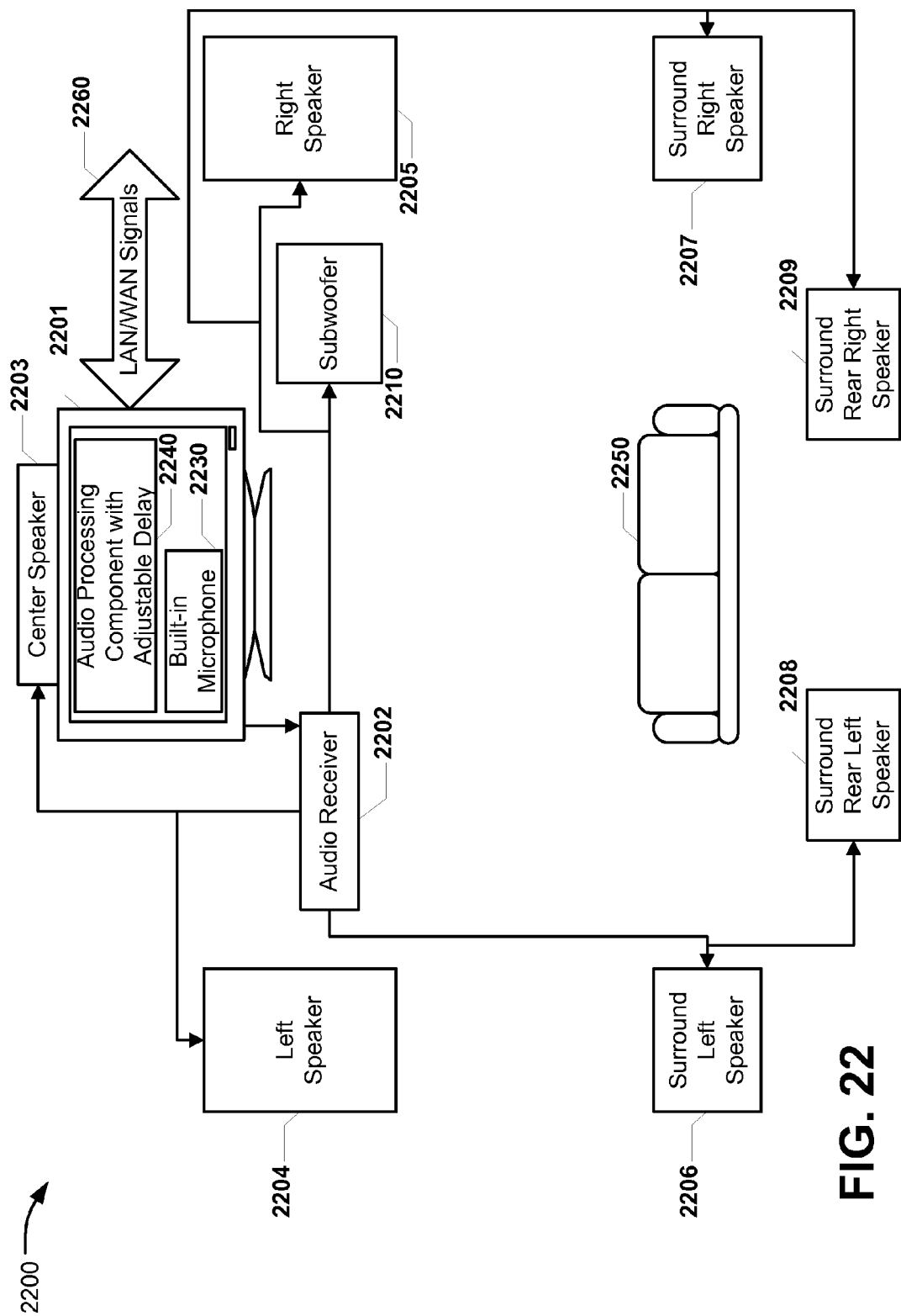
FIG. 22 is a block diagram of a particular illustrative embodiment of a home theater system adapted for teleconferencing.

B. Systems, Methods and Apparatus for Audio Signal Processing Device Calibration Using Acoustic Coupling Delays FIG. 22 is a block diagram of a particular illustrative embodiment of a home theater system 2200 adapted for teleconferencing (e.g., audio or video teleconferencing). The home theater system 2200 may include an electronic device 2201 (e.g., a television) coupled to an external audio receiver 2202. For example, the electronic device 2201 may be a networking-enabled "smart" television that is capable of communicating local area network (LAN) and/or wide area network (WAN) signals 2260. The electronic device 2201 may include a built-in microphone 2230 and an audio processing component 2240. The audio processing component 2240 may be operable to implement an adjustable delay for use in echo cancellation (e.g., during audio and/or video conferencing scenarios), as further described herein.

The audio receiver 2202 may receive audio signals from an audio output of the electronic device 2201, process the audio signals and send signals to each of a plurality of external speakers and/or a subwoofer for output. For example, the audio receiver 2202 may receive a composite audio signal from the electronic device 2201 via a multimedia interface, such as a high-definition multimedia interface (HDMI). The audio receiver 2202 may process the composite audio signal to generate separate audio signals for each speaker and or subwoofer. In the embodiment of FIG. 22, seven speakers 2203-2209 and a subwoofer 2210 are shown. It should be noted, however, that the embodiments of the present disclosure may include more or fewer speakers and/or subwoofers.

When a user sets up the electronic device 2201, the audio receiver 2202, the speakers 2203-2209 and the subwoofer 2210, the user may position each component relative to a primary seating area 2250, as shown. In audio/video conferencing scenarios in which the microphone and speaker(s) are located close to each other or are incorporated into a single device, the delay between near-end and far-end signals is typically within an expected echo cancellation range. Thus, an echo cancellation device (e.g., an adaptive filter) receiving the near-end and far-end signals may be capable of performing acoustic echo cancellation. However, in home theater systems, the speaker-microphone distances and the presence of the audio receiver 2202 may increase the delay between the near-end and far-end signals to an extent that a conventional adaptive filter can no longer perform acoustic echo cancellation effectively. For example, the adaptive filter may no longer be able to converge.

To implement acoustic echo cancellation in the home theater system 2200 of FIG. 22, the audio processing component 2240 may be configured to operate in a calibration mode. For example, the calibration mode may be initiated based on user input or automatically upon detecting a configuration change (e.g., an addition or removal of a component of the home theater system). During operation in the calibration mode, the electronic device 2201 may output a predetermined fixed duration audio pattern (e.g., five seconds of white noise) to the audio receiver 2202, which may process the audio pattern and provide signals to the speakers 2203-2209 and the subwoofer 2210. The microphone 2230 may receive audio signals output from the speakers 2203-2209 and the subwoofer 2210. The audio processing component 2240 may determine a delay between the signal output by the electronic device 2201 and the signal received by the microphone 2230, as further described with reference to FIG. 23. After determining the delay, calibration is complete.

During operation in a non-calibration (e.g., use) mode after calibration is complete, the audio processing component 2240 may delay the far-end signals provided to an echo cancellation device of the audio processing component 2240 based on the delay determined during the calibration mode. Operation in the use mode is further described with reference to FIG. 24.

When a subsequent configuration change is detected (e.g., a different audio receiver or a different speaker is introduced into the home theater system 2200), the calibration mode may be initiated again and a new adjustable delay may be determined by the audio processing component 2240.

It will be appreciated that by delaying the far-end signals provided to the echo cancellation device, the echo cancellation device may operate within the expected echo cancellation range. Thus, acoustic echo cancellation and other post-processing operations (e.g., noise suppression) may be performed successfully in the home theater system 2200.

Figure 23:
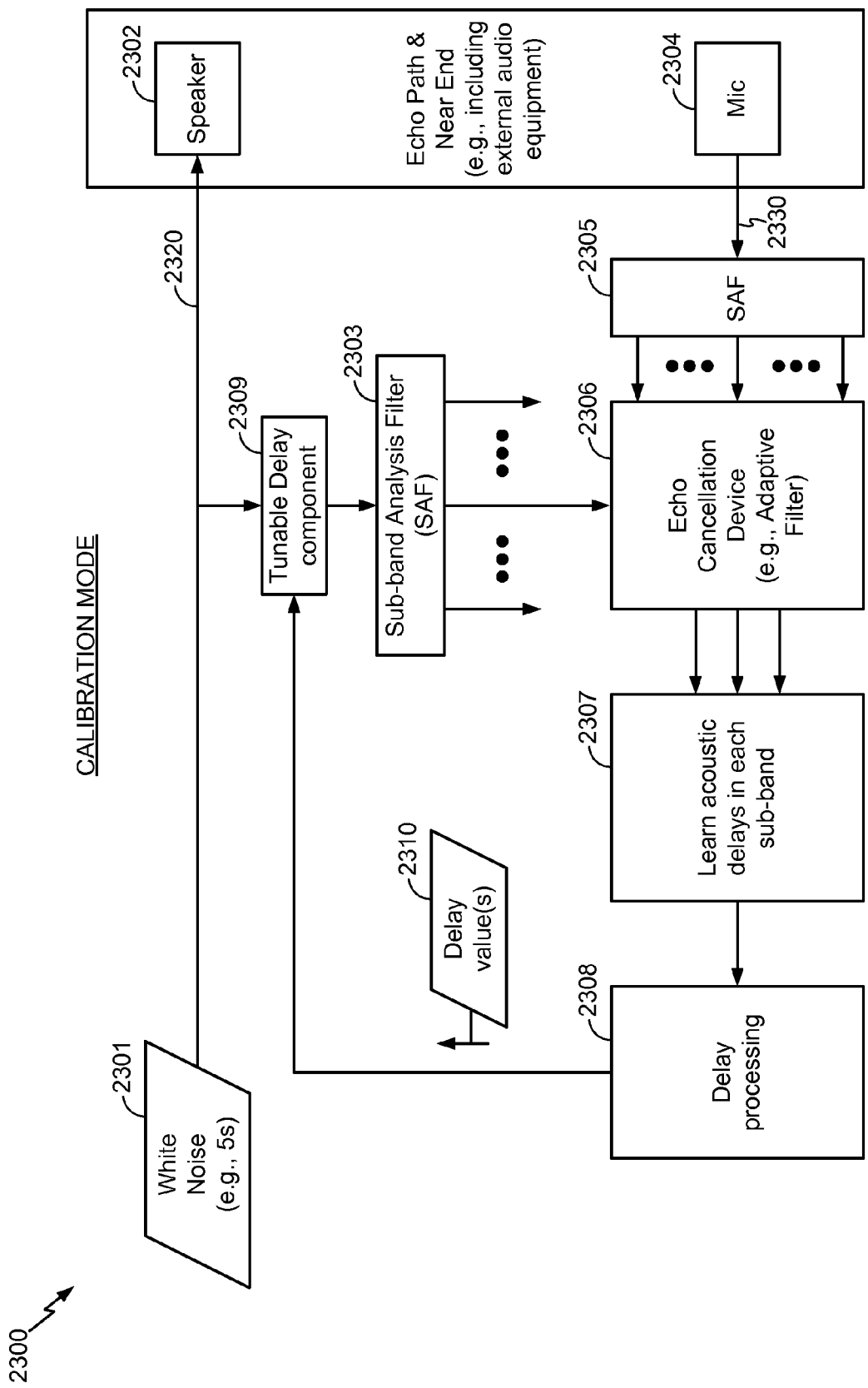
FIG. 23 is a block diagram of a particular illustrative embodiment of an audio processing device operating in a calibration mode.

FIG. 23 is a block diagram of a particular illustrative embodiment of an audio processing device 2300 operating in a calibration mode. In some implementations, the calibration mode may be a first calibration mode. In some implementations, the audio processing device 2300 may include or be included within one or more of the electronic devices described in connection with FIG. 32. The audio processing device may include or be included in the audio processing component with adjustable delay 2240 of FIG. 22. The audio processing device 2300 includes an audio output interface 2320 that is configured to be coupled to one or more acoustic output devices (such as a speaker 2302). For example, the audio output interface 2320 may include an audio bus coupled to or terminated by one or more speaker connectors, a multimedia connector (such as a high definition multimedia interface (HDMI) connector), or a combination thereof. Although more than one speaker may be present, the description that follows refers to the speaker 2302 to simplify the description. The audio processing device 2300 may also include an audio input interface 2330 that is configured to be coupled to one or more acoustic input devices (such as a microphone 2304). For example, the audio input interface 2330 may include an audio bus coupled to or terminated by one or more microphone connectors, a multimedia connector (such as an HDMI connector), or a combination thereof. Although more than one microphone may be present, the description that follows refers to the microphone 2304 to simplify the description.

During a teleconference call, the microphone 2304 may detect speech output by a user. However, sound output by the speaker 2302 may also be received at the microphone 2304 causing echo. The audio processing device 2300 may include an echo cancellation device 2306 (e.g., an adaptive filter, an echo suppressor, or another device or component operable to reduce echo) to process a received audio signal from the audio input interface 2330 to reduce echo. Depending on where a user positions the speaker 2302 and the microphone 2304, the delay between the speaker 2302 and the microphone 2304 may be too large for the echo cancellation device 2306 to effectively reduce the echo (as a result of electrical signal propagation delays, acoustic signal propagation delays, or both). In a particular embodiment, the audio processing device 2300 includes a tunable delay component 2309. The tunable delay component 2309 may be tuned (during the calibration mode) to adjust a delay in providing an output signal of the audio processing device 2300 (e.g., a signal from the audio output interface 2320) to the echo cancellation device 2306 to adjust an overall echo cancellation processing capability of the audio processing device to accommodate the delay. When more than one speaker, more than one microphone, or both, are present, delays between various speaker and microphone pairs may be different. In this case, the tunable delay component 2309 may be adjusted to a delay value that enables the echo cancellation device 2306 to reduce echo associated with each speaker and microphone pair.

In a particular embodiment, the echo cancellation device 2306 includes a plurality of echo cancellation circuits. Each of the plurality of echo cancellation circuits may be configured to reduce echo in a sub-band of a received audio signal. Note that while the received audio signal is relatively narrowband (e.g., about 8 KHz within a human auditory range), the sub-bands are still narrower bands. For example, the audio processing device 2300 may include a first sub-band analysis filter 2305 coupled to the audio input interface 2330. The first sub-band analysis filter 2305 may divide the received audio signal into a plurality of sub-bands (e.g., frequency ranges) and provide each sub-band of the received audio signal to a corresponding echo cancellation circuit of the echo cancellation device 2306. The audio processing device 2300 may also include a second sub-band analysis filter 2303 coupled between the audio output interface 2320 and the echo cancellation device 2306. The second sub-band analysis filter 2303 may divide an output signal of the audio processing device 2300 (such as white noise signal 201 when the audio processing device is in the calibration mode) into the plurality of sub-bands (e.g., frequency ranges) and provide each sub-band of the output signal to a corresponding echo cancellation circuit of the echo cancellation device 2306.

To illustrate, in the calibration mode, the audio processing device 2300 may output a calibration signal, such as the white noise signal 2301 for a time period (e.g., 5 seconds), to the speaker 2302 via the audio output interface 2320. The calibration signal may also be provided to the second sub-band analysis filter 2303 to be divided into output sub-bands. In the calibration mode, the tunable delay component 2309 is typically not used. That is, the calibration signal is provided to the second sub-band analysis filter 2303 and the echo cancellation device 2306 with delay imposed by the tunable delay component 2309. In response to the white noise signal 2301, the speaker 2302 may generate acoustic white noise, which may be detected at the microphone 2304. The white noise detected at the microphone 2304 may be modified by a transfer function (associated, for example, with echo paths and near end audio paths) that is related to relative positions of the speaker 2302 and the microphone 2304. A detected white noise signal may be provided by the microphone 2304 to the audio input interface 2330. The detected white noise signal may be divided into input sub-bands by the first sub-band analysis filter 2305. Echo cancellation circuits of the echo cancellation device 2306 may process the input sub-bands (based on the detected white noise signal) and the output sub-bands (based on the white noise signal) to estimate delay associated with each sub-band. Note that using sub-bands of the signals enables the echo cancellation device 2306 to converge more quickly than if the full bandwidth signals were used. In a particular embodiment, a delay estimation module 2307 learns (e.g., determines) acoustic delays for each sub-band (as described further with reference to FIGS. 25 and 26). A delay processing component 2308 determines a delay value or delay values 2310 that are provided to the tunable delay component 2309. As illustrated in FIG. 23, the delay value includes an overall acoustic delay for the system (including the audio processing device 2300, the speaker 2302, the microphone 2304 and the echo paths and near end audio paths). For example, the overall acoustic delay may be an average of the sub-band delays, a maximum of the sub-band delays, a minimum of the sub-band delays, or another function of the sub-band delays. In other embodiments, a plurality of tunable delay components 2309 may be provided between the second sub-band analysis filter 2303 and the echo cancellation device (rather than or in addition to the tunable delay component illustrate in FIG. 23 between the second sub-band analysis filter 2303 and the audio output interface 2320). In such embodiments, the delay value or delay values 2310 may include a delay associated with each sub-band. After the calibration mode is complete, in a use mode, subsequent signals from the audio output interface 2320 to the echo cancellation device 2306 may be delayed by the tunable delay component 2309 (or tunable delay components) by an amount that corresponds to the delay value or delay values 2310.

Figure 24:
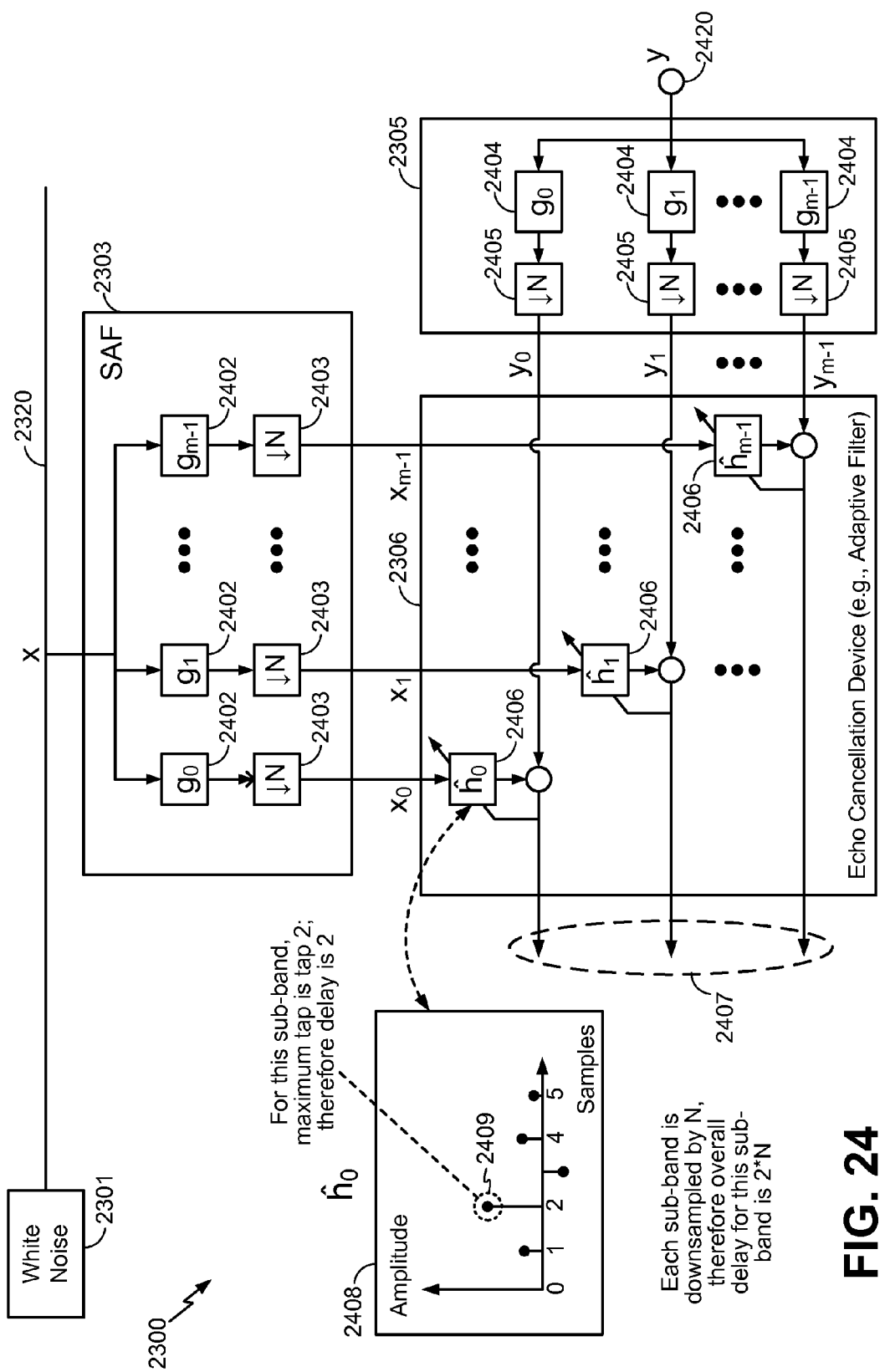
FIG. 24 is a block diagram of a particular illustrative embodiment of the audio processing device of FIG. 23 operating in a use mode.

FIG. 24 is a block diagram of a particular illustrative embodiment of the audio processing device 2300 operating in a calibration mode showing additional details regarding determining delay values. The white noise signal (x) 2301 is fed into a first sub-band analysis filter 2303 producing M sub-band signals. The sub-band analysis filters 2303 and 2305 may be implemented in a variety of ways. FIG. 24 illustrates one particular, non-limiting example of a manner of implementing a sub-band analysis filter. In a particular embodiment, the first sub-band analysis filter 2303 works as follows. The white noise signal (x) 2301 is filtered through a parallel set of M band pass filters 2402 to produce M sub-band signals. Each sub-band signal has a bandwidth that is 1/M times the original bandwidth of the signal. The sub-band signals may be down-sampled, because the Nyquist-Shannon theorem indicates that perfect reconstruction of a signal is possible when the sampling frequency is greater than twice the maximum frequency of the signal being sampled. Thus, the signal in each sub-band can be down-sampled, at 2403, by a factor of N (N<=M). In other words each sample in the sub-band domain occupies the time duration of N samples in the original signal.

A detected white noise signal (y) 2420 picked up by an audio input device, such as the microphone 2304, is also passed through a first sub-band analysis filter 2305 to produce M sub-band signals. The detected white noise signal (y) 2420 is filtered through a parallel set of M band pass filters 2404 to produce M sub-band signals. The signal in each sub-band can be down-sampled, at 2405, by a factor of N (N<=M).

In a particular embodiment, the echo cancellation device 2306 includes an adaptive filter 2406 that runs in each of the sub-bands to cancel the echo in the respective sub-band. The adaptive filter 2406 in each sub-band suppresses the portion of the detected white noise signal (y) 2420 that is correlated with white noise signal (x) 2301. The adaptive filter 2406 in each sub-band tries to model room response plus any additional delay that may be present in the signal propagation from x to y, thereby generating an estimate of the echo, which is then subtracted from the detected white noise signal (y) 2420 to transmit an echo free signal (e.g., signals 2407) to the far-end.

An adaptive filter coefficient represents the multiple reflections/propagation paths from the loudspeaker to the microphone with the largest coefficient representing the direct path plus any delay from the speaker 2302 to the microphone 2304 in FIG. 23. A largest amplitude adaptive filter coefficient tap location represents the delay (in samples) between the white noise signal (x) 2301 and the detected white noise signal (y) 2420. Each sample in the sub-band domain occupies the time duration of N samples in the original signal. Thus, the overall delay, in terms of sample value of the original signal, is tap location of the largest amplitude adaptive filter coefficient times the down-sampling factor. For example, in FIG. 24, the largest tap location 2409 is at tap 2 as indicated in the graph 2408, and the down-sampling factor is N, thus the overall delay is 2N.

Figure 25:
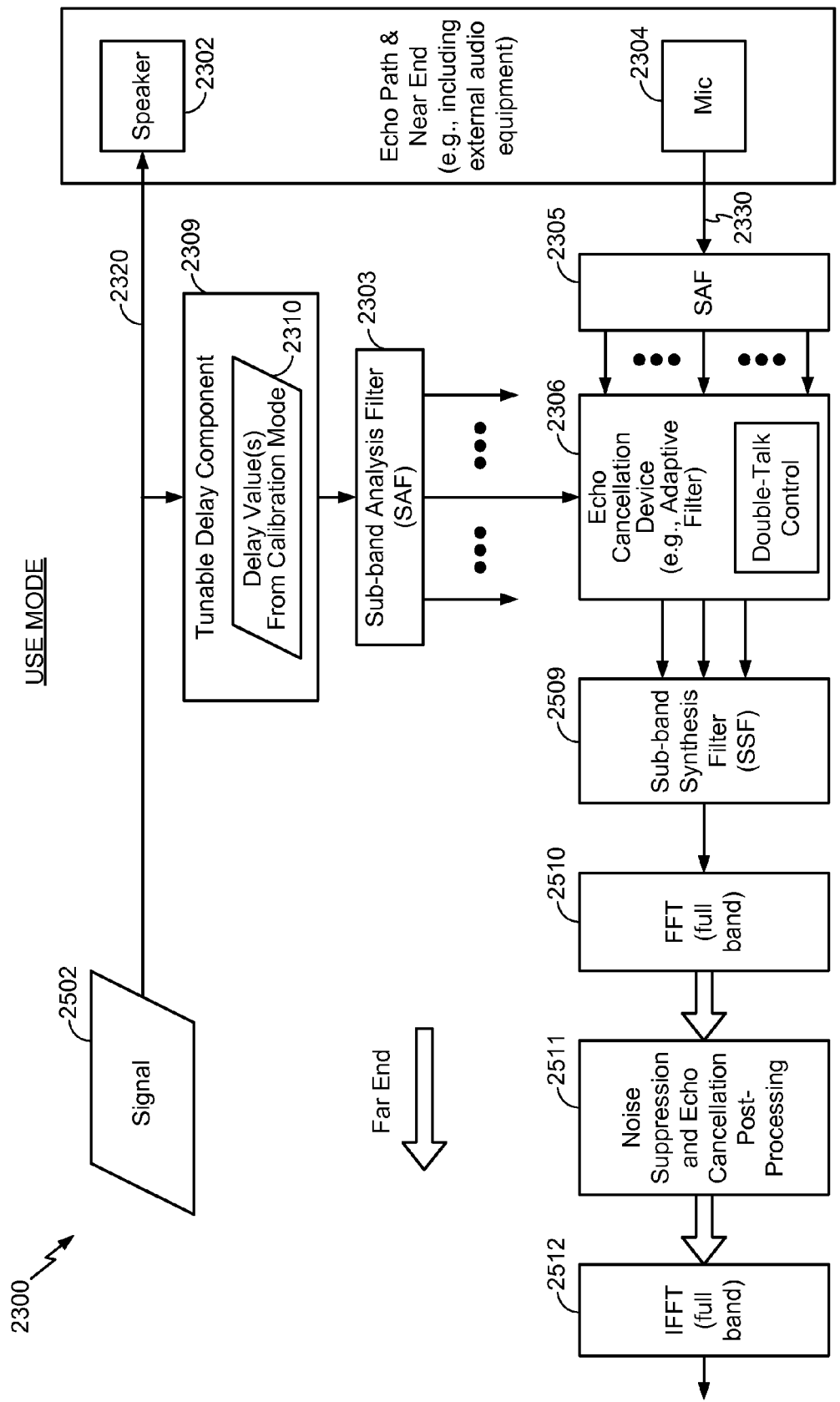
FIG. 25 is a block diagram of a particular illustrative embodiment of the audio processing device of FIG. 23 operating in a use mode.

FIG. 25 is a block diagram of a particular illustrative embodiment of the audio processing device 2300 operating in a use mode. For example, the audio processing device 2300 may operate in the use mode during a teleconference after calibration using the calibration mode.

In the use mode, a signal 2502 may be received from a far end (e.g., audio input received from another party to a teleconference call). The signal 2502 may be provided to the speaker 2302 via the audio output interface 2320. The speaker 2302 may generate an output acoustic signal responsive to the signal 2502. A received acoustic signal at the microphone may include the output acoustic signal as modified by a transfer function as well as other audio (such as speech from a user at the near end). The received signal corresponding to the received acoustic signal may be output by the microphone to the audio input interface 2330. Thus, the received signal may include echo from the signal 2502.

In a particular embodiment, the signal 2502 is provided to the tunable delay component 2309. The tunable delay component 2309 may delay providing the signal 2502 for subsequent processing for a delay amount corresponding to the delay value or delay values 2310 from the calibration mode. In this embodiment, after the delay, the tunable delay component 2309 provides the signal 2502 to echo cancellation components to reduce the echo. For example, the signal 2502 may be provided to the second sub-band analysis filter 2303 to be divided into output sub-bands, which are provided to the echo cancellation device 2306. In this example, the received signal from the audio input interface 2330 may be provided to the first sub-band analysis filter 2305 to be divided into input sub-bands, which are also provided to the echo cancellation device 2306. The input sub-bands and output sub-bands are processed to reduce echo and to form echo corrected sub-bands, which are provided to the sub-band synthesis filter 2509 to be joined to form an echo cancelled received signal. In another example, a full bandwidth of the signal 2502 (rather than a set of sub-bands of the signal 2502) may be provided to echo cancellation device. That is, the second sub-band analysis filter 2303 may be bypassed. In this example, a full bandwidth of the received signal from the audio input interface 2330 may also be provided to the echo cancellation device 2306. That is, the first sub-band analysis filter 2305 may be bypassed. Thus, in this example, the echo may be reduced over the full bandwidth (in a frequency domain or an analog domain) rather than by processing a set of sub-bands.

In another embodiment, a plurality of tunable delay components (each with a corresponding delay value) are placed between the second sub-band analysis filter 2303 and the echo cancellation device 2306. In this embodiment, the signal 2502 is provided to the second sub-band analysis filter 2303 to be divided into output sub-bands, which are then delayed by particular amounts by the corresponding tunable delay components before being provided to the echo cancellation device 2306.

When echo cancellation is performed on individual sub-bands (rather than on the full bandwidth of the received signal from the audio input interface 2330), the audio processing device 2300 may include a sub-band synthesis filter 2509 to combine the sub-bands to form a full bandwidth echo cancelled received signal. In a particular embodiment, additional echo cancellation and noise suppression are performed by providing the echo cancelled received signal to a full-band fast Fourier transform (FFT) component 2510, a frequency space noise suppression and echo cancellation post-procession component 2511 and an inverse FFT component 2512 before sending the signal to the far end. Alternately, or in addition, additional analog domain audio processing may be performed.

Figure 26:
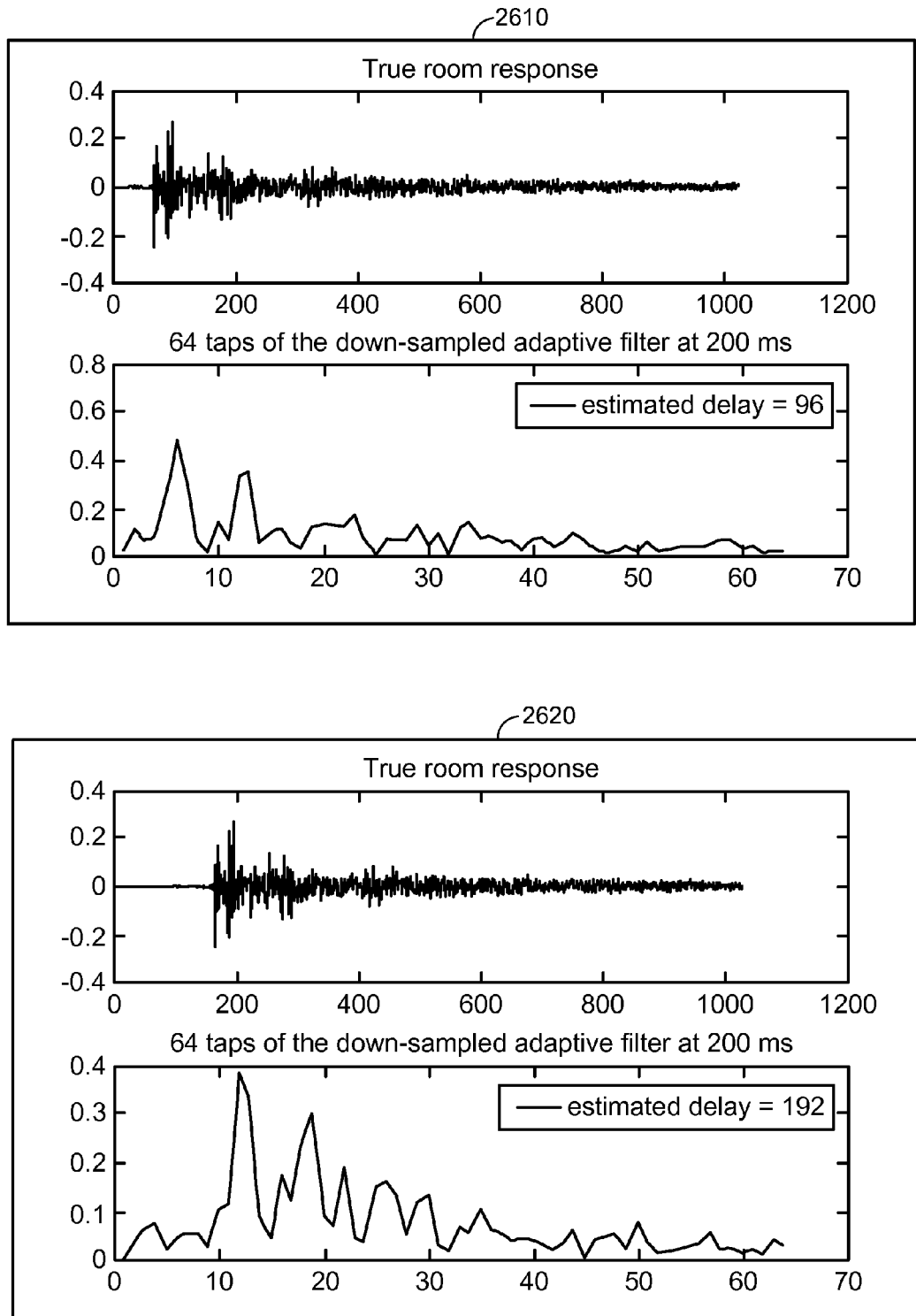
FIG. 26 illustrates charts of simulated true room responses showing first and second delays and simulated down-sampled adaptive filter outputs associated with the simulated true room responses.

FIGS. 26 and 27 illustrate charts of simulated true room response delays and simulated down-sampled echo cancellation outputs associated with the simulated true room responses for a particular sub-band. The simulated true room responses correspond to a single sub-band of an audio signal received at a microphone, such as the microphone 2304 of FIGS. 23-25, in response to an output acoustic signal from a speaker, such as the speaker 2302 of FIGS. 23-25. The simulated true room responses show the single sub-band of the output acoustic signal as modified by a transfer function that is related to relative positions of the speaker and the microphone (and potentially to other factors, such as presence of objects that reflect the output acoustic signal). In a first chart 2610, the microphone detects the sub-band after a first delay. By down-sampling an output of the echo cancellation device, an estimated delay of 96 milliseconds is calculated for the sub-band. In a particular embodiment, the estimated delay is based on a non-zero value of a tap weight in an adaptive filter (of an echo cancellation device). For example, a largest tap weight of the single sub-band of the output acoustic signal shown in the first chart 2610 may be used to calculate the estimated delay. The estimated delay associated with the sub-band of the first chart 2610 may be used with other estimated delays associated with other sub-bands to generate an overall estimated delay during the calibration mode of FIG. 23. For example, the overall estimated delay may correspond to a largest delay associated with one of the sub-bands, a smallest delay associated with one of the sub-bands, and average (e.g., mean, median or mode) delay of the sub-bands, or another function of the estimated delays of the sub-bands. A second chart 2620, a third chart 2710 of FIG. 27, and a fourth chart 2720 of FIG. 27 illustrates progressively larger delays associated with the sub-band in both the true room response and the simulated down-sampled echo cancellation outputs.

Figure 28:
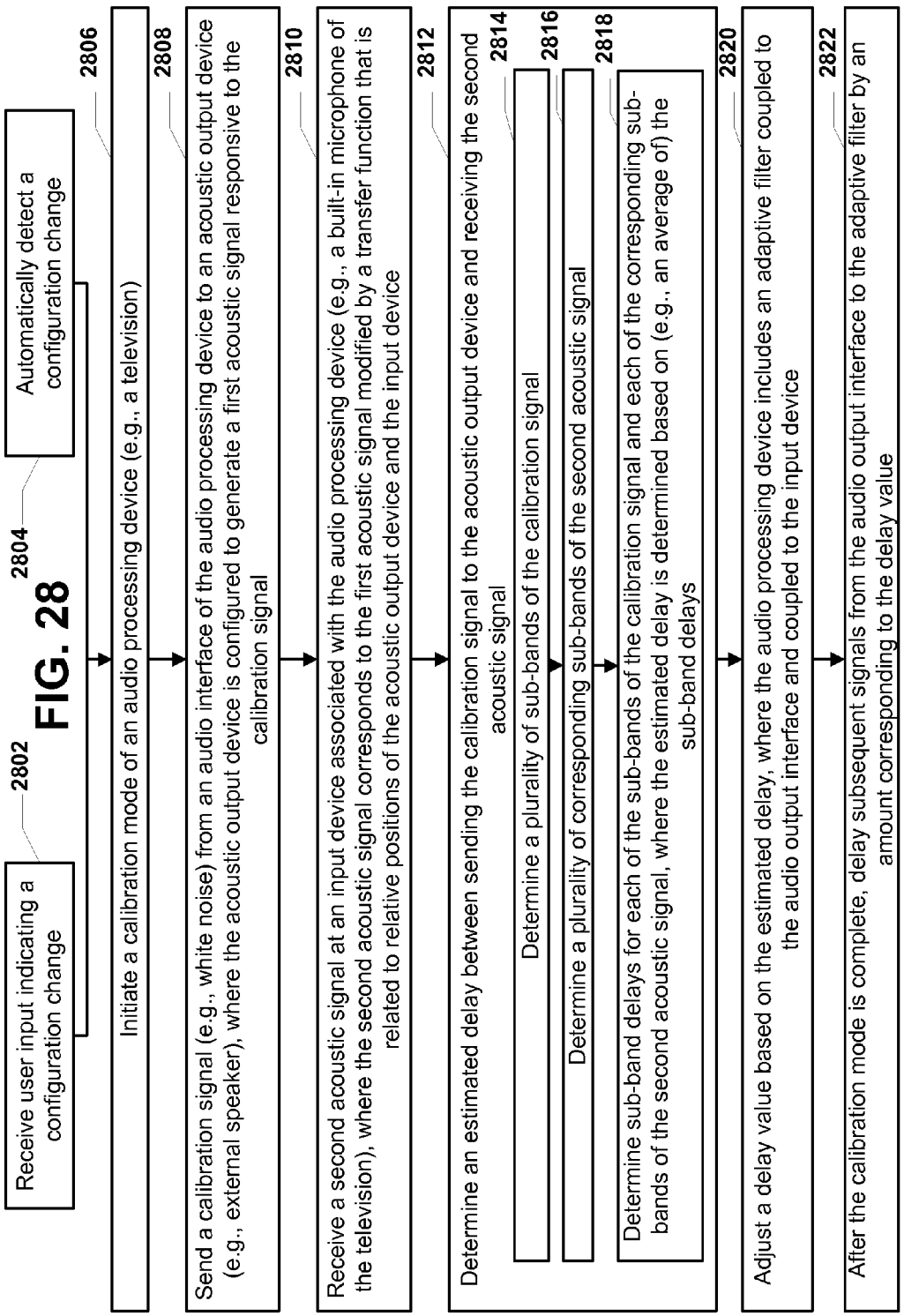
FIG. 28 is a flowchart of a first particular embodiment of a method of operation of the audio processing device of FIGS. 22-25.

FIG. 28 is a flowchart of a first particular embodiment of a method 2800 of operation of the audio processing device of FIGS. 22-25. As described with reference to FIGS. 22-25, the audio processing device may be a component of a television (such as a "smart" television that includes a processor capable of executing a teleconferencing application) or another home theater component.

The method 2800 includes initiating a calibration mode of the audio processing device, at 2806. For example, the calibration mode may be initiated in response to receiving user input indicating a configuration change, at 2802, or in response to automatically detecting a configuration change, at 2804. The configuration change may be associated with the home theater system, with the audio processing device, with an acoustic output device, with an input device, or with a combination thereof. For example, the configuration change may include coupling a new component to the home theater system or removing a component from the home theater system.

The method 2800 also includes, at 2808, in response to initiation of the calibration mode of the audio processing device, sending a calibration signal (such as white noise) from an audio output interface of the audio processing device to an acoustic output device (e.g., an external speaker). The acoustic output device is configured to generate a first acoustic signal responsive to the calibration signal.

The method 2800 also includes, at 2810, receiving a second acoustic signal at an input device (e.g., a built-in microphone of the television or other home theater component used for teleconferencing) associated with the audio processing device. The second acoustic signal corresponds to the first acoustic signal as modified by a transfer function that is related to relative positions of the acoustic output device and the input device.

The method 2800 also includes, at 2812, determining an estimated delay between sending the calibration signal to the acoustic output device and receiving the second acoustic signal. For example, estimating the delay may include, at 2814, determining a plurality of sub-bands of the calibration signal, and, at 2816, determining a plurality of corresponding sub-bands of the second acoustic signal. Sub-band delays for each of the plurality of sub-bands of the calibration signal and each of the corresponding sub-bands of the second acoustic signal may be determined, at 2818. The estimated delay may be determined based on the sub-band delays. For example, the estimated delay may be determined as an average of the sub-band delays.

The method 2800 may further include, at 2820, adjusting a delay value based on the estimated delay. As explained with reference to FIGS. 23-25, the audio processing device may include an echo cancellation device 2306 that is coupled to the audio output interface 2320 and coupled to the input device (such as the microphone 2304). In some implementations, the echo cancellation device 2306 may be an adaptive filter. After the calibration mode is complete, subsequent signals (e.g., audio of a teleconference call) from the audio output interface 2320 to the echo cancellation device 2306 (e.g., the adaptive filter) may be delayed by an amount corresponding to the adjusted delay value, at 2822.

FIG. 29 is a flowchart of a second particular embodiment of a method 2900 of operation of the audio processing device of FIGS. 22-25. As described with reference to FIGS. 22-25, the audio processing device may be a component of a television (such as a "smart" television that includes a processor capable of executing a teleconferencing application) or another home theater component. The method 2900 includes estimating 2902 a delay between a microphone and a speaker of a home theater system. For example, acoustic signal propagation delays, electrical signal propagation delays, or both may be estimated between the built-in microphone 2230 of FIG. 22 and one or more of the speakers 2204-2210 of the home theater system 2200. The method 2900 also includes reducing 2904 echo during a conference call using the estimated delay. For example, as explained with reference to FIG. 24, a delay component may delay sending far end signals to an echo cancellation device.

FIG. 30 is a flowchart of a third particular embodiment of a method 3000 of operation of the audio processing device of FIGS. 22-25. As described with reference to FIGS. 22-25, the audio processing device may be a component of a television (such as a "smart" television that includes a processor capable of executing a teleconferencing application) or another home theater component. The method 3000 includes storing 3002 an estimated delay between a microphone and a speaker of a home theater system during a calibration mode of an audio processing device. For example, acoustic signal propagation delays, electrical signal propagation delays, or both may be estimated between the built-in microphone 2230 of FIG. 22 and one or more of the speakers 2204-2210 of the home theater system 2200. A delay value related to the estimated delay may be stored at a tunable delay component and subsequently used to delay sending far end signals to an echo cancellation device to reduce echo during a conference call.

FIG. 31 is a flowchart of a fourth particular embodiment of a method 3100 of operation of the audio processing device of FIGS. 22-25. As described with reference to FIGS. 22-25, the audio processing device may be a component of a television (such as a "smart" television that includes a processor capable of executing a teleconferencing application) or another home theater component. The method 3100 includes reducing 3102 echo during a conference call using an estimated delay, where the estimated delay was determined in a calibration mode of an audio processing device. For example, during the calibration mode, acoustic signal propagation delays, electrical signal propagation delays, or both, associated with the audio processing device may be determined. A delay value related to the estimated delay may be stored at a tunable delay component and subsequently used to delay sending far end signals to an echo cancellation device to reduce echo during a conference call.

C. Systems, Methods and Apparatus for Surround Sound Echo Cancellation

Figure 32:
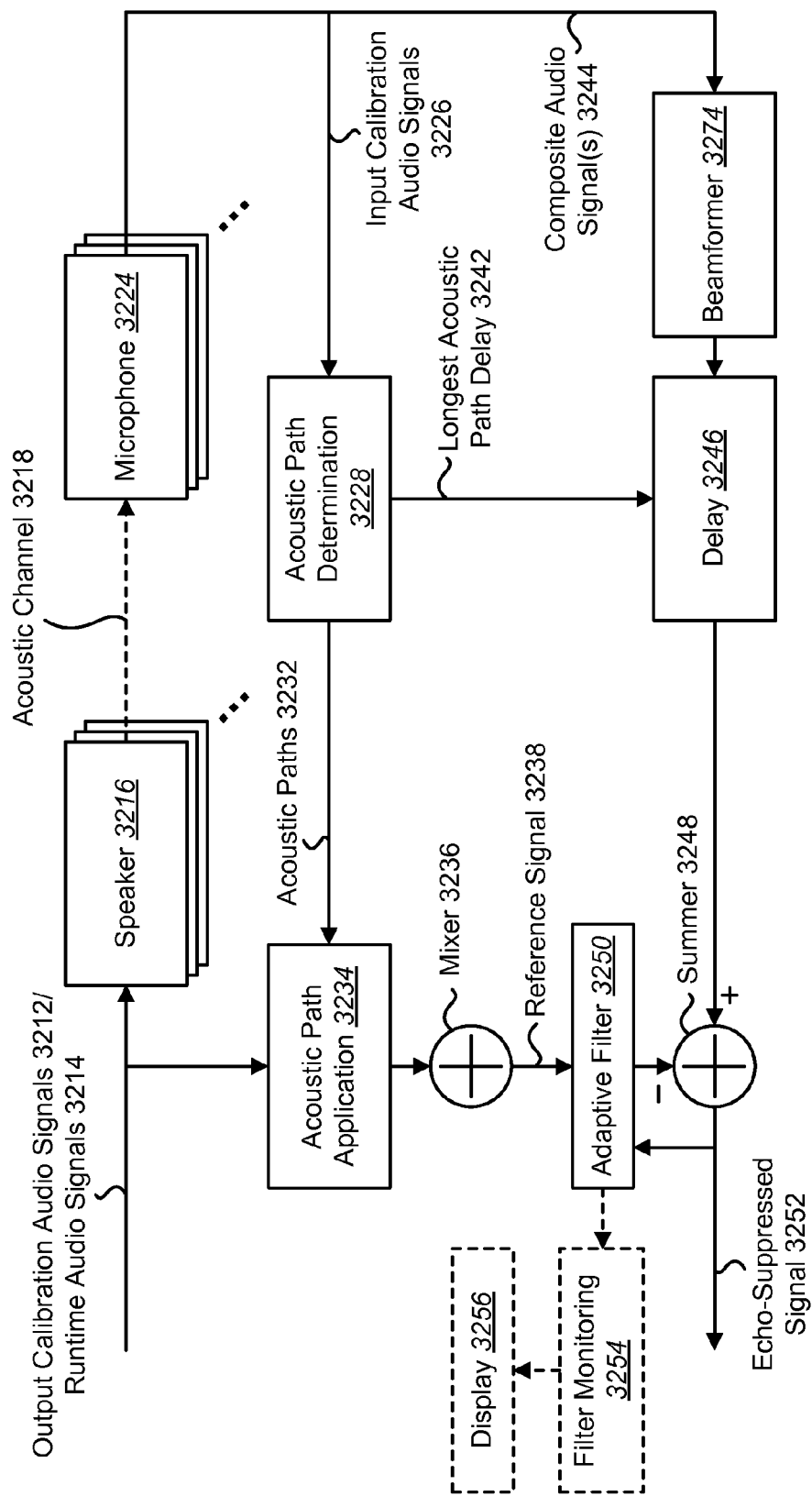
FIG. 32 is a block diagram illustrating one configuration of multiple elements that may be implemented to provide echo reduction in accordance with the systems and methods disclosed herein.

FIG. 32 is a block diagram illustrating one configuration of multiple elements that may be implemented to provide echo reduction in accordance with the systems and methods disclosed herein. The elements illustrated in FIG. 32 may be implemented in and/or may be coupled to one or more electronic devices. For example, one or more of the elements illustrated in FIG. 32 may be implemented in and/or coupled to the audio processing device 140.

In particular, FIG. 32 illustrates multiple speakers 3216, microphones 3224, an acoustic path determination block/module 3228, an acoustic path application block/module 3234, a mixer 3236, an adaptive filter 3250, a summer 3248, a beamformer 3274 and a delay block/module 3246. As used herein, the phrase "block/module" indicates that a particular component may be implemented in hardware (e.g., circuitry), software or a combination of both. For example, the acoustic path determination block/module 3228 may be implemented with hardware components such as circuitry and/or software components such as instructions or code, etc. Additionally, one or more of the components or elements may be implemented in hardware (e.g., circuitry), software, firmware or any combination thereof. For example, the mixer 3236 may be implemented in circuitry (e.g., in an Application-Specific Integrated Circuit (ASIC), a Field-Programmable Gate Array (FPGA) and/or one or more processors, etc.).

In one configuration, one or more of the elements illustrated in FIG. 32 may be implemented in and/or coupled to an audio processing device, such as a television or audio receiver. In another configuration, the microphones 3224 may be included in a wireless communication device, such as a smart phone. In this configuration, an audio processing device may include the other elements illustrated in FIG. 32. In other words, the microphones 3224 and/or the acoustic path determination block/module 3228 may be optionally included in and/or coupled to an audio processing device or a wireless communication device. In some configurations, one or more of the acoustic path application block/module 3234, the mixer 3236, the adaptive filter 3250, the summer 3248, the acoustic path determination block/module 3228 and the delay block/module 3246 may be included in echo reduction circuitry. It should be noted that arrows and lines may denote couplings between different elements as shown in the Figures, where two elements may be directly coupled to each other or may be coupled through one or more intervening elements.

The speakers 3216 may be placed in a variety of locations. For instance, the speakers 3216 may be arranged to provide surround sound. In this instance, the speakers 3216 may include one or more of a center speaker, a left speaker, a right speaker, a surround left speaker, a surround right speaker, a surround rear left speaker, a surround rear right speaker and a subwoofer. In some examples, the speakers may be arranged in accordance with 5.1 or 7.1 surround sound. The systems and methods disclosed herein may be generally applied to systems including two or more speakers 3216. For example, the systems and methods disclosed herein may be applied to a stereo system, a 5.1 system, a 7.1 system, a 10.1 system or generally any home theater system with more than one speaker 3216.

In some configurations, the systems and methods disclosed herein may be applied during two or more modes: a calibration mode (e.g., a first calibration mode and a second calibration mode) and a runtime mode. The calibration mode referred to in the context of FIGS. 32 and 33 may be referred to as a second calibration mode. During calibration, the multiple speakers 3216 may output a set of output calibration audio signals 3212. For example, the speakers 3216 may output a set of output calibration audio signals 3212 to the acoustic channel 3218. Examples of the acoustic channel 3218 may include rooms (e.g., a living room, entertainment room, office, conference room, etc.), free space, buildings, enclosures, etc.

In some configurations, the set of output calibration audio signals 3212 may be output individually in an output sequence. For example, a first output calibration audio signal may be output from a first speaker at a first time, a second output calibration audio signal may be output from a second speaker at a second time, a third output calibration audio signal may be output from a third speaker at a third time, etc. These times (e.g., the first time, the second time and the third time) may or may not overlap. Examples of the output calibration audio signals 3212 may include white noise signals, pink noise signals, etc.

During calibration, one or more microphones 3224 may receive a set of input calibration audio signals 3226 based on the set of output calibration audio signals 3212. For example, when each of the set of output calibration audio signals 3212 is output into the acoustic channel 3218, they may travel along one or more acoustic paths 3232 to arrive at the one or more microphones 3224. For instance, an output calibration audio signal 3212 may reflect off of walls, furniture, a floor, a ceiling, people and/or other objects in the acoustic channel 3218. The microphone(s) 3224 may receive each of the set of output calibration audio signals 3212 as affected by the acoustic channel 3218 (as reflected off the walls, for example), which may result in the set of input calibration audio signals 3226. In other words, the set of input calibration audio signals 3226 may include the output calibration audio signals 3212 as affected by the environment of the acoustic channel 3218.

In some configurations, the set of input calibration audio signals 3226 may be received individually in an input sequence. For example, a first input calibration audio signal may be received at a first time, a second input calibration audio signal may be received at a second time, a third input calibration audio signal may be received at a third time, etc. These times (e.g., the first time, the second time and the third time) may or may not overlap.

In some configurations, only a single microphone 3224 may receive the set of input calibration audio signals 3226. In other configurations, multiple microphones 3224 may receive the set of input calibration audio signals 3226. For example, the microphone(s) 3224 may be arranged in a microphone array, with a particular spacing between the microphones 3224. When multiple microphones 3224 are utilized for calibration, each microphone 3224 may receive a separate set of input calibration audio signals 3226. For example, each microphone 3224 may receive a similar set of input calibration audio signals 3226 that are shifted in time, owing to delay differences between the microphones 3224 based on their placement. In some configurations or instances, however, a subset of available microphones 3224 may be used during calibration, while more microphones 3224 than were used in calibration (e.g., all microphones) may be used during runtime. Using a subset of available microphones during calibration may be beneficial as it may reduce the complexity and time to filter multiple microphones. More detail is given below.

The set of input calibration audio signals 3226 may be provided to the acoustic path determination block/module 3228. The acoustic path determination block/module 3228 may determine (e.g., calculate, compute, etc.) a set of acoustic paths 3232 based on the set of input calibration audio signals 3226. The acoustic paths 3232 may include (e.g., be expressed as) one or more of delays, gains, transfer functions, filter coefficients, filter taps, responses, etc. For example, the acoustic paths 3232 may indicate differences in delay between the input calibration audio signals 3226 (e.g., differences in delay between the output calibration audio signals 3212 as they travel from separate speakers 3216 through the acoustic channel 3218).

The acoustic paths 3232 may correspond to different speakers 3216. For example, one acoustic path may correspond to a surround rear left speaker while another acoustic path may correspond to a right speaker. Accordingly, the acoustic paths 3232 may indicate differences in delay between corresponding speakers 3216. The acoustic paths 3232 may be utilized as filters or utilized to determine (e.g., adapt) filters based on delays between channels.

As described above, the systems and methods disclosed herein may be used during a runtime mode. During runtime, a set of runtime audio signals 3214 may be provided to the speakers 3216 and to the acoustic path application block/module 3234. The acoustic path application block/module 3234 may apply the acoustic paths 3232 to the set of runtime audio signals 3214. For example, each acoustic path 3232 may be applied to the runtime audio signal 3214 that corresponds to the same speaker 3216. For instance, the acoustic path application block/module 3234 may time-shift one or more of the set of runtime audio signals 3214 (associated with a particular speaker 3216) in accordance with the acoustic path delay associated with the particular speaker 3216 (and/or microphone 3224). The acoustic path application block/module 3234 may apply a single delay and a single gain or a filter (e.g., transfer function) with multiple taps to each runtime audio signal 3214, depending on the configuration of the acoustic paths 3232 utilized. Applying a single delay to multiple runtime audio signals 3214 may be beneficial as it reduces the complexity of runtime as the number of delays that are processed may be reduced.

In some configurations, the acoustic path application block/module 3234 may apply the set of the acoustic paths 3232 as one or more filters. For example, one or more of the filters may only change amplitude (e.g., gain) and delay of an input signal (e.g., runtime audio signal 3214). In another example, one or more of the filters may be based on an impulse response. In some implementations, an acoustic path 3232 (e.g., filter coefficients) corresponding to one microphone 3224 may be applied as an acoustic path 3232 corresponding to another microphone 3224. In these implementations, multiple filters may share filter coefficients. Additionally or alternatively, a first coefficient used for a first filter may be utilized as a coefficient for a second filter. An example is given as follows. A first acoustic path (e.g., filter coefficient) corresponding to a first microphone may be applied to a second microphone. This may be done, particularly in cases where the microphone 3224 spacing is very small in comparison to the acoustic channel 3218 (e.g., room) size. For instance, calibration may not be needed to be performed for all microphones 3224, since the acoustic path responses may be similar. The first acoustic path (e.g., filter) may be applied to other microphones as well. Sharing acoustic paths (e.g., filter coefficients) in this fashion may be beneficial as it may reduce the complexity and processing power during runtime.

The mixer 3236 may mix the set of runtime audio signals 3214 based on the set of acoustic paths 3232 to determine a reference signal 3238 (e.g., a combined filtered signal). In some implementations, the mixer 3236 may apply a learned inter-loudspeaker delay to one or more runtime audio signals 3214 to generate the reference signal 3238. In other implementations, the inter-loudspeaker delay may be applied before the signals reach the mixer 3236. More detail describing how an inter-loudspeaker delay may be applied to one or more runtime audio signals 3214 is given in connection with FIG. 42A.

An example of applying a learned inter-loudspeaker delay is given as follows. Given five speakers 3216, a first speaker audio signal may be received by a microphone 3224 at a time T1. Similarly, second through fifth speaker audio signals may be received at times T2-T5, respectively. In this example, the inter-loudspeaker delay for each speaker audio may be learned at the microphone 3224.

The inter-loudspeaker delay for each speaker audio signal may be determined. The inter-loudspeaker delay for a particular speaker audio signal may be a time difference between the time of arrival of that speaker audio signal and a reference speaker audio signal. For example, the first speaker audio signal T1 may be the reference speaker audio signal. In this example, the inter-loudspeaker delay for the second speaker audio signal may be T2-T1. Similarly, the inter-loudspeaker delay for the fifth speaker audio signal may be T5-T1.

In some implementations, the reference speaker audio signal may correspond to the speaker with the shortest delay and/or that is the shortest distance away from the microphone. In other words, the reference speaker audio signal may have the shortest delay. Using the shortest delay to determine inter-speaker delays may result in inter-speaker delays for the other speakers that are zero or positive. For example an electronic device may determine which speaker delay is the shortest, designate the corresponding delay as a reference and determine inter-loudspeaker delays for the other audio signals based on that reference delay. Doing so may maintain causality. In some implementations, determining the inter-loudspeaker delays may be done during calibration (and/or runtime).

After an inter-loudspeaker delay has been determined for each audio signal, the delays may be applied to the audio signals. After each speaker has been delayed appropriately, the mixer 3236 may then mix the audio signals to create a mixed signal (e.g., the reference signal 3238) that may be used for echo cancellation.

Mixing the set of runtime audio signals 3214 may result in a mono-far-end reference signal 3238. For example, the mixer 3236 may mix the runtime audio signals 3214 that have had acoustic paths 3232 applied (either their respective acoustic path or an acoustic path from another filter). The mixer 3236 may alternatively be a combiner (e.g., mixer, summer, etc.).

The reference signal 3238 may be provided to an adaptive filter 3250. The adaptive filter 3250 may filter the reference signal 3238. For instance, the adaptive filter 3250 may shift the reference signal 3238 within a number of samples. In some configurations, the adaptive filter 3250 may be configured to perform echo reduction or cancellation. The filtered reference signal may be provided to the summer 3248. As will be described below, the summer 3248 may combine the filtered reference signal with a delayed composite audio signal(s) 3244 to produce an echo-suppressed signal 3252.

In some configurations, an electronic device may optionally include one or more of a filter monitoring block/module 3254 and a display 3256. In these configurations, an electronic device may perform (a second) calibration for surround sound echo reduction, monitor the adaptive filter 3250 during runtime and determine whether to recalibrate based on the adaptive filter 3250. For example, if one or more of the speakers 3216 have been moved since calibration, the adaptive filter 3250 may exhibit a behavior indicating that a recalibration is needed. In other examples, the adaptive filter 3250 may exhibit behavior indicating that a recalibration is needed when new components (e.g., speakers 3216, audio receivers, etc.) are added, removed and/or reconfigured.

Figure 46:
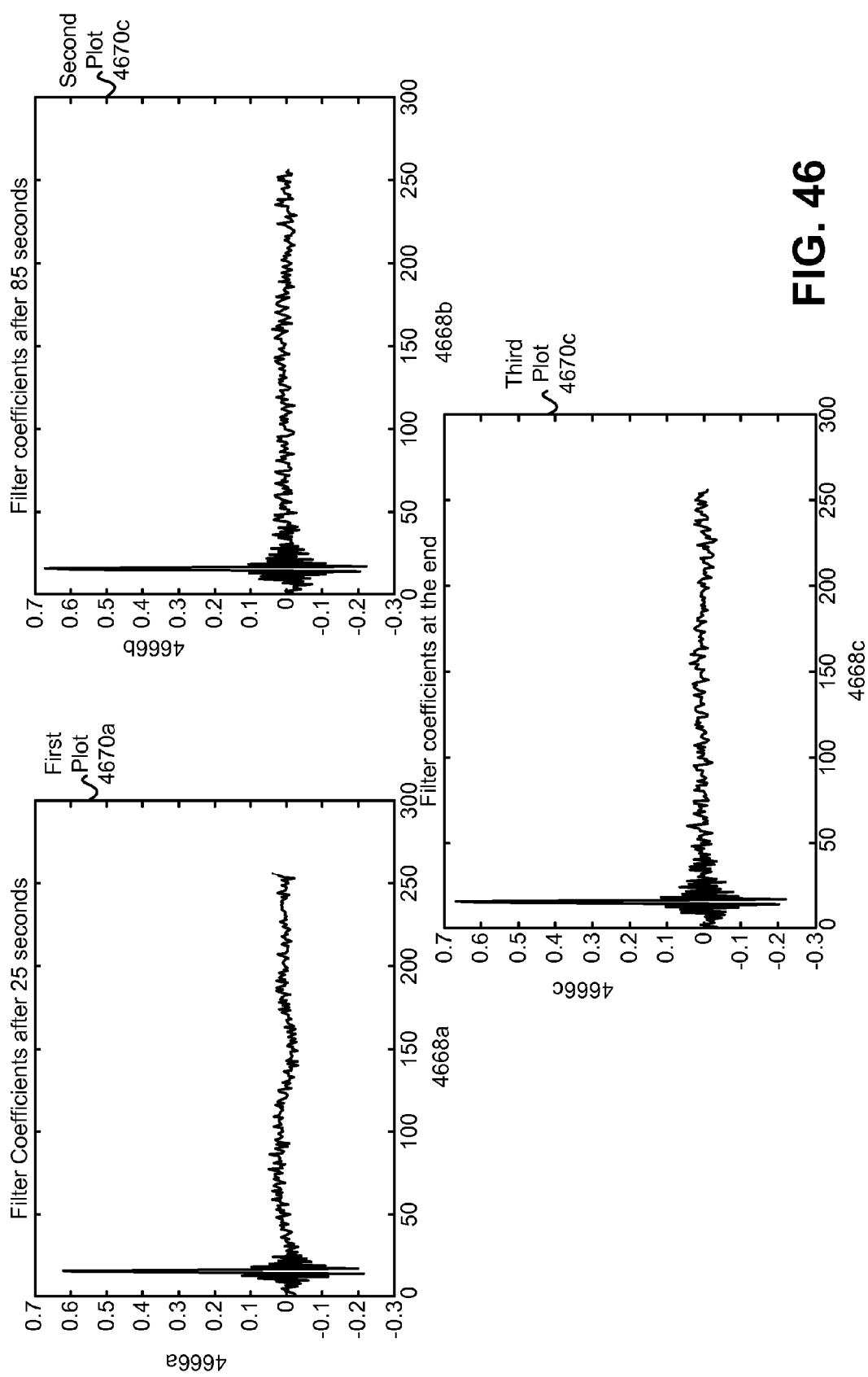
FIG. 46 includes plots that illustrate examples of filter coefficients at different time instances.

In some configurations, the filter monitoring block/module 3254 may detect this behavior (of the adaptive filter 3250) and trigger a recalibration and/or provide a message. For example, the filter monitoring block/module 3254 may provide a recalibration alert indicating that recalibration is needed. In some configurations, this behavior (of the adaptive filter 3250) may be detected by detecting the sparseness of the adaptive filter 3250. For example, if the speakers 3216 are in their original location, the converged adaptive filter 3250 may be very sparse, exhibiting primarily a strong impulse at a certain location as shown in FIG. 46. However, when one or more of the speakers 3216 have been moved, reconfigured, added and/or removed since calibration, the converged adaptive filter 3250 may no longer be sparse and may have multiple significant taps. In some configurations, the filter monitoring block/module 3254 may additionally or alternatively provide a message to the display 3256. The display 3256 may display the message indicating that a recalibration is needed. In some implementations, the message may alert a user to enable a recalibration. Additionally or alternatively, the message may indicate that a recalibration is being/will be performed.

The set of runtime audio signals 3214 may be output by the speakers 3216 and may travel through the acoustic channel 3218. The set of runtime audio signals 3214 may be output by the speakers 3216 concurrently. For example, each of the speakers 3216 may output one of the set of runtime audio signals 3214. Each of the runtime audio signals 3214 may travel through the acoustic channel 3218. For instance, each of the runtime audio signals 3214 may experience similar path delays and reflections as occurred with the corresponding calibration audio signals during calibration.

The microphone(s) 3224 may receive at least one composite audio signal 3244 that is based on the set of runtime audio signals 3214. For example, the composite audio signal 3244 may include the set of runtime audio signals 3214 as they are affected by the acoustic channel 3218. Additionally, the composite audio signal 3244 may include other audio signals as affected by the acoustic channel 3218. For instance, the composite audio signal(s) 3244 may include a user's voice or other sounds in the acoustic channel 3218 as affected by the acoustic channel 3218.

In some implementations, the composite audio signal 3244 may be provided to a beamformer 3274. During runtime, the beamformer 3274 may null at least one speaker 3216. The beamformer 3274 may subtract audio signals based on their location. For example, the beamformer 3274 may null the speakers 3216 that are opposite a desired audio source (e.g., a user, a "speaker," etc.). For example, a center speaker, a left speaker, a right speaker and a subwoofer may be nulled. The beamformer 3274 may then pass the composite audio signal 3244 (with subtracted signals corresponding to the nulled speakers 3216) to the delay block/module 3246.

The delay block/module 3246 may delay the composite audio signal(s) 3244 by an amount of time (e.g., by a number of samples). In other words, the delay block/module 3246 may apply a delay that is an amount of time or a number of samples. As will be described below, the delay may be equal to or greater than the value of the maximum acoustic path delay corresponding to at least one of the speakers 3216.

An electronic device (e.g., audio processing device or wireless communication device) may determine the delay. For example, an electronic device may perform (a second) calibration for surround sound echo reduction, determine a delay based on the calibration and delay at least one (runtime) composite signal based on the delay. The delay may be the longest (e.g., worst-case or maximum) acoustic path delay 3242 corresponding to at least one of the speakers 3216. For example, a surround left speaker may have a first acoustic path delay. A surround rear right speaker may have a second acoustic path delay that is greater than the first acoustic path delay. In this example, the delay may be equal to the second acoustic path delay. In some implementations, the delay may be a maximum acoustic path delay corresponding to at least one of multiple speakers plus a number of samples.

In some configurations, the delay may be the maximum acoustic path delay 3242 corresponding to at least one of the speakers plus a number of samples. This delay may enable echo cancellation to be performed causally. The delay block/module 3246 may provide the delayed composite audio signal(s) to the summer 3248.

The summer 3248 may sum the filtered reference signal 3238 and the delayed composite audio signal(s) 3244 to produce an echo-suppressed signal 3252. For example, the summer 3248 may subtract the estimated echo signal (e.g., the reference signal 3238) from the delayed composite audio signal 3244. This may have the effect of reducing, or removing, the runtime audio signal(s) 3214 from the composite audio signal(s) 3244. In this way, the echo-suppressed signal 3252 may include a user's voice and/or other sounds that occurred in the acoustic channel 3218 during runtime. The echo-suppressed signal 3252 may also be fed back to the adaptive filter 3250 to enable filter adaptation. In some implementations, the adaptive filter 3250 may be implemented in the time domain, the frequency domain or the sub-band domain.

It should be noted that any of the elements described herein may be implemented in hardware (e.g., circuitry), software or a combination of both. For example, the summer 3248 may be implemented with hardware components such as circuitry and/or software components such as instructions or code, etc. Additionally, one or more of the components or elements may be implemented in hardware (e.g., circuitry), software, firmware or any combination thereof. For example, the adaptive filter 3250 may be implemented in circuitry (e.g., in an Application-Specific Integrated Circuit (ASIC), a Field-Programmable Gate Array (FPGA) and/or one or more processors, etc.).

Figure 33:
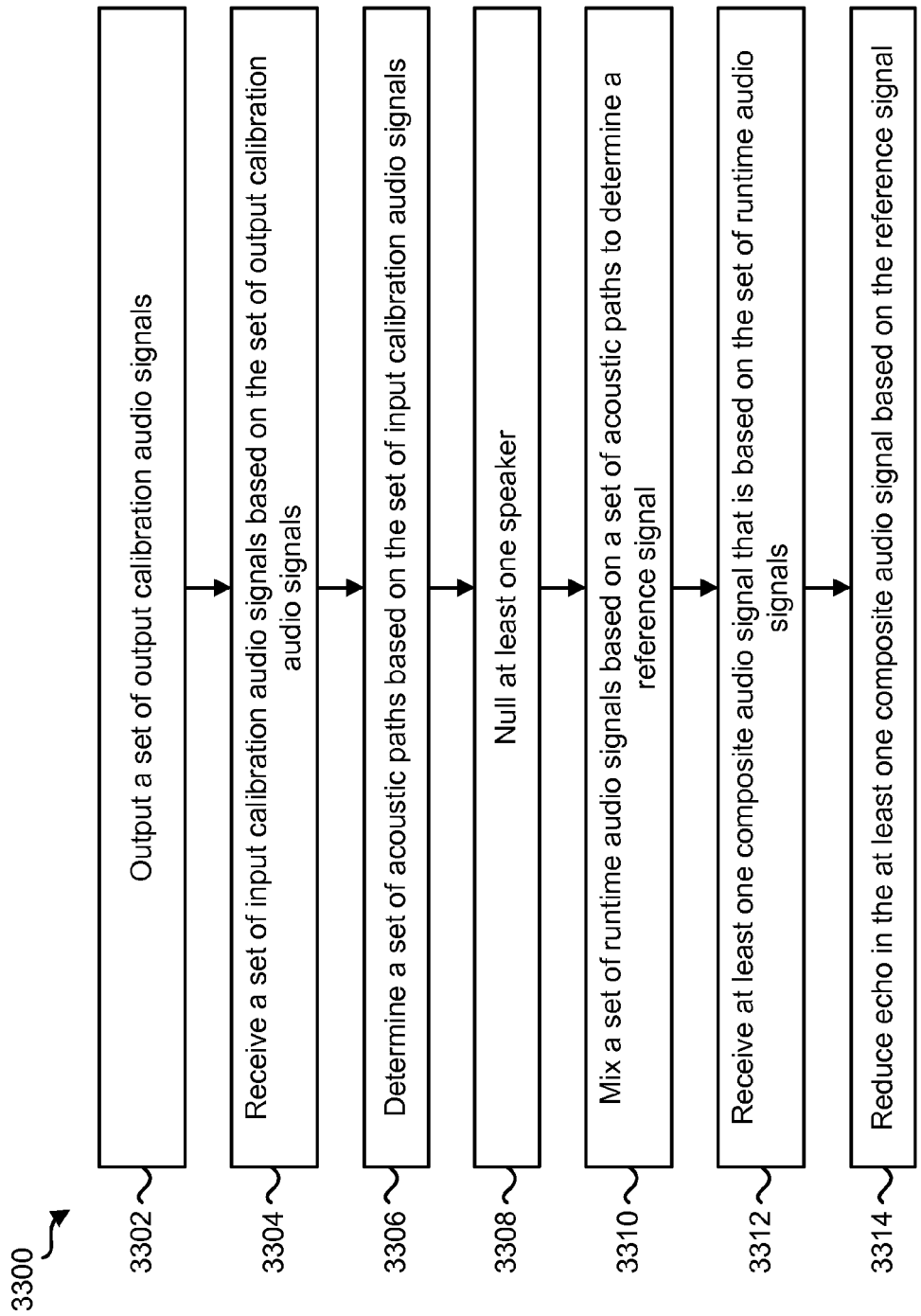
FIG. 33 is a flow diagram illustrating one configuration of a method for echo reduction.

FIG. 33 is a flow diagram illustrating one configuration of a method 3300 for echo reduction. The method 3300 may be performed by one or more electronic devices. During calibration, an electronic device may output 3302 a set of output calibration audio signals 3212. In some configurations, the set of output calibration audio signals 3212 may be output 3302 individually in an output sequence (e.g., one at a time).

During calibration, an electronic device may receive 3304 a set of input calibration audio signals based on the set of output calibration audio signals. For example, the microphone(s) 3224 may receive 3304 each of the set of output calibration audio signals 3212 as affected by the acoustic channel 3218. The set of output calibration audio signals 3212 as affected by the acoustic channel 3218 may be referred to as a set of input calibration audio signals 3226. In some configurations, the set of input calibration audio signals 3226 may be received 3304 individually in an input sequence (e.g., one at a time).

During calibration, an electronic device may determine 3306 (e.g., calculate, compute, etc.) a set of acoustic paths 3232 based on the set of input calibration audio signals 3226. The acoustic paths 3232 may correspond to different speakers 3216. Acoustic paths may be learned by running an adaptive filter 3250 between each of the speakers 3216 and the microphone(s) 3224 in the calibration mode (as shown in at least one of FIGS. 38 and 42, for example). Special care may be taken during the calibration mode to make sure only one particular speaker 3216 is excited while the adaptive filter 3250 learns the corresponding acoustic path 3232. This process may be repeated for each of the speaker-to-the-microphone acoustic paths 3232. This can be accomplished by exciting each of the speakers sequentially with a white/pink noise with a brief pause before moving to a subsequent speaker.

In some implementations, determining 3306 a set of acoustic paths may include determining acoustic paths 3232 (e.g., coefficients) for each speaker 3216 to one microphone 3224. In this example, determining acoustic paths 3232 for each speaker 3216 to other microphones 3224 may be avoided. For instance, coefficients may be "shared" between filters in order to reduce processing and/or calibration time as described in more detail below.

In some implementations, the electronic device may determine inter-loudspeaker delays for one or more audio signals. For example, the electronic device may determine a difference in time of arrival between a first speaker audio signal and a reference speaker audio signal. In these implementations, the electronic device may null 3308 at least one speaker based on the inter-loudspeaker delays. Determining inter-loudspeaker delays may be performed as a separate step or may be done as part of determining 3306 a set of acoustic paths.

During runtime, an electronic device may null 3308 at least one speaker. As described above, an electronic device may determine an inter-loudspeaker delay for a speaker in some implementations. In some implementations, which of the speakers are nulled may be determined based on the location of a desired audio source. For example, a user may be in a seating area facing an electronic device. In this example, one or more of the left speaker, the right speaker, the center speaker and the subwoofer may be nulled. Nulling 3308 at least one speaker in this fashion may be beneficial as it may reduce complexity at runtime as fewer filters may be utilized.

During runtime, an electronic device may mix 3310 the set of runtime audio signals 3214 based on the set of acoustic paths 3232 to determine a reference signal 3238. For example, the electronic device may sum the runtime audio signals 3214 that have had their respective acoustic paths 3232 applied. In some implementations, those runtime audio signals 3214 that have not been nulled may be mixed 3310. For example, as described above, one or more of a left speaker, a right speaker, a center speaker and a subwoofer may be nulled in some implementations. In this example, signals corresponding to a surround right speaker, a surround rear right speaker, a surround rear left speaker and a surround left speaker may be mixed 3310.

In a case where acoustic paths 3232 were determined for each speaker 3216 to one microphone 3224, mixing 3310 the set of runtime audio signals may include sharing coefficients. For example, an acoustic path 3232 between a first speaker and the microphone 3224 may be applied to another microphone. Sharing coefficients in this fashion may be beneficial as it may reduce the complexity and duration of calibration since fewer coefficients need to be learned.

An electronic device may receive 3312 at least one composite audio signal 3244 that is based on the set of runtime audio signals 3214. For example, the composite audio signal 3244 may include the set of runtime audio signals 3214 as they are affected by the acoustic channel 3218. The composite audio signal 3244 may also include audio signals other than the runtime audio signals. For example, the composite audio signal 3244 may include a user's speech.

An electronic device may reduce 3314 echo in the at least one composite audio signal 3244 based on the reference signal 3238. For example, the electronic device may sum a filtered reference signal 3238 and delayed composite audio signal(s) 3244 to produce an echo-suppressed signal 3252. Summing the filtered reference signal 3238 and the delayed composite audio signal(s) 3244 may include subtracting the filtered reference signal 3238 from the composite audio signal 3244. For clarity in explanation, FIGS. 36-40 provide context for the systems and methods disclosed herein.

In some configurations, each of the method 3300 steps illustrated in FIG. 33 may be performed by an audio processing device. In other configurations, one or more of the method 3300 steps may be performed by a wireless communication device. For example, a wireless communication device may include microphones 3224. Accordingly, the wireless communication device may perform one or more of receiving 3304 the set of input calibration audio signals 3226, determining 3306 a set of acoustic paths 3232 and receiving 3312 at least one composite audio signal 3244. The remainder of the steps may be performed by an audio processing device in these configurations. For example, the microphones 3224 in a wireless communication device may receive 3312 the at least one composite audio signal. In this example, mixing 3310 the set of runtime audio signals and reducing 3314 the echo may be performed by an audio processing device. The wireless communication device and the audio processing device may communicate as necessary to perform the method 3300 in these configurations. In another example, the at least one composite audio signal 3244 may be received by the one or more microphones 3224. In this example, a mixed-down source per each microphone may be communicated. Enhanced speech with echo cancellation/noise suppression may also be communicated.

Figure 34:
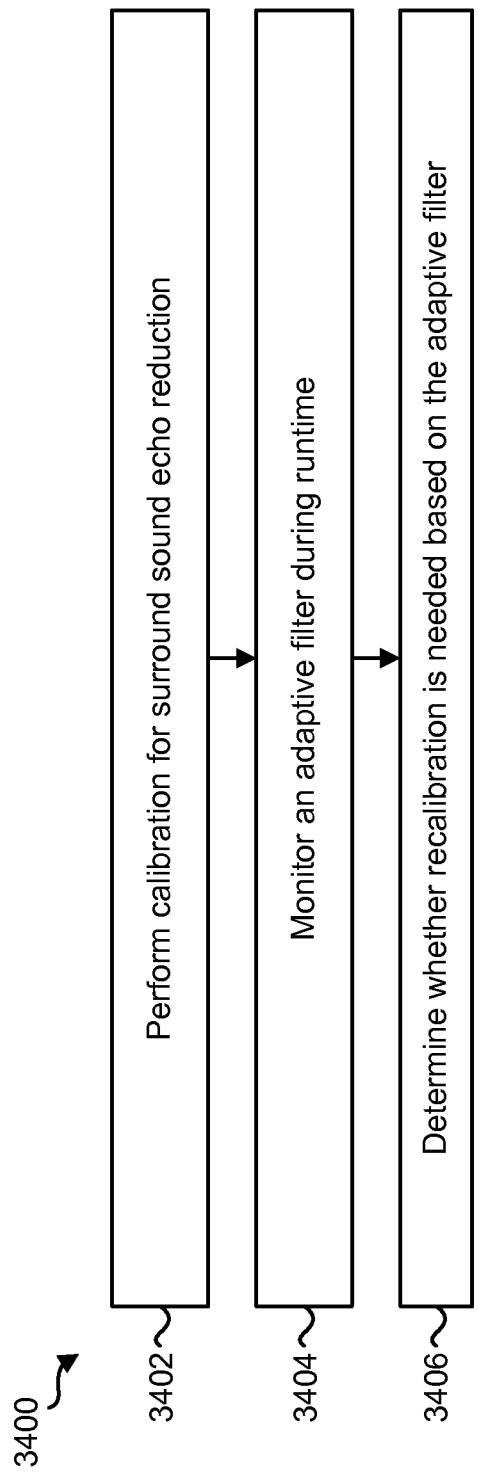
FIG. 34 is a flow diagram illustrating one configuration of a method for filter monitoring.

FIG. 34 is a flow diagram illustrating one configuration of a method 3400 for filter monitoring. The method 3400 may be performed by one or more electronic devices. An electronic device may perform 3402 calibration for surround sound echo reduction. As described above, performing 3402 calibration may include outputting one or more output calibration audio signals 3212, receiving one or more input calibration audio signals 3226, and determining a set of acoustic paths 3232 based on the set of input calibration audio signals 3226.

In some implementations, performing 3402 calibration may be initiated based on user input. For example, upon moving, adding, removing and/or reconfiguring a component (e.g., an audio receiver or a speaker 3216) of a surround sound system, the user may direct the electronic device to perform 3402 a calibration. In other implementations, the electronic device may automatically perform 3402 a calibration upon detecting that one or more of the speakers 3216 have been moved, added, removed and/or reconfigured.

The electronic device may monitor 3404 an adaptive filter during runtime. For example, if one or more of the speakers 3216 have been moved since calibration, the adaptive filter 3250 may exhibit a behavior indicating that a recalibration is needed. In some implementations, a "sweet spot" may exist in an acoustic channel 3218. This sweet spot may be identified as a location in the acoustic channel 3218 where improved echo cancellation occurs. In this implementation, monitoring 3404 the adaptive filter may include monitoring when the "sweet spot" has changed location and/or size (which may be based on the position or configuration of the speakers 3216).

In some configurations, the electronic device may determine 3406 whether recalibration is needed based on the adaptive filter 3250. For example, the electronic device (e.g., the filter monitoring block/module 3254) may detect a change in the adaptive filter 3250 that indicates one or more of the speakers 3216 have changed configuration (or have been moved). In another example, the change in the adaptive filter 3250 may indicate that the "sweet spot" has changed configuration (or position). In this example, the electronic device may determine 3406 that a recalibration is needed. By comparison, the electronic device may detect no change, or a small change (under a threshold amount, for example), in the adaptive filter 3250. This small change, or lack of change, may indicate the speakers 3216 have not changed location, or have changed location in a small amount (under a threshold amount, for example). In this example, the electronic device may determine 3406 that no recalibration is needed.

If the electronic device determines 3406 that a recalibration is needed, the electronic device may trigger 3408 a recalibration or provide a recalibration alert. For example, if the electronic device determines 3406 that a recalibration is needed the electronic device may trigger 3408 a recalibration. In some implementations, triggering 3408 a recalibration may be performed independent of user input. For example, the electronic device may automatically recalibrate for surround sound echo reduction.

In other implementations, the electronic device may provide a recalibration alert. For example, the electronic device may provide a recalibration message indicating that recalibration is needed. In some configurations, the electronic device may display the message indicating that a recalibration is needed. The recalibration message may enable a user to initialize the recalibration. The recalibration message may notify that a recalibration is needed and/or may notify that a recalibration is being/will be performed.

Figure 35:
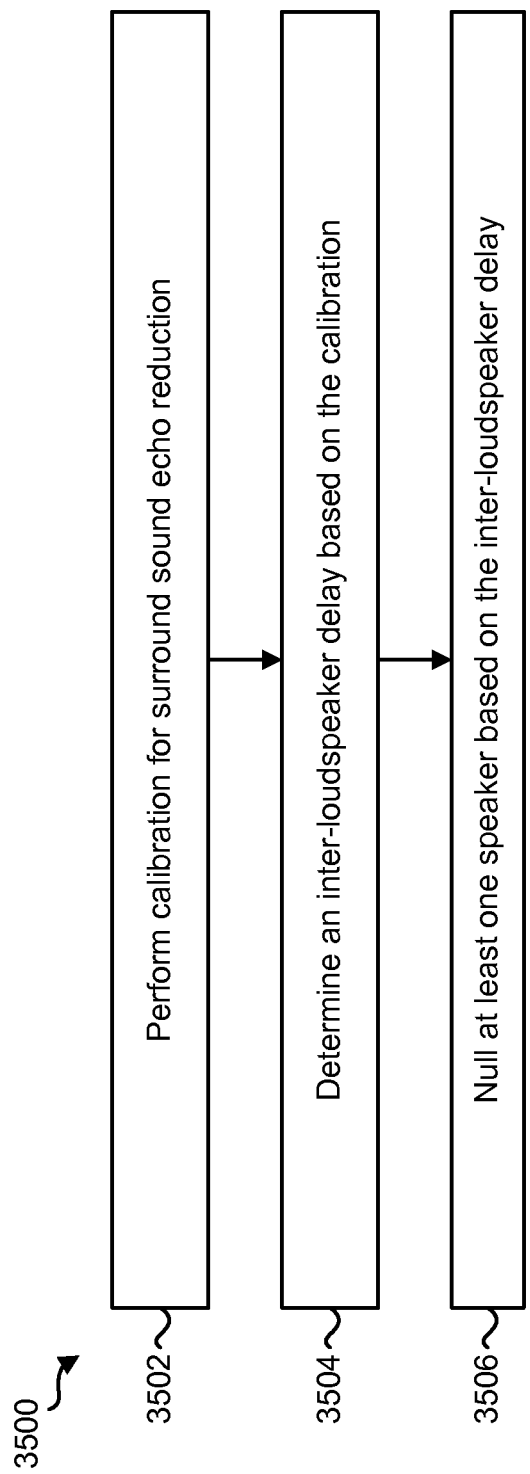
FIG. 35 is a flow diagram illustrating one configuration of a method for determining a delay.

FIG. 35 is a flow diagram illustrating one configuration of a method 3500 for determining a delay. The method 3500 may be performed by one or more electronic devices. An electronic device may perform 3502 calibration for surround sound echo reduction. In some implementations, this may be performed as described in connection with FIG. 34.

The electronic device may determine 3504 an inter-loudspeaker delay based on the calibration. As described above, the inter-loudspeaker delay may be a delay between the times of arrival of different runtime audio signals with respect to a reference runtime audio signal. For example, a second runtime audio signal may have an inter-loudspeaker delay of T2-T1. In this example, determining 3504 the inter-loudspeaker delay may include obtaining the inter-loudspeaker delay of the different runtime audio signals (e.g., pertaining to the different speakers).

The electronic device may null 3506 at least one speaker based on the inter-loudspeaker delay. This may be done as described above in connection with FIG. 33. In some implementations, nulling 3506 at least one speaker may include performing microphone subtraction to form at least one null beam in the direction of the at least one speaker. It should be noted that the method 3500 may be performed independently or in combination with one or more other methods described herein. In some implementations, the electronic device may mix at least two signals based on the inter-loudspeaker delay.

Figure 36:
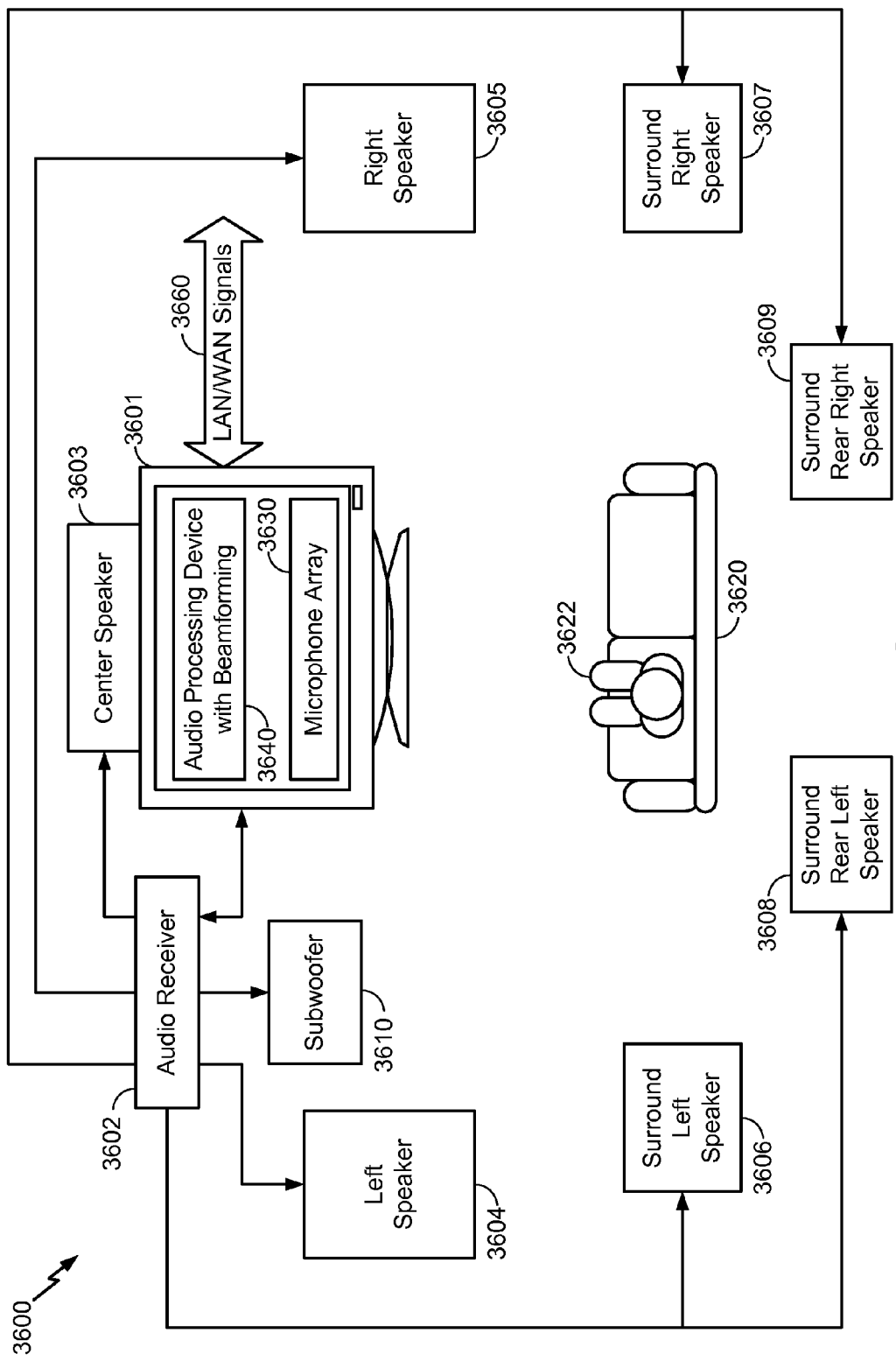
FIG. 36 is a block diagram illustrating one configuration of an audio processing device in which systems and methods for echo reduction may be implemented.

FIG. 36 is a block diagram illustrating one configuration of an audio processing device 3640 in which systems and methods for echo reduction may be implemented. The audio processing device 3640 may be operable to implement beamforming to reduce echo. In some implementations, the audio processing device 3640 may be included in a home theater system 3600. In particular, FIG. 36 illustrates a surround sound far-field echo cancellation problem. This problem may involve potentially different, and at times correlated, echo(s) coming from different directions. In the example illustrated in FIG. 36, for instance, it may be beneficial to reduce or cancel audio signals being provided by the multiple speakers 3603-3610. In some implementations, the home theater system 3600 may include an electronic device 3601, an audio receiver 3602, a microphone array 3630, an audio processing component 3640, speakers 3603-3609, and a subwoofer 3610 that may be examples of corresponding elements described in connection with FIG. 1.

The home theater system 3600 may be adapted for receiving voice interaction from a user 3622. For example, the home theater system 3600 may be used for teleconferencing (e.g., audio or video teleconferencing), to receive voice commands (e.g., to control a component of the home theater system 3600 or another device), or to output voice input received from the user 3622 (e.g., for voice amplification or audio mixing). In some implementations, the electronic device 3601 may be a networking-enabled "smart" television that is capable of communicating local area network (LAN) and/or wide area network (WAN) signals 3660.

When the home theater system 3600 is set up, each component may be positioned relative to a seating area 3620 to facilitate use of the home theater system 3600 (e.g., to improve surround-sound performance). As described above, to implement acoustic echo cancellation in the home theater system 3600 of FIG. 36, the audio processing component 3640 may be configured to operate in a calibration mode. During the calibration mode, the electronic device 3601 may determine a "sweet spot" where improved echo cancellation may be performed.

During operation in a non-calibration (e.g., use or runtime) mode after calibration is complete, the audio processing component 3640 may perform surround sound echo reduction. For example, the electronic device 3601 may null at least one speaker, delay one or more composite audio signal(s) 3244, or subtract a reference signal 3238 from the composite audio signal(s) 3244 to isolate a particular audio source (e.g., the user 3622). In some configurations, when a subsequent configuration change is detected (e.g., a different audio receiver or a different speaker is introduced into the home theater system 3600), the calibration mode may be initiated again and one or more acoustic paths 3232 or updated acoustic paths 3232 may be determined by the audio processing component 3640 and a new calibration obtained.

Figure 37:
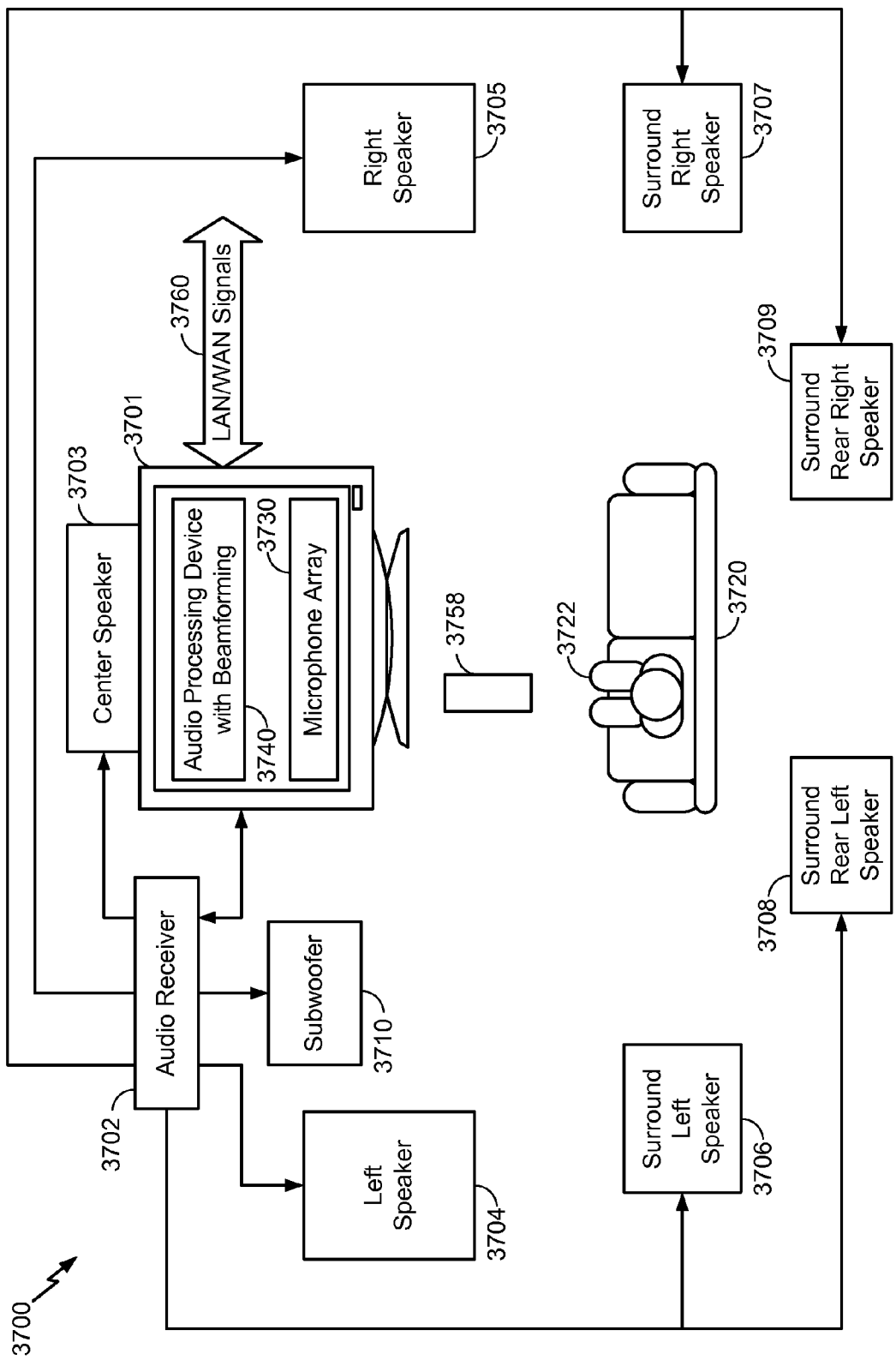
FIG. 37 is a block diagram illustrating a configuration of an audio processing device and a mobile device in which systems and methods for echo reduction may be implemented.

FIG. 37 is a block diagram illustrating one configuration of an audio processing device 3740 in which systems and methods for echo reduction may be implemented. The audio processing device 3740 may be operable to implement beamforming to reduce echo. In some implementations, the audio processing device 3740 may be included in a home theater system 3700 that may be an example of the home theater system 3600 described in connection with FIG. 36. In some implementations, the home theater system 3700 may include an electronic device 3701, an audio receiver 3702, a microphone array 3730, an audio processing component 3740, speakers 3703-3709, and a subwoofer 3710 that may be examples of corresponding elements described in connection with FIG. 36. The home theater system 3700 may be adapted for receiving voice interaction from a user 3722. In some implementations, the electronic device 3701 may be a networking-enabled "smart" television that is capable of communicating local area network (LAN) and/or wide area network (WAN) signals 3760. When the home theater system 3700 is set up, each component may be positioned relative to a seating area 3720 to facilitate use of the home theater system 3700 (e.g., to improve surround-sound performance).

As described above in some implementations, a wireless communication device 3758 (e.g., mobile device) with one or more microphones may perform one or more of the functions described herein. For example, the wireless communication device 3758 may perform echo reduction (e.g., cancellation) and/or noise suppression. In another example, the wireless communication device 3758 may include one or more microphones that receive (e.g., capture) one or more audio signals. In one implementation of this example, the wireless communication device 3758 may pass on the received audio signals to the audio processing device 3740. In some implementations, the microphones in the wireless communication device 3758 may replace the microphone array 3730 (or the microphone array 3730 may be deactivated) on account of the audio signals being received by the microphones on the wireless communication device 3758.

The wireless communication device 3758 may communicate with the audio processing device 3740 in order to perform one or more of the functions and/or method steps described herein. For example, the wireless communication device 3758 may communicate with the audio processing device 3740 via a wireless communication link.

Other examples of functions and/or method steps that may be performed by the wireless communication device 3758 may include receiving 3304 the set of input calibration audio signals 3226, determining 3306 a set of acoustic paths 3232 and receiving 3312 the composite audio signal(s) 3244. It should be noted that for the downlink, transfer of all surround channels may not be needed. Rather, a mixed-down source per each microphone may be sent. Especially for the case where the number of speakers is much larger than the number of microphones in the wireless communication device 3758, this may be more efficient. In some implementations, moving the wireless communication device 3758, or a change in the position of the user 3722 in relation to the wireless communication device 3758, may alter one or more of the acoustic paths 3232 or the "sweet spot" of the acoustic channel 3218. Accordingly, in some implementations, this change may trigger a recalibration of the surround sound system.

Figure 38:
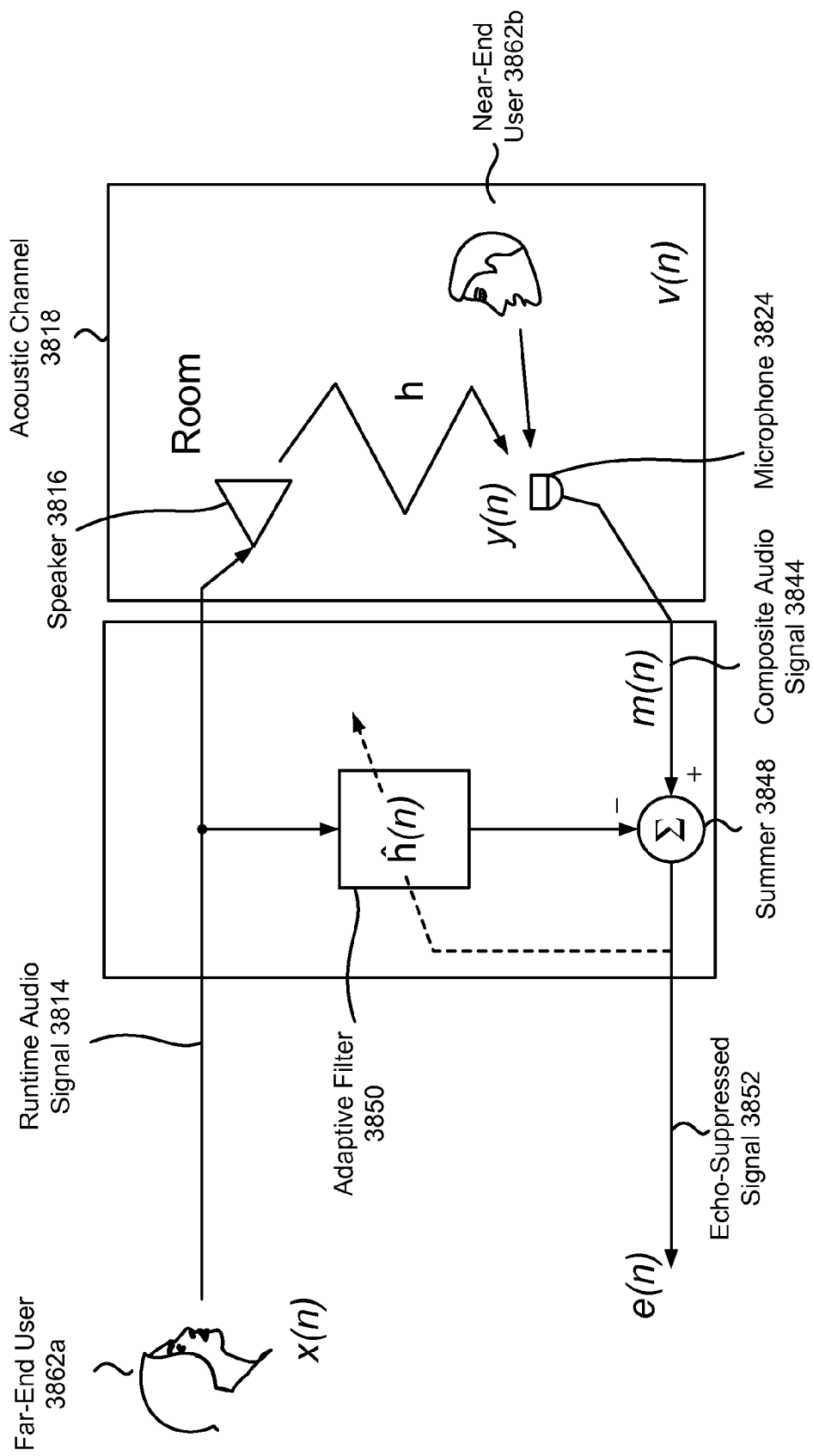
FIG. 38 is a block diagram illustrating one configuration of a monophonic echo cancellation system.

FIG. 38 is a block diagram illustrating one configuration of a monophonic echo cancellation system. In this example, a far-end user 3862a may provide a runtime audio signal 3814 (e.g., speech). The runtime audio signal 3814 may be output over a speaker 3816 into an acoustic channel 3818 (e.g., a room) to a near-end user 3862b. A microphone 3824 in the acoustic channel 3818 may capture the runtime audio signal 3814. The microphone 3824 may also capture an audio signal from the near-end user 3862b (e.g., the near end user's speech). The combination of the runtime audio signal 3814 and the near end user 3862b audio signal may be referred to as a composite audio signal 3844, denoted in FIG. 38 as m(n). An adaptive filter 3850, denoted in FIG. 38 as h(n), and a summer 3848 may be used to cancel the runtime audio signal 3814 from the composite audio signal 3844 (as described in connection with at least one of FIGS. 32 and 33), which may return an echo-suppressed signal 3852, denoted in FIG. 38 as e(n).

The echo cancellation system described in FIG. 38 is a known approach for echo cancellation in a monophonic system. The system described in FIG. 38 may not solve many of the problems that arise in a surround sound echo reduction scenario. For example, stereophonic echo cancellation may present problems that are fundamentally different from those of the single channel case. For example, in a stereophonic case the echo cancellation problem may be more difficult to solve because of the necessity to uniquely identify two acoustic paths. In other words, in an N loudspeaker case one may need to identify N unique acoustic paths. The systems and methods disclosed herein describe an effective way to reduce echo in a surround sound echo reduction scenario.

Figure 39:
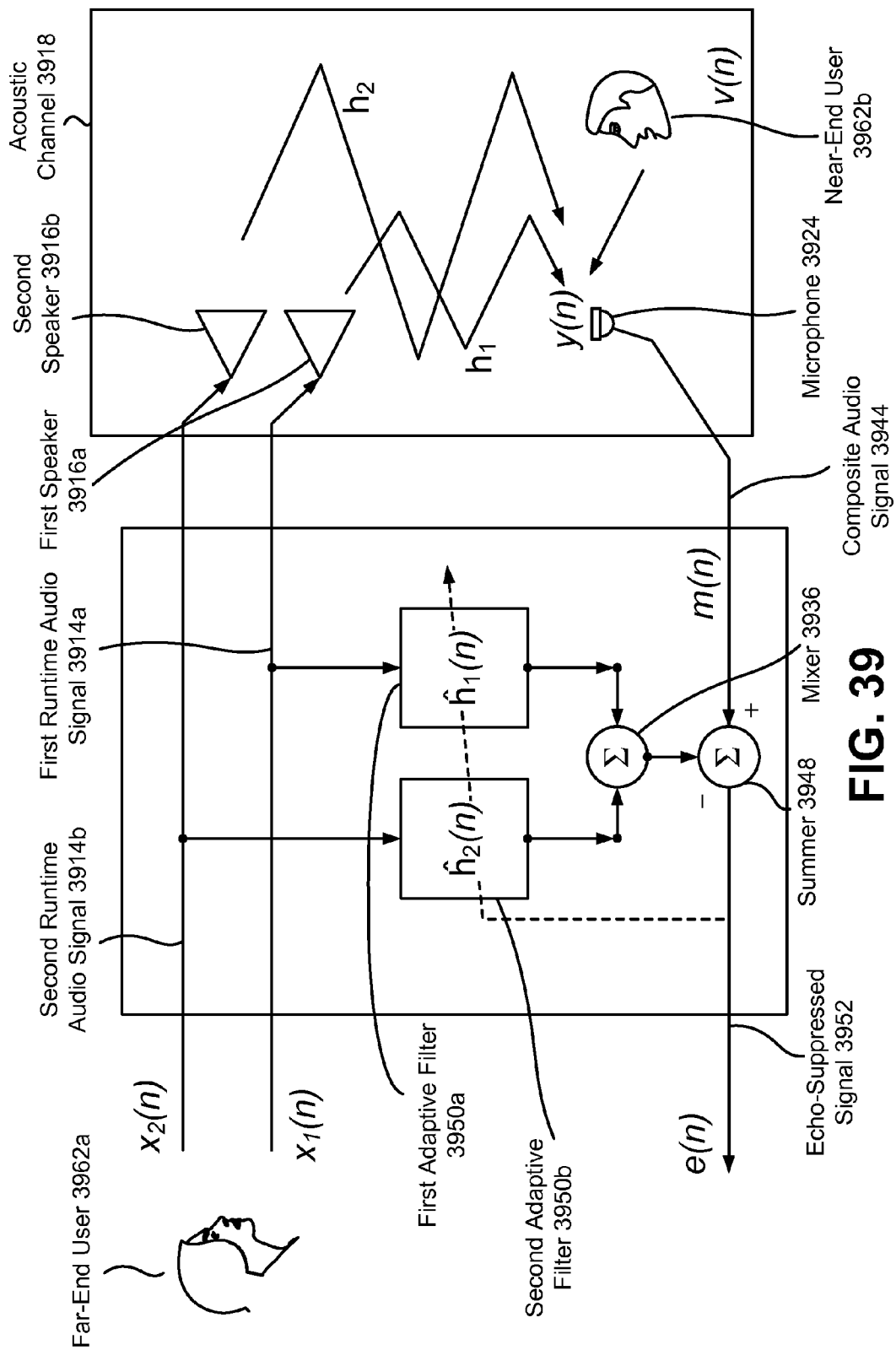
FIG. 39 is a block diagram illustrating one configuration of a stereo echo cancellation system.

FIG. 39 is a block diagram illustrating one configuration of a stereo echo cancellation system. In comparison with FIG. 38, the stereo echo canceller may not be a simple extension of a mono-phonic system for reasons given as follows. Stereo echo cancellation may suffer from a non-uniqueness problem. For example, the optimal Weiner solution may be expressed in the equation $\hat{h}=R^{-1}p$, where R may be the correlation-matrix of the far-end audio signal and p may be the cross-correlation vector between the far-end and the microphone signal.

The similarity between mono-phonic and stereo acoustic echo cancellation systems may be deceptive. Stereophonic acoustic echo cancellers may present problems that are fundamentally different from those of the single channel case. In the stereophonic case, the acoustic echo cancellation problem may be more difficult to solve because of the necessity to uniquely identify two acoustic paths 3232. For example, in an N speaker case, one may need to identify N unique acoustic paths 3232.

For the stereophonic case, the coefficient miss-alignment of the adaptive filter may be worse because of the strong cross-correlation between the input signals and the bad condition number of the covariance matrix. In particular, the covariance matrix R may be very ill-conditioned, so there may not necessarily be a unique solution. This means that multiple $\hat{h}$ values may give a zero error e. Furthermore, for the stereophonic case, because of the strong cross-correlation between the input signals, there may be a bad misalignment even if there is a unique solution to the normal equation.

It may be possible to have good echo cancellation in the stereophonic case even when misalignment is large. However, in this case cancellation may worsen if the remote far-end user 3962a moves. For example, the solution may get stuck in a local minima and the two echo paths may not be uniquely identified. A good stereo acoustic echo cancellation solution may avoid this problem.

As depicted in FIG. 39, a far-end user 3962a may provide stereo runtime audio signals 3914a-b (e.g., speech). The runtime audio signals 3914a-b may be output over speakers 3916a-b into an acoustic channel 3918 (e.g., a room) to a near-end user 3962b. A microphone 3924 in the acoustic channel 3918 may capture the runtime audio signals 3914a-b. The microphone 3924 may also capture an audio signal from the near-end user 3962b (e.g., the near-end user's speech). The combination of the runtime audio signals 3914a-b and the near-end user 3962b audio signal may be referred to as a composite audio signal 3944, denoted in FIG. 39 as m(n). Adaptive filters 3950a-b, denoted in FIG. 39 as $\hat{h}_1(n)$ and $\hat{h}_2(n)$, a mixer 3936 and a summer 3948 may be used to cancel the runtime audio signals 3914a-b from the composite audio signal 3944 (as described in connection with at least one of FIGS. 32 and 33), which may which may return an echo-suppressed signal 3952, denoted in FIG. 39 as e(n).

The echo cancellation system described in FIG. 39 is a known approach for echo cancellation in a stereophonic system. The system described in FIG. 39 may not solve many of the problems that arise in a surround sound echo reduction scenario. For example, in the stereophonic case, the coefficient misalignment of the adaptive filter may be worse because of the strong cross-correlation between the input signals and the bad condition number of the covariance matrix. Additionally, the covariance matrix may be very ill-conditioned, so there may not be a unique solution. In other words, multiple $\hat{h}$'s may indicate zero error. Further, for the stereophonic case, the strong cross-correlation between the input signals may produce a bad misalignment even if there is a unique solution to the normal equation. Accordingly, the systems and methods disclosed herein may provide an effective way to reduce echo in a surround sound system.

Figure 40:
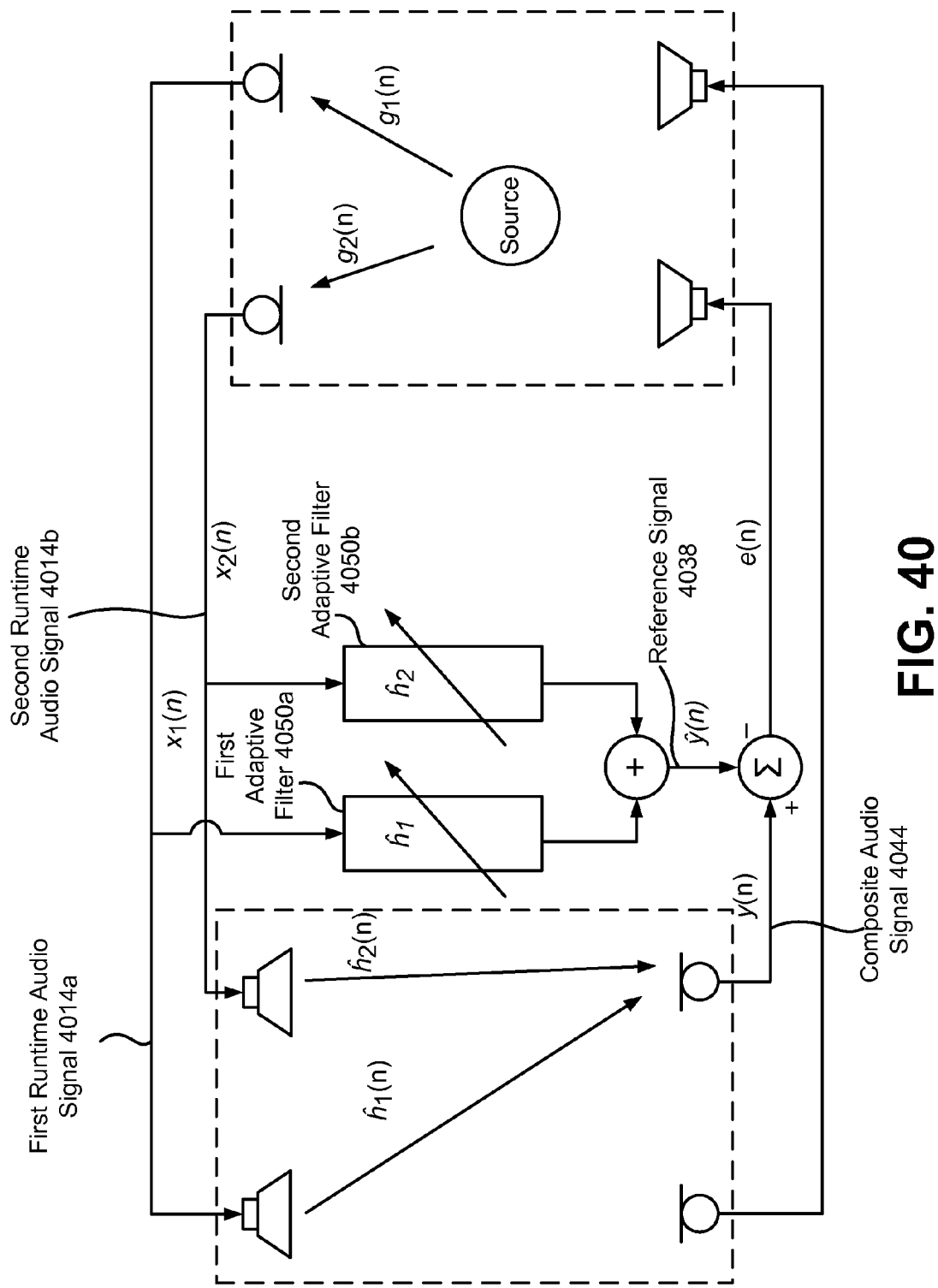
FIG. 40 is a block diagram illustrating another approach to the non-uniqueness problem.

FIG. 40 is a block diagram illustrating another approach to the non-uniqueness problem. FIG. 40 illustrates one known approach for acoustic echo cancellation given by the paper "A better understanding and an improved solution to the specific problems of stereophonic acoustic echo cancellation," J. Benesty, D. R. Morgan, and M. M. Sondhi, IEEE trans. Speech Audio Processing, vol-6, pp. 156-165, March, 1998. In particular, FIG. 40 illustrates a common far-end source in terms of a first runtime audio signal 4014a, denoted in FIG. 40 as $x_1(n)$ and a second runtime audio signal 4014b, denoted in FIG. 40 as $x_2(n)$. For example, a common far-end source may be represented by the equation $x_1(n)*g_2(n)=x_2(n)*g_1(n)$. As illustrated by the following operation, a common far-end source may lead to infinitely many false solutions.

$$\hat{y} = x_1 * \hat{h}_1 + x_2 * \hat{h}_2$$
$$= x_1 * (h_1 + \beta * g_2) + x_2 * (h_2 - \beta * g_1)$$
$$= (x_1 * h_1 + x_2 * h_2) + \beta * (x_1 * g_2 - x_2 * g_1)$$
$$= y.$$

Listing (1)

In Listing (1), $\hat{h}_1$ may refer to a first adaptive filter 4050a, $\hat{h}_2$ may refer to a second adaptive filter 4050b, $\hat{y}(n)$ may refer to the reference signal 4038 and y(n) may refer to the composite audio signal 4044. Some research has tried to resolve this problem by introducing different kinds of non-linearities or by altering the stereo image. For example, inter channel de-correlation may be utilized to help the adaptive filters 4050a-b to identify the true response. However, de-correlation algorithms need to satisfy the constraint that they introduce no audible artifacts or distortions. Furthermore, with any movement in the far-end source position, the adaptive filters 4050*a-b* may still need to re-converge in this approach. The systems and methods disclosed herein present a different approach.

Figure 41:
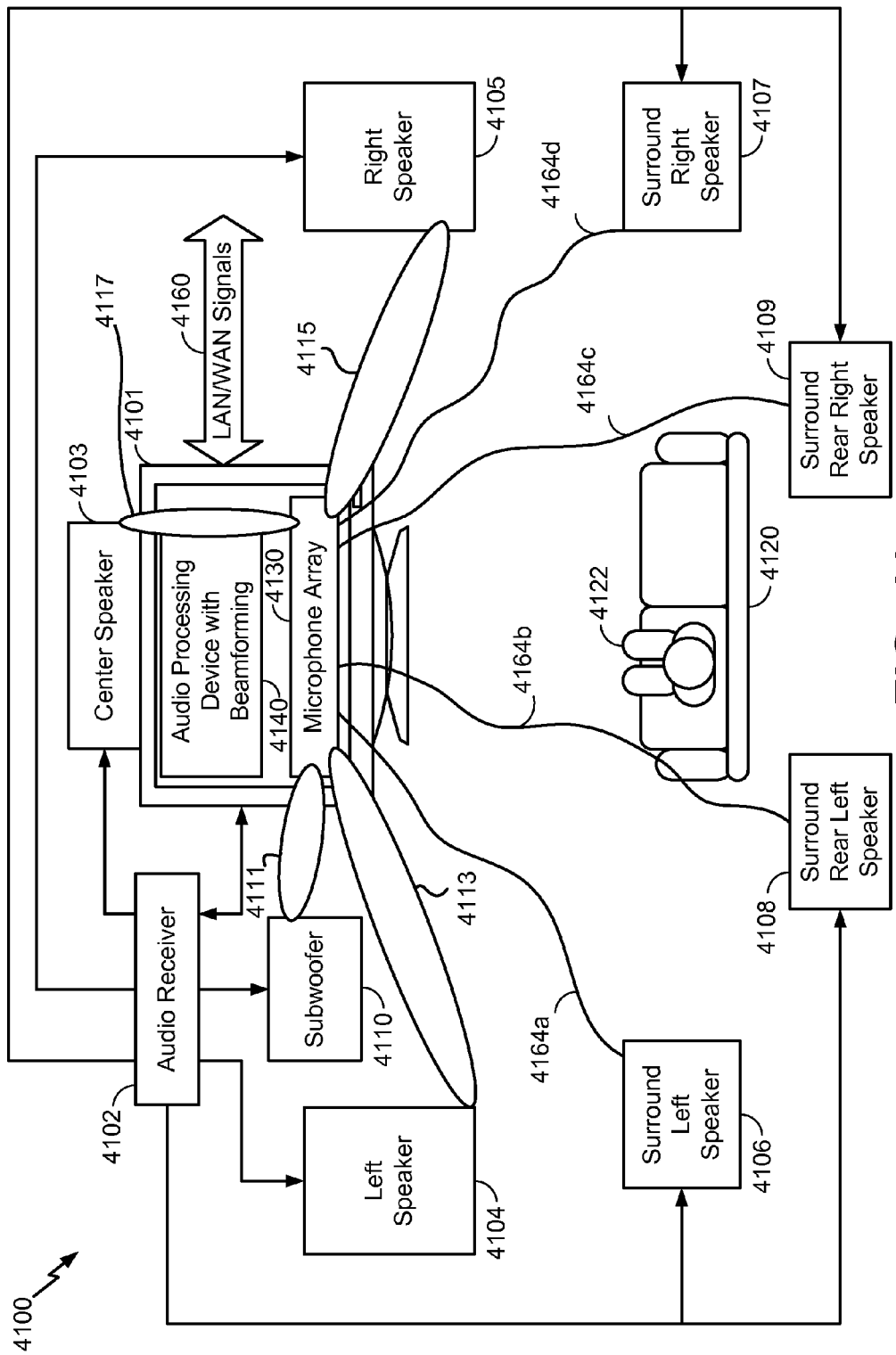
FIG. 41 is a block diagram illustrating one example of an approach for echo reduction in calibration mode in accordance with the systems and methods disclosed herein.

FIG. 41 is a block diagram illustrating one configuration of an approach for echo reduction in calibration mode in accordance with the systems and methods disclosed herein. In some implementations, the audio processing device 4140 may be included in a home theater system 4100 that may be an example of the home theater system 3600 described in connection with FIG. 36. The audio processing device 4140 may be operable to implement beamforming to reduce echo. In some implementations, the home theater system 4100 may include an electronic device 4101, an audio receiver 4102, a microphone array 4130, an audio processing component 4140, speakers 4103-4109, and a subwoofer 4110 that may be examples of corresponding elements described in connection with FIG. 36.

The home theater system 4100 may be adapted for receiving voice interaction from a user 4122. In some implementations, the electronic device 4101 may be a networking-enabled "smart" television that is capable of communicating local area network (LAN) and/or wide area network (WAN) signals 4160. When the home theater system 4100 is set up, each component may be positioned relative to a seating area 4120 to facilitate use of the home theater system 4100 (e.g., to improve surround-sound performance).

The approach depicted in FIG. 41 may provide a solution that may be implemented with two or more microphones, arranged as a microphone array 4130, for example. As described above, in some implementations, one or more speakers 4103-4109 and subwoofer 4110 may contribute to echo received at the microphone array 4130. The echo may result from signals being received at different times from the different speakers 4103-4110. Accordingly, in some implementations, one or more speakers 4103-4110 may be nulled as indicated in FIG. 41 by null beams 4111-4117. For example, a center speaker 4103, a right speaker 4105, a left speaker 4104 and a subwoofer 4110 may be nulled. As described above, in some implementations, the speakers that are opposite the user 4122 (e.g., the center speaker 4103, the left speaker 4104, the right speaker 4105 and the subwoofer 4110) may be nulled. In this example, the audio signals originating from speakers that have not been nulled (e.g., the surround left speaker 4106, the surround rear left speaker 4108, the surround rear right speaker 4109 and the surround right speaker 4107) may travel via unique acoustic path(s) 4164*a-d* before creating an echo at the microphone array 4130 as illustrated.

For example, an audio signal from a surround left speaker (SLS) 4106 may follow an SLS acoustic path 4164*a*, an audio signal from a surround rear left speaker (SRLS) 4108 may follow a SRLS acoustic path 4164*b*, an audio signal from a surround rear right speaker (SRRS) 4109 may follow a SRRS acoustic path 4164*c* and an audio signal from a surround right speaker (SRS) 4107 may follow a SRS acoustic path 4164*d*. While in the (second) calibration mode, the audio processing device 4140 may determine (e.g., learn) the acoustic paths 4164*a-d* from each of the speakers 4106-4109 as described above in connection with at least one of FIGS. 32 and 33. In some implementations, the acoustic paths 4164*a-d* may be used in filters for the corresponding speakers to generate a reference signal 3258 that may be used in echo cancellation.

Figure 42A:
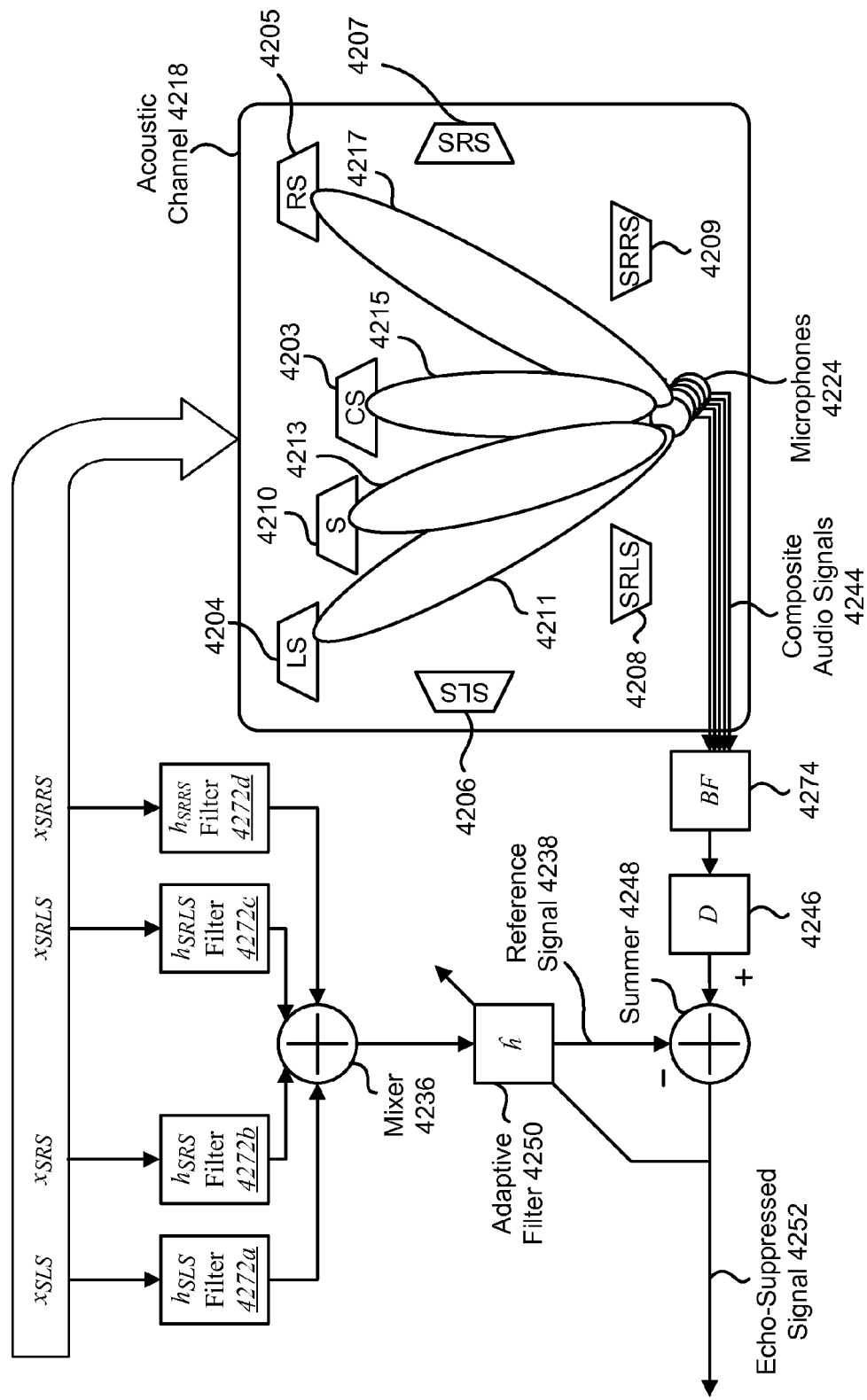
FIG. 42A is a block diagram illustrating one example of an approach for echo reduction in runtime mode in accordance with the systems and methods disclosed herein.

FIG. 42A is a block diagram illustrating one example of an approach for echo reduction in runtime mode in accordance with the systems and methods disclosed herein. The microphones 4224, speakers 4203-4209, subwoofer 4210, mixer 4236, acoustic channel 4218, adaptive filter 4250, delay block/module (denoted "D" in FIGS. 42A-C) 4246, beamformer (denoted "BF" in FIGS. 42A-C) 4274, summer 4248, composite audio signals 4244, reference signal 4238 and echo-suppressed signal 4252 may be examples of corresponding elements described in connection with one or more of FIGS. 32,36 and 41.

As described above, in some implementations, one or more speakers 4203-4210 may be nulled. In some implementations, nulling a speaker may include forming one or more null reception beams corresponding to one or more speakers (e.g., left speaker 4204, subwoofer 4210, center speaker 4203 and/or right speaker 4205) that radiate in an approximately opposite direction in relation to a desired audio signal source (e.g., a user). For example, nulling a speaker may include nulling multiple speakers (e.g., left speaker 4204, subwoofer 4210, center speaker 4203 and/or right speaker 4205) that face in approximately the same direction as a display (e.g., television) and/or that are located behind a display. In particular, nulling may include utilizing microphone signal subtraction techniques to reduce or remove sounds in a captured signal emanating from one or more particular directions. As depicted in FIG. 42A, the center speaker 4203, the left speaker 4204, the right speaker 4205 and the subwoofer 4210 may be nulled, as indicated by the null beams 4211-4217. In some implementations, the systems and methods disclosed herein may track the location of the speakers 4203-4210 and null some of them. Tracking and nulling the speakers 4203-4210 may result in an audio signal from an audio source that has reduced echo. In this example, the audio source (e.g., a speaker) may not be tracked. In some implementations, nulling one or more speakers 4203-4210 may be beneficial as it may reduce the complexity at runtime as fewer filters may be processed.

In some implementations, the number of speakers 4203-4210 that may be nulled may be based on the number of microphones 4224. More specifically, given M microphones 4224, M−1 speakers 4203-4210 may be nulled. For example, FIG. 42A depicts five microphones 4224. Accordingly, four speakers may be nulled. In this example, the beamformer 4274 may take in multiple microphone signals (e.g., composite audio signals 4444) and may produce a single (e.g., mono) output signal.

Figure 42B:
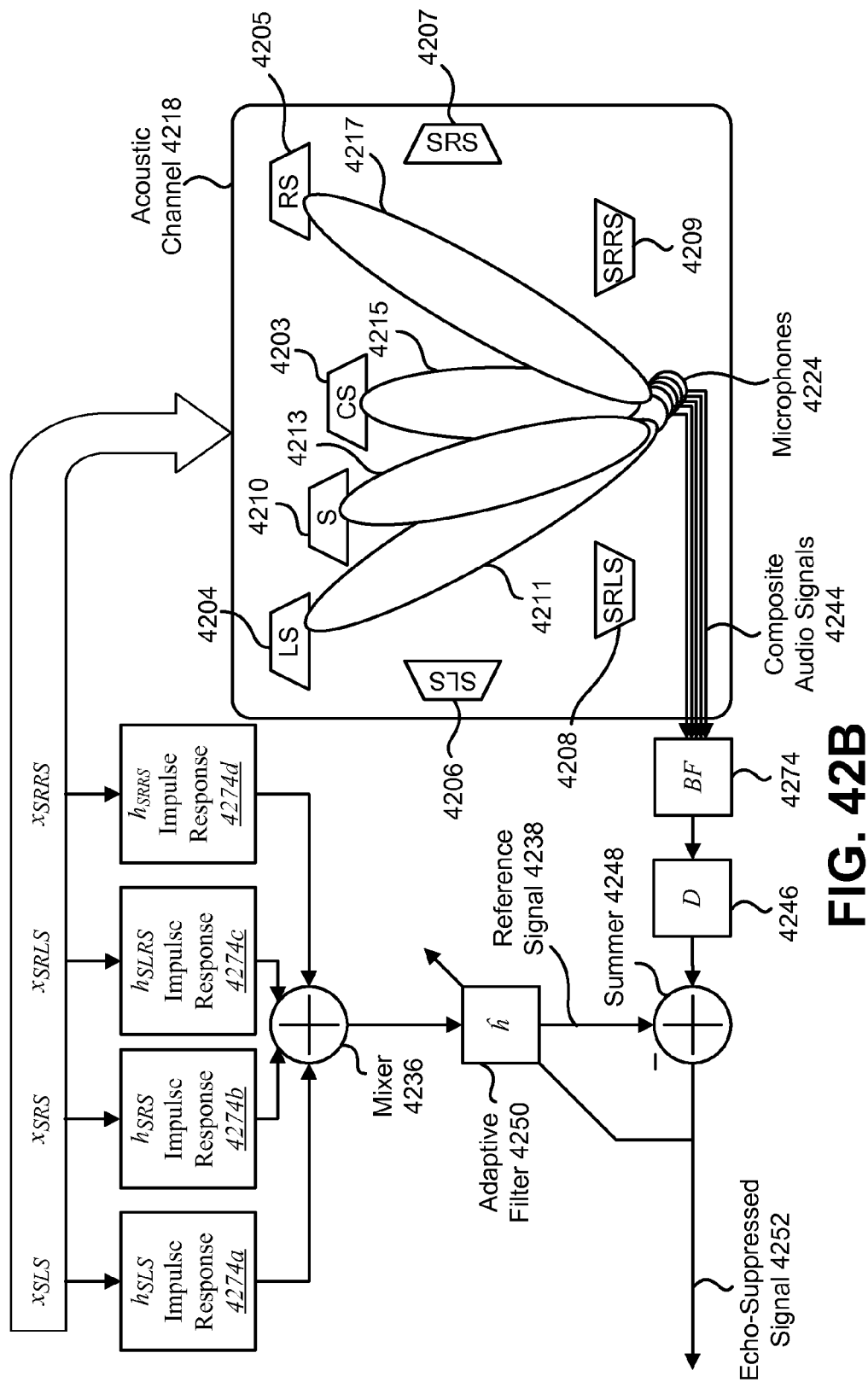
FIG. 42B is a block diagram illustrating a more specific example of an approach for echo reduction in runtime mode in accordance with the systems and methods disclosed herein.
Figure 42C:
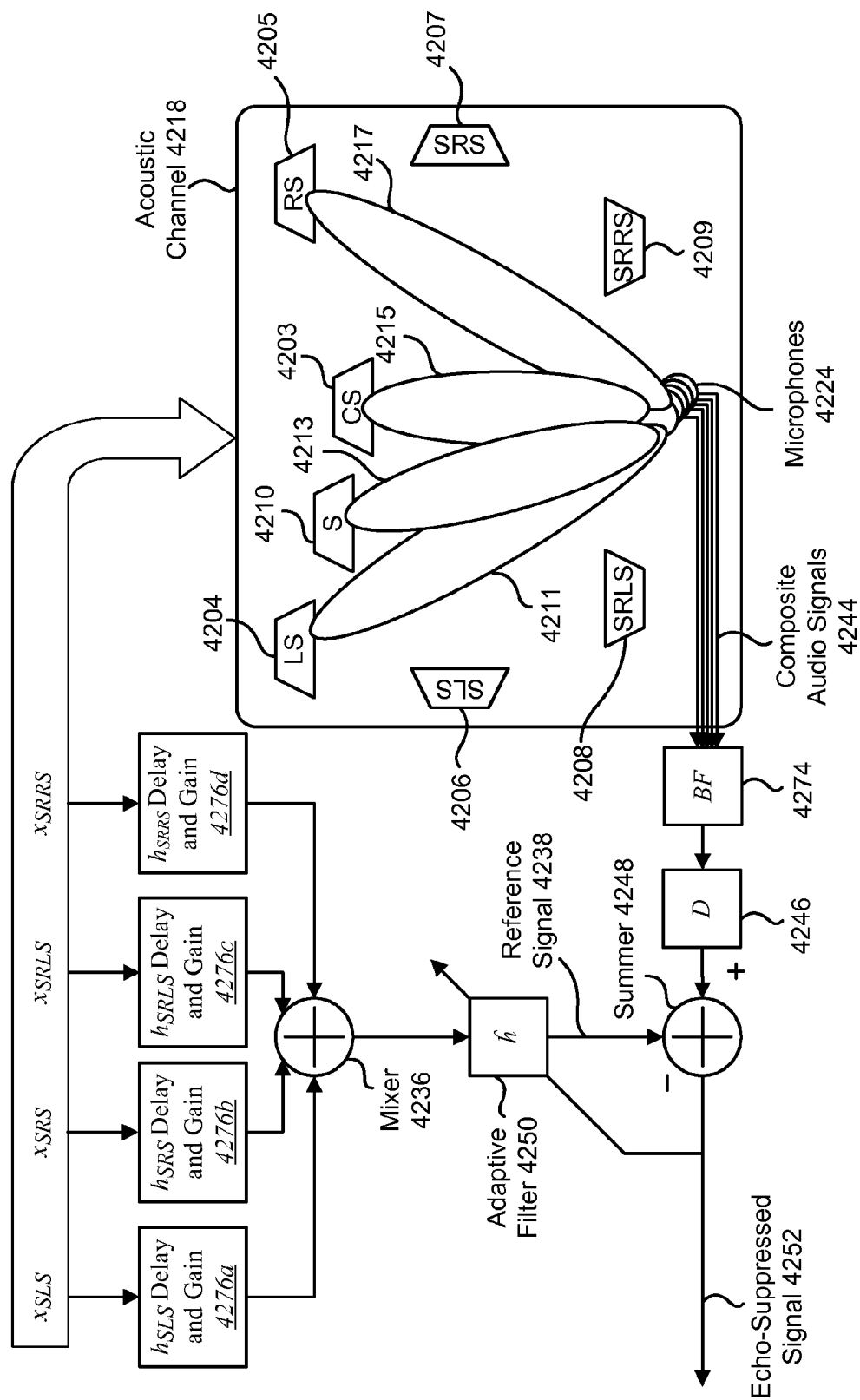
FIG. 42C is a block diagram illustrating another more specific example of an approach for echo reduction in runtime mode in accordance with the systems and methods disclosed herein.

In this implementation, one or more speaker filters 4272*a-d* may generate a mixed signal (e.g., the reference signal 4238) corresponding to the speakers 4206-4209 that have not been nulled (e.g., the surround right speaker 4207, the surround rear right speaker 4209, the surround rear left speaker 4208 and the surround left speaker 4206). The filters 4272*a-d* may filter the runtime audio signals based on different information. For example, the one or more speaker filters 4272*a-d* may be impulse response-based filters as depicted in FIG. 42B. In another example, the filters 4272*a-d* may filter the input signals based on a delay and gain as depicted in FIG. 42C. The filters 4272*a-d* may be implemented in the time domain, the frequency domain or the sub-band domain.

In some implementations, the filtering before the mixer 4236 (e.g., via the filters 4272*a-d*) may be replaced by delays. For example, instead of filtering each of the loudspeaker signals, each loudspeaker signal may be delayed by the inter-loudspeaker delays. For example, given four loudspeakers (e.g., 4206-4209), a loudspeaker with minimal echo path delay may be found and every other loudspeaker signal may be delayed by the respective inter-loudspeaker delay, in addition to or alternatively from applying a filter (4272*a-d*).

As described in connection with FIGS. 32 and 33, an electronic device may create a mono far-end reference signal 4238 by mixing the individual runtime audio signals using the acoustic paths 4164*a-d* learned from the calibration mode. The generated mono far-end reference signal 4238 and the appropriately delayed composite audio signals 4244 may be used to run the mono echo cancellation and may cancel the surround echo.

The approach described in FIGS. 32, 33 and 42A-C may address the non-uniqueness problem as follows. The mixed far-end mono source used for adaptation may have a correlation matrix that is not ill-conditioned in this approach. Furthermore, any variations in the far-end (e.g., surround image of the signal) may not mandate a change in the adaptive filter 4250, as there may be a unique solution to the adaptive process. Additionally, this approach may be beneficial in that the echo-path variations in an acoustic channel 4218 (e.g., the living room) may also have minimal impact on the residual echo. For instance, if one/more of the speakers 4203-4209 or subwoofer 4210 in the acoustic channel 4218 are blocked, with this approach, only echo contributed by those speakers may be affected. The adaptive filter 4250 may still need to converge to the original unique sparse response.

FIG. 42B is a block diagram illustrating a more specific example of an approach for echo reduction in runtime mode in accordance with the systems and methods disclosed herein. As described in connection with FIG. 42A, in some implementations, the filters 4272*a-d* may be impulse response-based filters 4274*a-d* as depicted in FIG. 42B. For example, the impulse response-based filters 4274*a-d* may learn the impulse responses of the different runtime audio signals and may combine them. As a result, the mixer 4236 may generate a combined impulse response of the speakers 4206-4209 that have not been nulled.

FIG. 42C is a block diagram illustrating another more specific example of an approach for echo reduction in runtime mode in accordance with the systems and methods disclosed herein. As described in connection with FIG. 42A, in some implementations, the filters 4272*a-d* may be based on delay and gain as depicted in FIG. 42C. For example, the delay and gain filters 4276*a-d* may learn the delays and gains of the different runtime audio signals and may combine them accordingly. As a result, the mixer 4236 may generate a combined delay and gain signal of the speakers 4206-4209 that have not been nulled.

Figure 43:
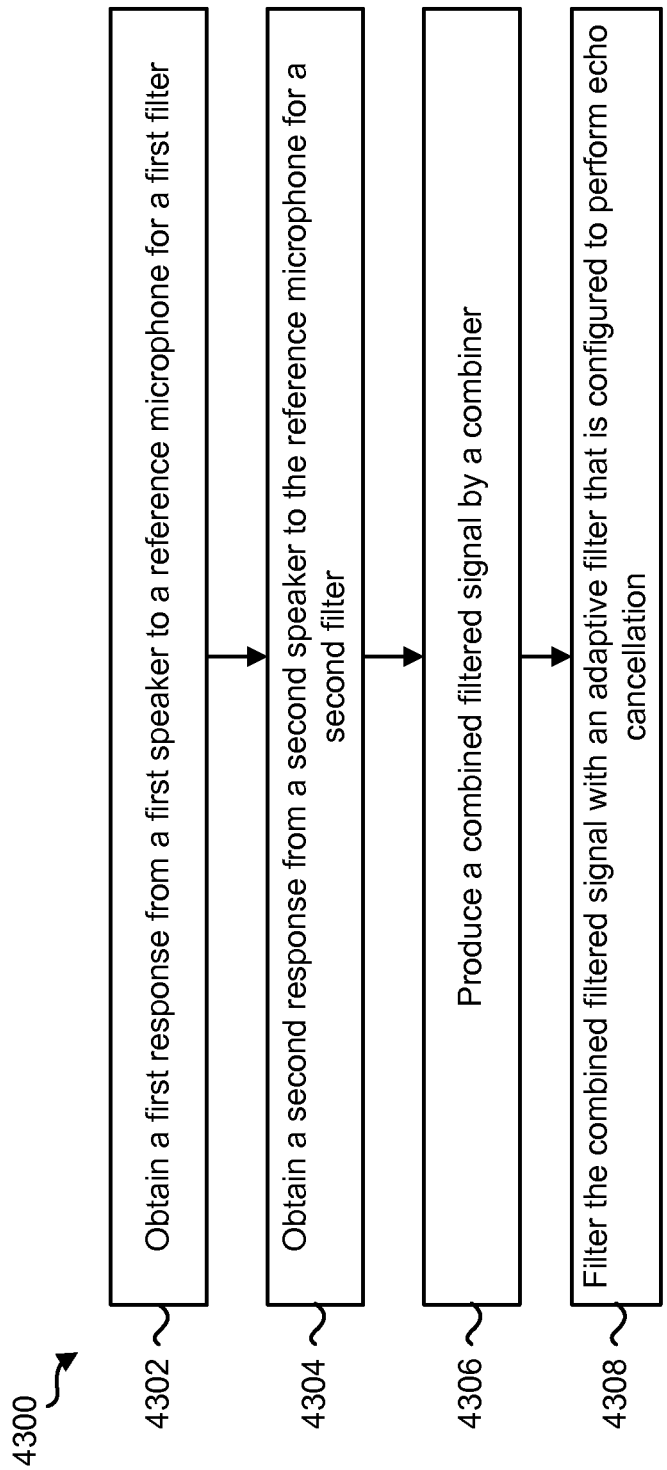
FIG. 43 is a flow diagram illustrating one configuration of a method for echo reduction.

FIG. 43 is a flow diagram illustrating one configuration of a method 4300 for echo reduction. The method 4300 may be performed by one or more electronic devices. An electronic device may obtain 4302 a first response from a first speaker to a reference microphone for a first filter. For example, a reference microphone (e.g., the microphone 3224) may receive a first response (e.g., a first acoustic path) that pertains to a center speaker 103. The first response (e.g., the first acoustic path) may be passed to a first filter that pertains to the first speaker. In some implementations, the first filter may be configured to only change the amplitude and delay of an input signal.

The electronic device may obtain 4304 a second response from a second speaker to the reference microphone for a second filter. For example, a reference microphone (e.g., the microphone 3224) may receive a second response (e.g., a second acoustic path) that pertains to a left speaker 104. The second response (e.g., the second acoustic path) may be passed to a second filter that pertains to the second speaker. In some implementations, coefficients from the first filter and the second filer may be shared. By comparison, in some implementations, the coefficients from the first filter may be utilized as coefficients for the second filter.

Optionally, in some implementations, the electronic device may obtain 4304 one or more additional responses for one or more additional filters (e.g., responses for a third filter through a fifth filter and/or for a sixth filter through a seventh filter). In some implementations, this may be performed as described above.

The electronic device may produce 4306 a combined filtered signal by a combiner. In some implementations, the combiner may produce 4306 a combined filtered signal based on the set of responses. For example, the combiner may combine the filtered audio signals that have been filtered based on the responses. In some implementations, the combiner may include all or part of the functionality of the mixer 3236 described in connection with FIG. 32. The combined filtered signal may be an example of the reference signal 3238 described in connection with FIG. 32.

The electronic device may filter 4308 the combined filtered signal with an adaptive filter 3250 that is configured to perform echo cancellation. For example, the combined filtered signal may be provided to an adaptive filter 3250. The adaptive filter 3250 may perform echo cancellation. For instance, the adaptive filter 3250 may shift the combined filtered signal (e.g., the reference signal 3238) within a number of samples. In some implementations, performing echo cancellation may include subtracting the combined filtered signal from a received composite audio signal 3244. Subtracting the combined filtered signal from a received composite audio signal 3244 may result in an echo-suppressed signal 3252.

Figure 44A:
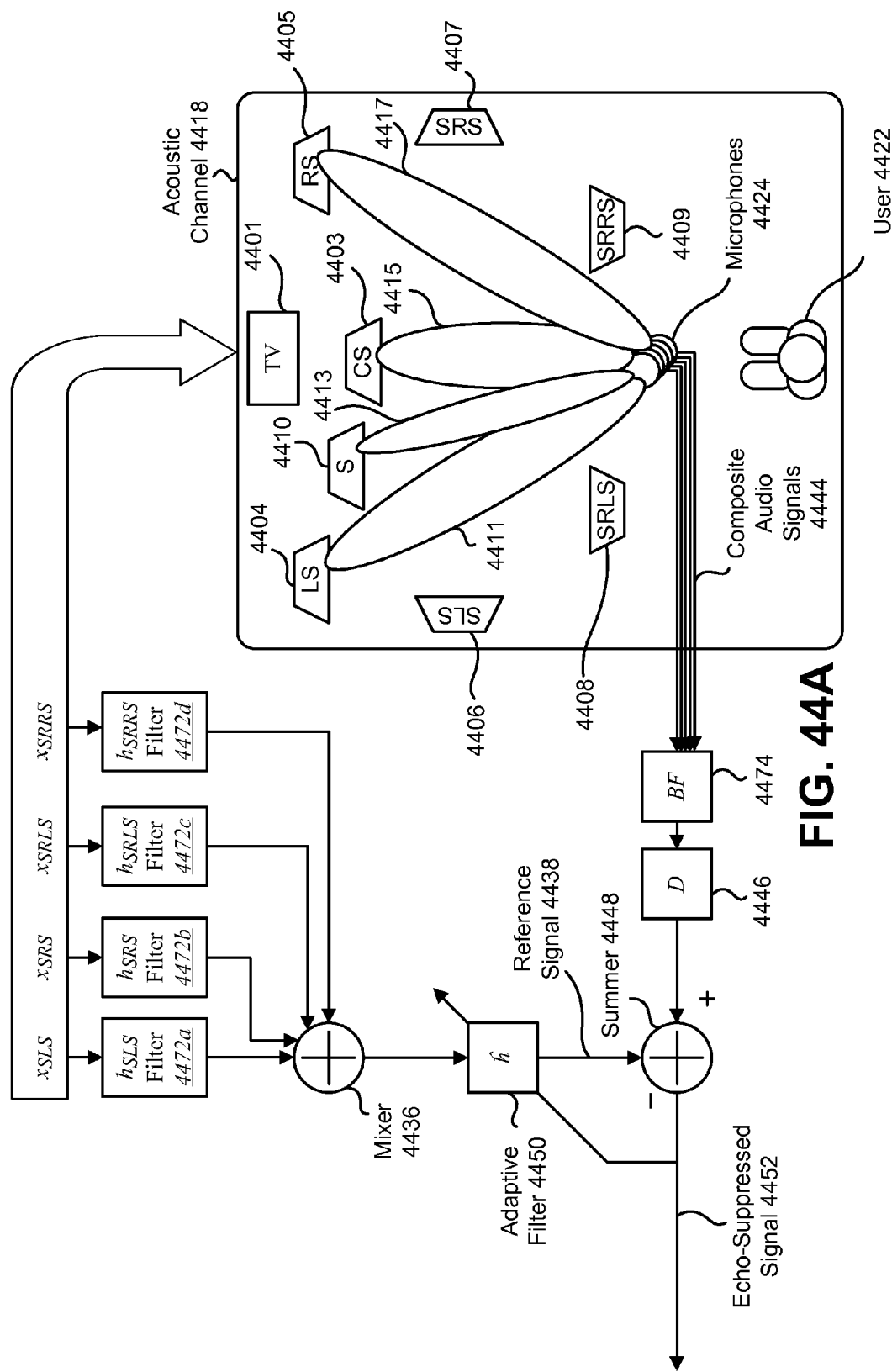
FIGS. 44A-C are block diagrams illustrating specific examples of approaches for echo reduction in runtime mode in accordance with the systems and methods disclosed herein.

FIG. 44A is a block diagram illustrating a more specific example of an approach for echo reduction in runtime mode in accordance with the systems and methods disclosed herein. The microphones 4424, speakers 4403-4409, subwoofer 4410, acoustic channel 4418, filters 4472*a-d*, mixer 4436, adaptive filter 4450, delay block/module 4446, beamformer 4474, summer 4448, composite audio signals 4444, reference signal 4438, and echo-suppressed signal 4452 may be examples of corresponding elements described in connection with at least one or more of FIGS. 32, 36 and 41. The example depicted in FIG. 44 may be similar to the example illustrated in FIG. 42.

In some implementations, N−1 speakers 4403-4410 may be nulled, were N is the number of microphones 4424. In the example depicted in FIG. 44A, five microphones 4424 may be used to receive the composite audio signals 4444. Accordingly, four speakers may be nulled.

In some implementations, determining which speakers are nulled may be selected based on their location. An example is given as follows. As described in connection with FIG. 36, a user 4422 may be facing an electronic device 4401 (e.g., a TV) and a center speaker 4403, a left speaker 4404, a right speaker 4405 and a subwoofer 4410 may be behind the TV. Because the desired audio signal (e.g., a user's speech) is coming from the front of the TV, it may be desirable to separate audio signals coming from behind the TV. Accordingly, the center speaker 4403, the left speaker 4404, the right speaker 4405 and the subwoofer 4410 may be nulled (as depicted by null beams 4411-4417).

It should be noted that while FIG. 44A depicts a certain configuration of nulled speakers, any combination of speakers may be nulled. In this example, the speakers that are not nulled (e.g., the surround left speaker 4406, the surround right speaker 4407, the surround rear left speaker 4408 and the surround rear right speaker 4409) may be combined as described in connection with at least one of FIGS. 32 and 33. The number of speaker signals that may be filtered and mixed may be based on the number of microphones 4424 and the number of nulled speakers. More specifically, given M microphones, and N nulled speakers, the filters 4472a-d and the mixer 4438 may process (M–N) signals. For example, given five microphones 4424 and four nulled speakers as indicated in FIG. 44A, the filters 4472a-d and the mixer 4438 may process one signal. Accordingly, given M microphones 4424 (five microphones 4424, for example) M−1 speakers (four, for example) may be nulled out. After doing so, a single signal (e.g., single microphone) may survive. Accordingly, there may be only one mixer 4438 and one adaptive filter 4450 and one echo-suppressed signal 4452 for any further processing. In some implementations, one or more of the microphones 4424 may not require a fixed filter. For example, as depicted in FIG. 44A, five microphones 4424 may be used to filter the audio signals. In some implementations, one set of filters may be used for the different microphones 4424.

Figure 44B:
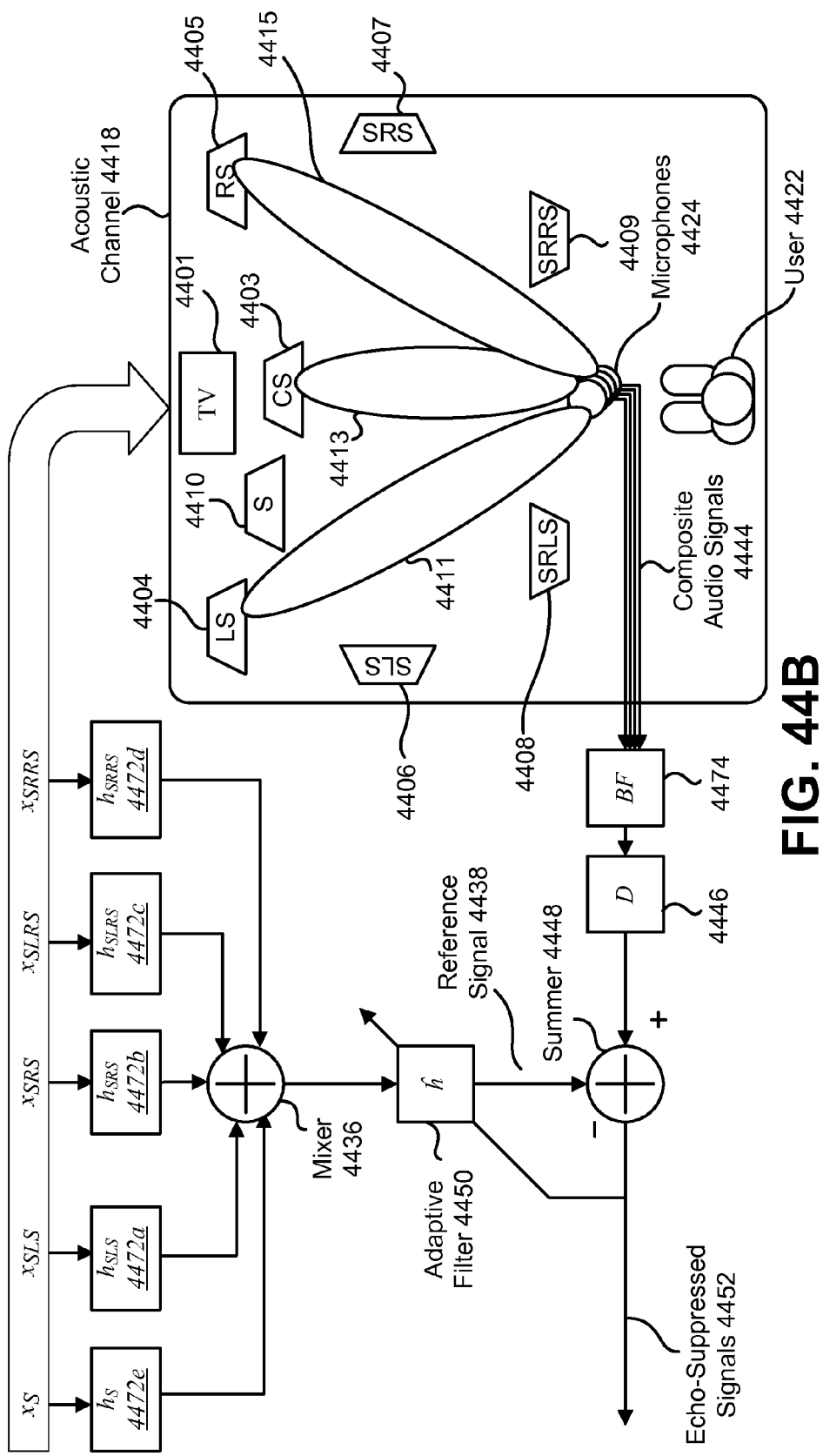

FIG. 44B is a block diagram illustrating a more specific example of an approach for echo reduction in runtime mode in accordance with the systems and methods disclosed herein. As described in connection with FIG. 44A, M−1 speakers 4403-4410 may be nulled, were M is the number of microphones 4424. In the example depicted in FIG. 44B, four microphones 4424 may be used to receive the composite audio signals 4444. Accordingly, three speakers (e.g., the center speaker 4403, the left speaker 4404 and the right speaker 4405) may be nulled (as depicted by null beams 4411-4415). It should be noted that while FIG. 44B depicts a certain configuration of nulled speakers, any combination of speakers may be nulled. In this example, the speakers that are not nulled (e.g., the surround left speaker 4406, the surround right speaker 4407, the surround rear left speaker 4408, the surround rear right speaker 4409 and the subwoofer 4410) may be combined as described in connection with at least one of FIGS. 32 and 33.

In some implementations, one or more of the microphones 4424 may not require a fixed filter. For example, as depicted in FIG. 44B, four microphones 4424 may be used to filter the audio signals. In some implementations, one set of filters may be used for the different microphones 4424. Using fewer filters may be beneficial as it may reduce runtime complexity and may improve runtime processing efficiency. Furthermore, using the approach depicted in FIG. 44B may be beneficial as it implements fewer microphones 4424, and null beams 4411-4415 which may also reduce runtime complexity and improve runtime processing efficiency.

Figure 44C:
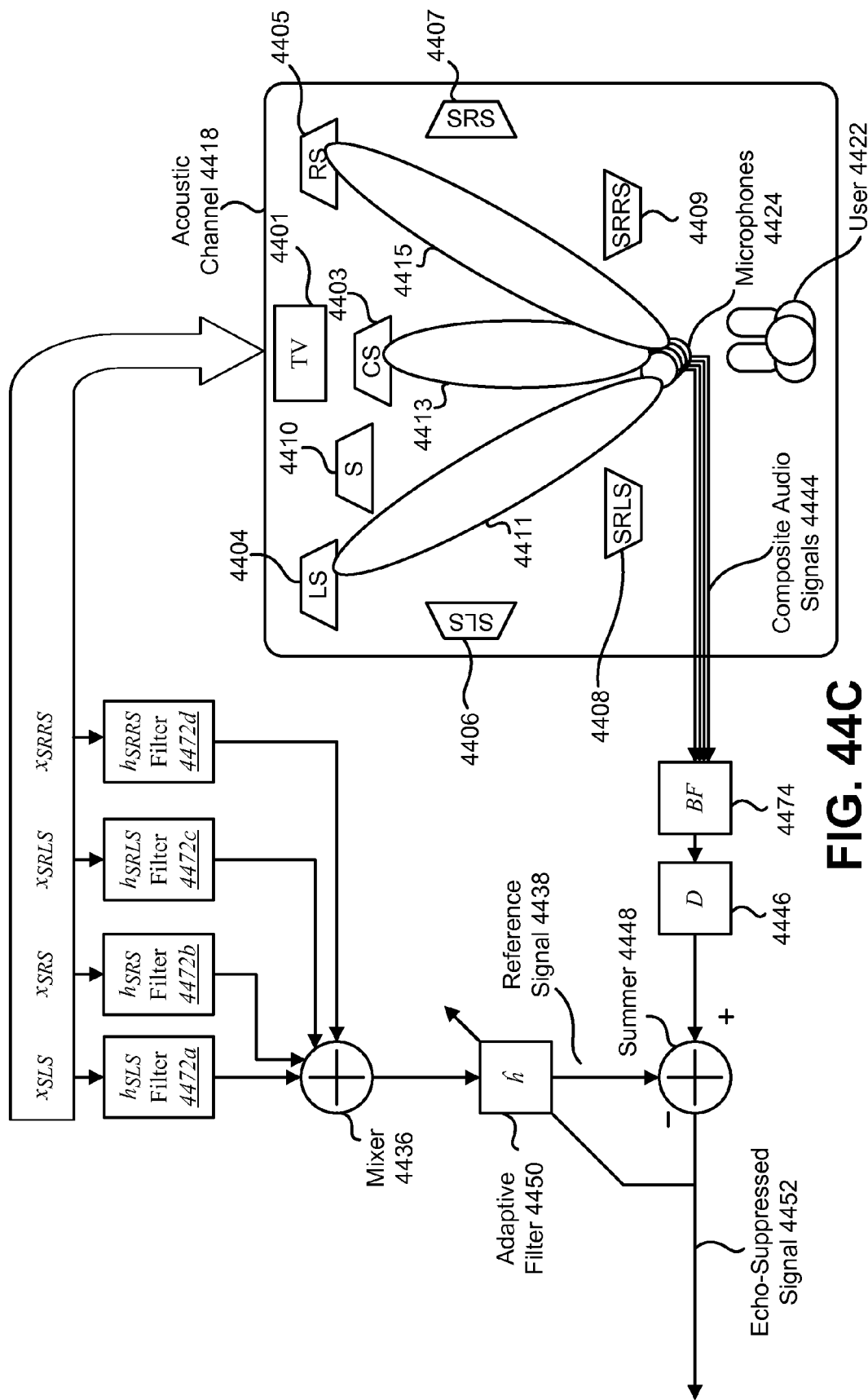

FIG. 44C is a block diagram illustrating a more specific example of an approach for echo reduction in runtime mode in accordance with the systems and methods disclosed herein. In the example depicted in FIG. 44C, four microphones 4424 may be used to receive the composite audio signals 4444. Accordingly, three speakers (e.g., the center speaker 4403, the left speaker 4404 and the right speaker 4405) may be nulled (as depicted by null beams 4411-4415). It should be noted that while FIG. 44C depicts a certain configuration of nulled speakers, any combination of speakers may be nulled. In this example, a subset of the speakers that are not nulled (e.g., the surround left speaker 4406, the surround right speaker 4407, the surround rear left speaker 4408, the surround rear right speaker 4409) may be combined as described in connection with at least one of FIGS. 32 and 33. For example, the surround left speaker 4406, the surround right speaker 4407, the surround rear left speaker 4408 and the surround rear right speaker 4409 may be combined (e.g., via the filters 4472a-d and the mixer 4436) However, in this example, the subwoofer 4410 may not be combined.

Figure 45:
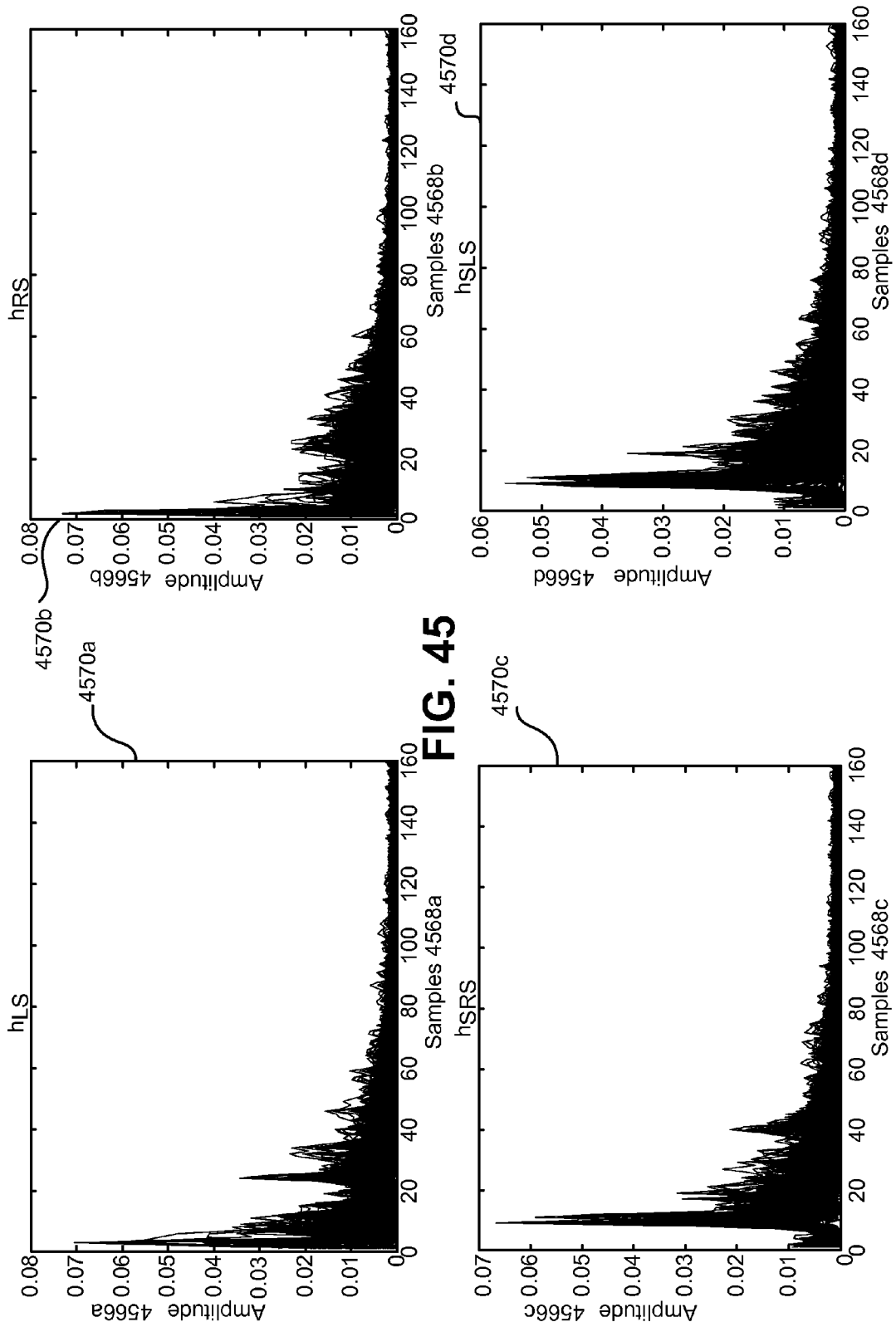
FIG. 45 includes plots that illustrate examples of several acoustic paths.

FIG. 45 includes plots 4570a-d that illustrate examples of several acoustic paths. In this example, four surround sound speakers may be excited: left (LS) 3604, right (RS) 3605, surround left (SLS) 3606 and surround right (SRS) 3607. The plots illustrate acoustic paths ($h_{LS}$, $h_{RS}$, $h_{SRS}$, $h_{SLS}$) corresponding to the speakers. For example, a first plot 4570a illustrates acoustic paths ($h_{LS}$) corresponding to the left speaker 104, a second plot 4570b illustrates acoustic paths ($h_{RS}$) corresponding to the right speaker 105, a third plot 4570c illustrates acoustic paths ($h_{SRS}$) corresponding to the surround right speaker 107 and a fourth plot 4570d illustrates acoustic paths ($h_{SLS}$) corresponding to the surround left speaker 106. The plots 4570a-d are illustrated in amplitude 4566a-d on the vertical axes and samples 4568a-d on the horizontal axes. In particular, the plots 4564a-d illustrate learned acoustic paths from each of the loudspeakers based on actual recordings during a (second) calibration mode. It should be noted that FIGS. 45-47 illustrate a first set of data.

FIG. 46 includes plots 4670a-c that illustrate examples of filter coefficients at different time instances. More specifically, the plots illustrate learned adaptive filter coefficients at different time instances based on actual recordings. In particular, a first plot 4670a illustrates filter coefficients after 25 seconds, a second plot 4670b illustrates the filter coefficients after 85 seconds and a third plot 4670c illustrates the filter coefficients at the end of the recording. The plots 4670a-c are illustrated in amplitude 4666a-c on the vertical axes and samples 4668a-c on the horizontal axes.

Figure 47:
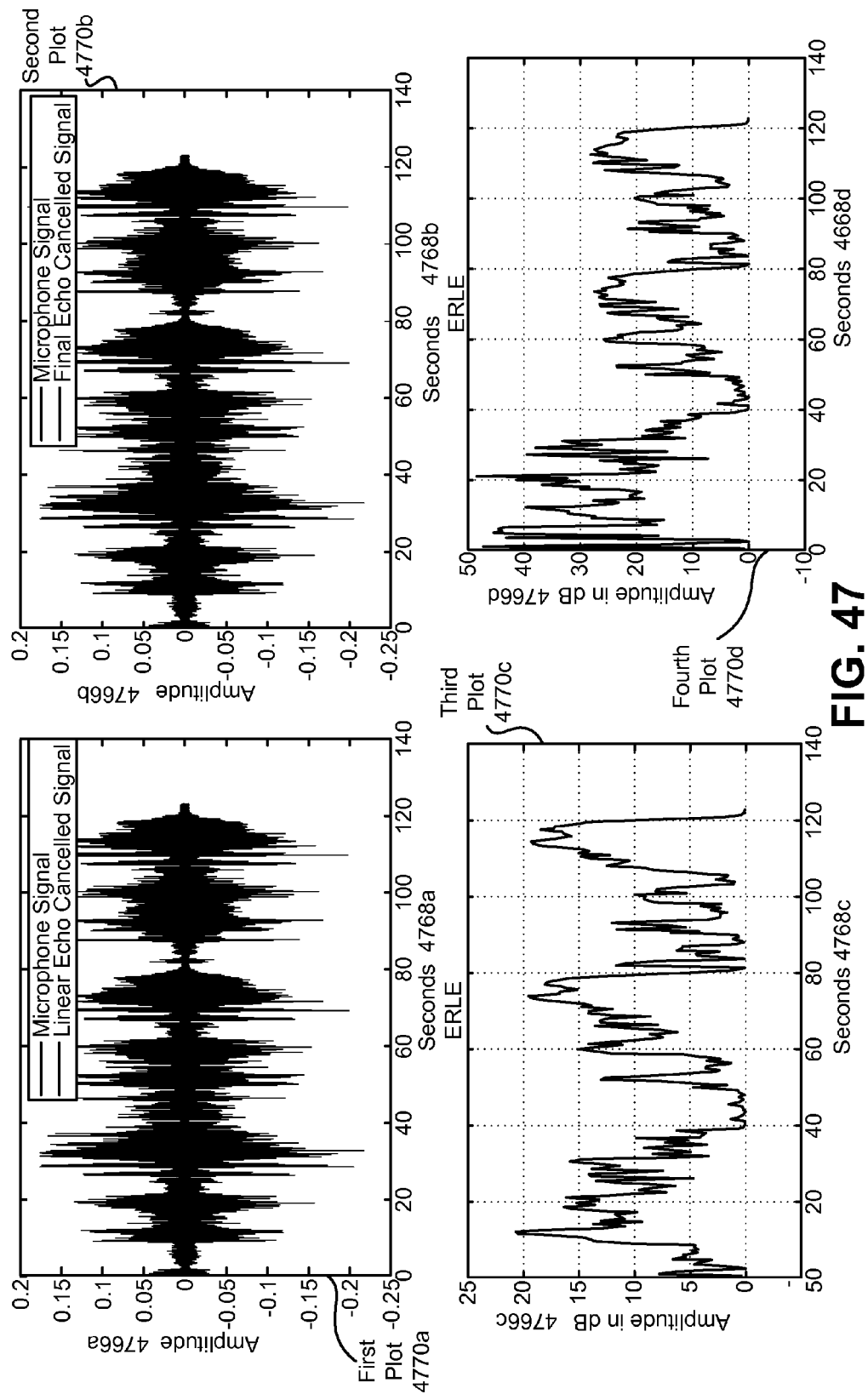
FIG. 47 includes plots that illustrate examples of echo cancelled signals based on recordings.

FIG. 47 includes plots 4770a-d that illustrate examples of echo cancelled signals based on recordings. In particular, the first plot 4770a illustrates a microphone signal versus a linear echo cancelled signal, the third plot 4770c illustrates a plot of a corresponding echo return loss enhancement (ERLE), the second plot 4770b illustrates a microphone signal versus a final echo cancelled signal and the fourth plot 4770d illustrates a plot of a corresponding ERLE. The first plot 4770a and the second plot 4770b are shown in amplitude 4766a-b on the vertical axes and in seconds 4768a-b on the horizontal axes. The third plot 4770c and the fourth plot 4770d are shown in amplitude 4766c-d in decibels (dB) on the vertical axes and in seconds 4768c-d on the horizontal axes.

Figure 48:
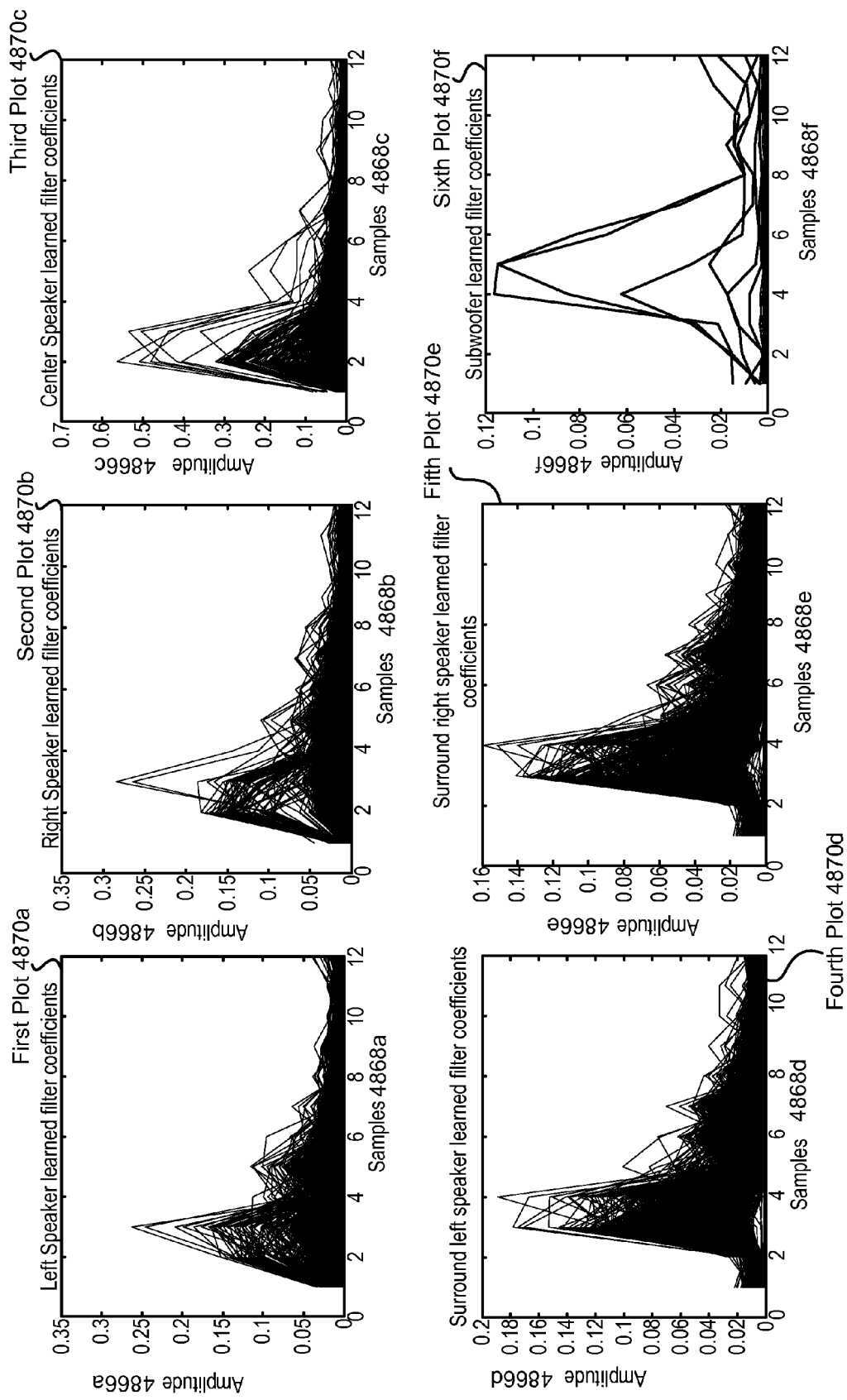
FIG. 48 includes plots that illustrate another example of several acoustic paths.

FIG. 48 includes plots 4870a-f that illustrate another example of several acoustic paths. In this example, an actual 5.1 surround sound system is used and 5.1 content is played. In particular, six surround sound speakers are excited: left 3604, right 3605, center 3603, surround left 3606, surround right 3607 and subwoofer 3610. The plots 4870a-f illustrate learned acoustic paths or filter coefficients corresponding to the speakers. For example, a first plot 4870a illustrates learned acoustic paths or filter coefficients corresponding to a left speaker 104, a second plot 4870b illustrates learned acoustic paths or filter coefficients corresponding to a right speaker 105, a third plot 4870c illustrates learned acoustic paths or filter coefficients corresponding to a center speaker 103, a fourth plot 4870d illustrates learned acoustic paths or filter coefficients corresponding to a surround left speaker 106, a fifth plot 4870e illustrates learned acoustic paths or filter coefficients corresponding to a surround right speaker 107 and a sixth plot 4870f illustrates learned acoustic paths or filter coefficients corresponding to a subwoofer 110. The plots 4870a-f are illustrated in amplitude 4866a-f on the vertical axes and samples 4868a-f on the horizontal axes. In particular, the plots 4870a-f illustrate learned acoustic paths from each of the loudspeakers based on actual recordings of a 5.1 system during a (second) calibration mode.

Figure 49:
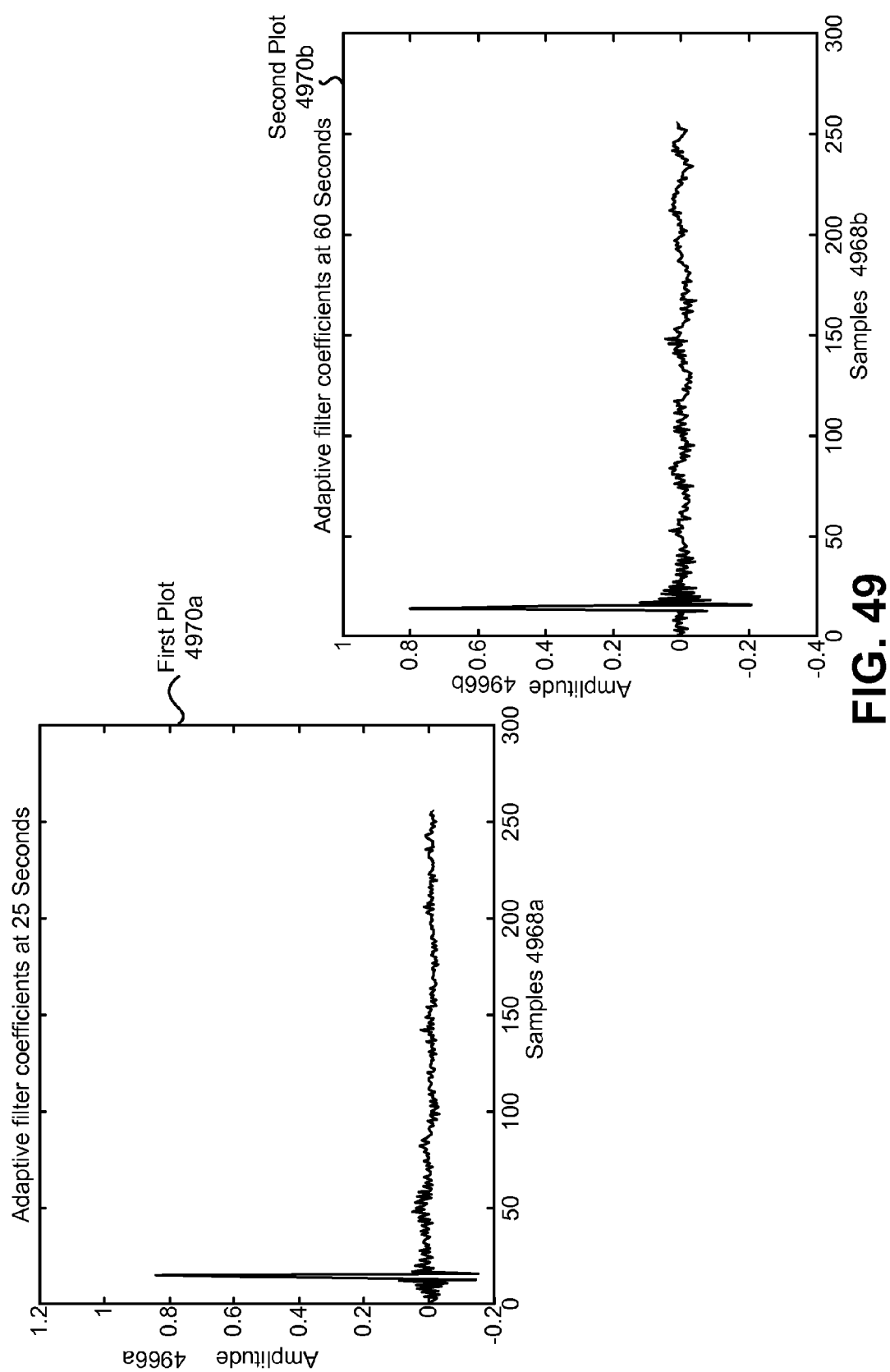
FIG. 49 includes plots that illustrate examples of filter coefficients at different time instances for an actual 5.1 system.

FIG. 49 includes plots 4970a-b that illustrate examples of filter coefficients at different time instances for an actual 5.1 system. More specifically, the plots 4970a-b illustrate learned adaptive filter coefficients at different time instances based on actual recordings. In particular, the first plot 4970a illustrates filter coefficients after 25 seconds and the second pot 4970b illustrates the filter coefficients at 60 seconds. In this instance, calibration is done on a fourth microphone and the impulse is tracked for the same microphone. The plots 4970a-b are illustrated in amplitude 4966a-b on the vertical axes and samples 4968a-b on the horizontal axes.

Figure 50:
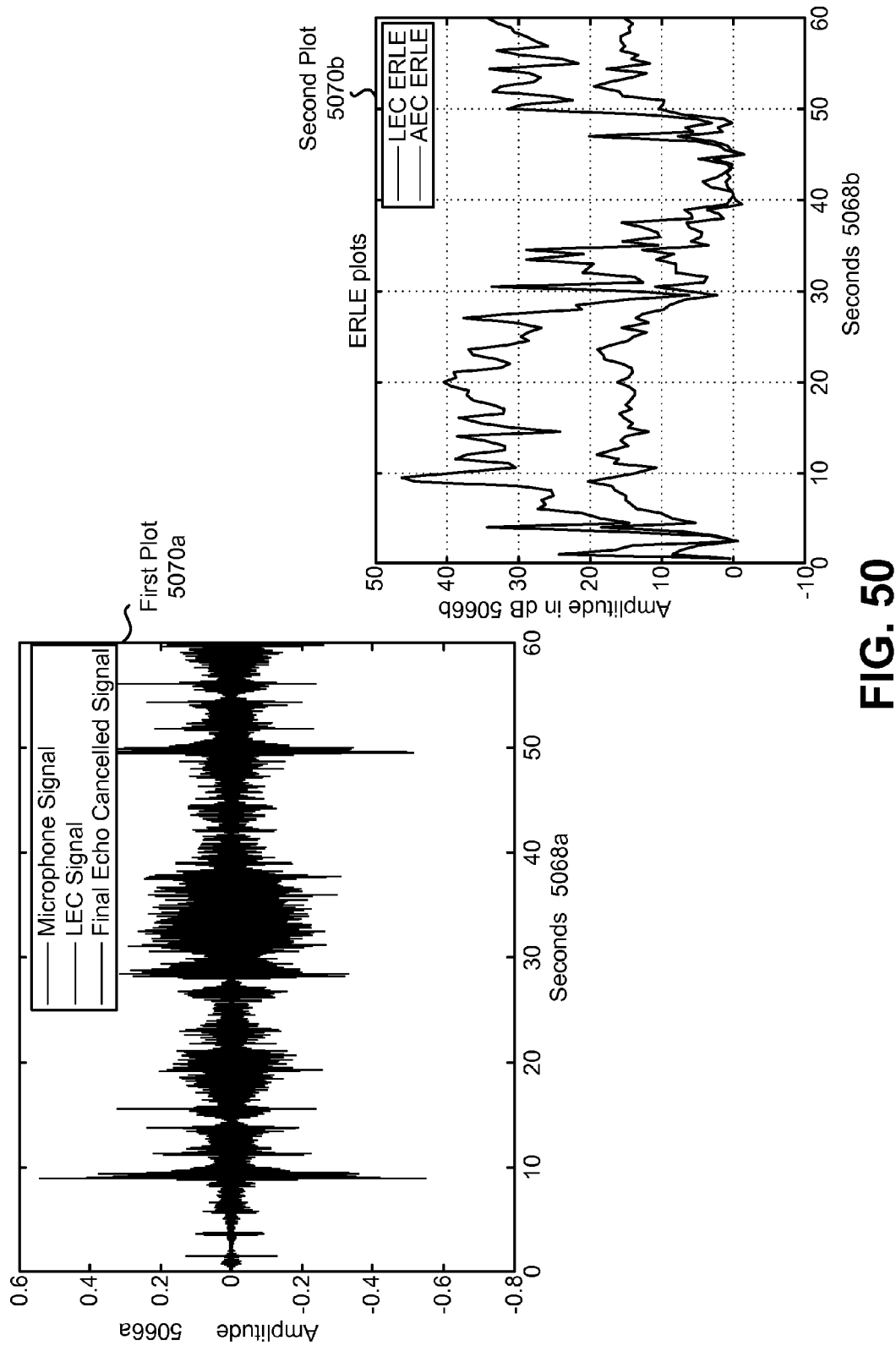
FIG. 50 includes plots that illustrate examples of an echo cancelled signal based on recordings of a 5.1 system.

FIG. 50 includes plots 5070a-b that illustrate examples of an echo cancelled signal based on recordings of a 5.1 system. In particular, the first plot 5070a illustrates a microphone signal, a linear echo cancelled signal and a final echo cancelled signal. The second plot 5070b illustrates corresponding ERLE plots. The first plot 5070a is shown in amplitude 5066a on the vertical axis and in seconds 5068a on the horizontal axis. The second plot 5070b is shown in amplitude 5066b in dB on the vertical axis and in seconds 5068b on the horizontal axis. In this instance, calibration is done on a fourth microphone and echo cancellation is run on the same microphone. In some implementations, the calibration that is done on the fourth microphone may be applied to other microphones. Sharing coefficients (e.g., acoustic paths) in this fashion may be beneficial as it alleviates the need for learning filter coefficients corresponding to all of the microphones, which may reduce the complexity of one or more of calibration and/or runtime processing.

Figure 51:
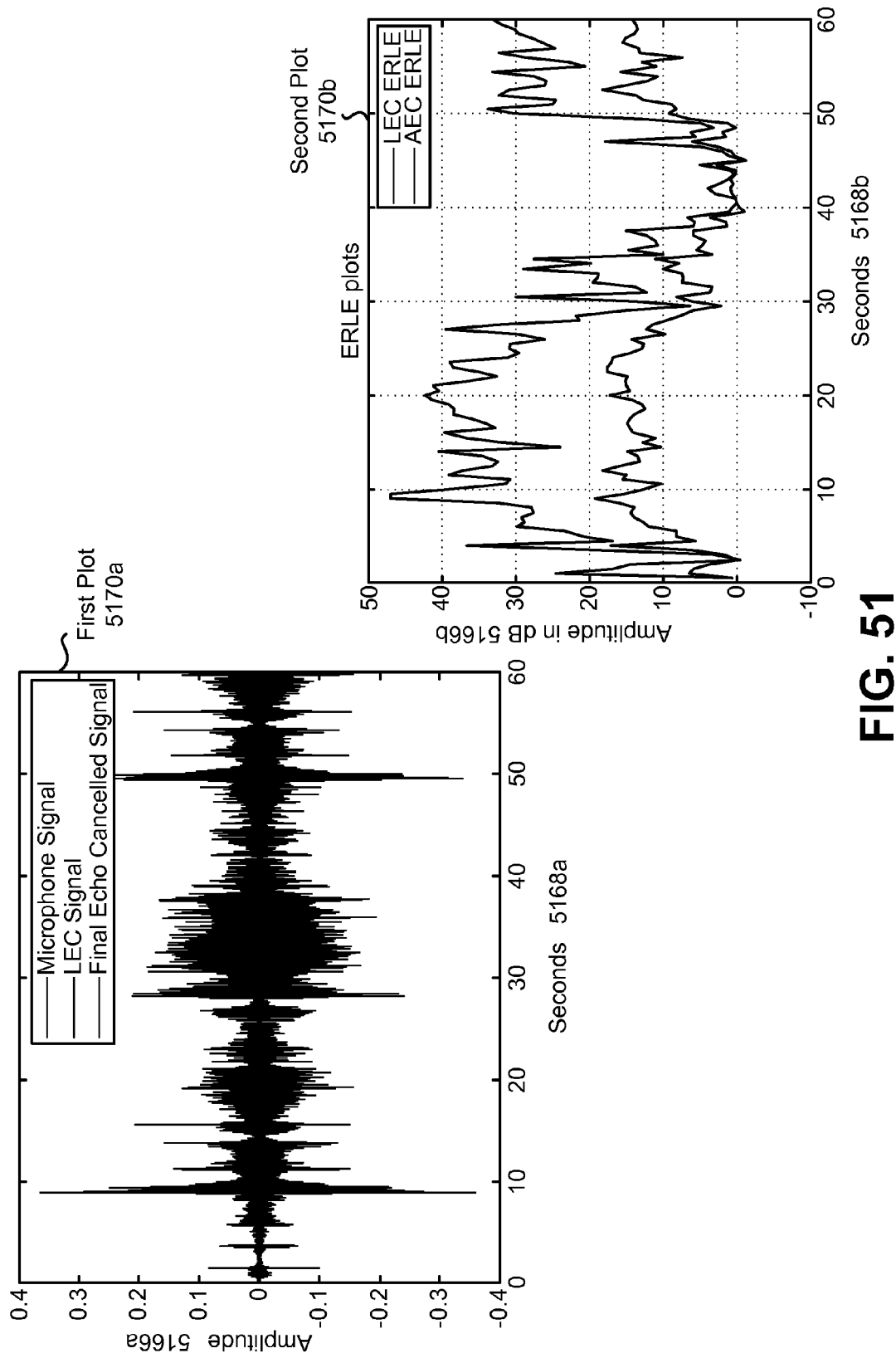
FIG. 51 includes plots that illustrate more examples of an echo cancelled signal based on recordings of a 5.1 system.

FIG. 51 includes plots 5170a-b that illustrate more examples of an echo cancelled signal based on recordings of a 5.1 system. In this instance, however, calibration is done on a fourth microphone and echo cancellation is run on a third microphone. In other words, the calibration corresponding to the fourth microphone may be used by a filter corresponding to the third microphone during echo cancellation. In this example, calibration corresponding to the third microphone may not need to be performed (due to microphone spacing, for example). In some implementations, performing calibration based on one microphone (e.g., the fourth microphone) and applying that calibration for performing echo cancellation corresponding to another microphone (e.g., the third microphone) may be an example of coefficient (e.g., acoustic path) sharing and may be beneficial as fewer than all microphones used during runtime may be used to calibrate.

This illustrates one configuration of the systems and methods disclosed herein, where calibration that is performed on one microphone may be applied to one or more different microphones. In particular, the first plot 5170a illustrates a microphone signal, a linear echo cancelled signal and a final echo cancelled signal. The second plot 5170b corresponding ERLE plots. The first plot 5170a is shown in amplitude 5166a on the vertical axis and in seconds 5168a on the horizontal axis. The second plot 5170b is shown in amplitude 5166b in decibels (dB) in the vertical axis and in seconds 5168b on the horizontal axis.

Figure 52:
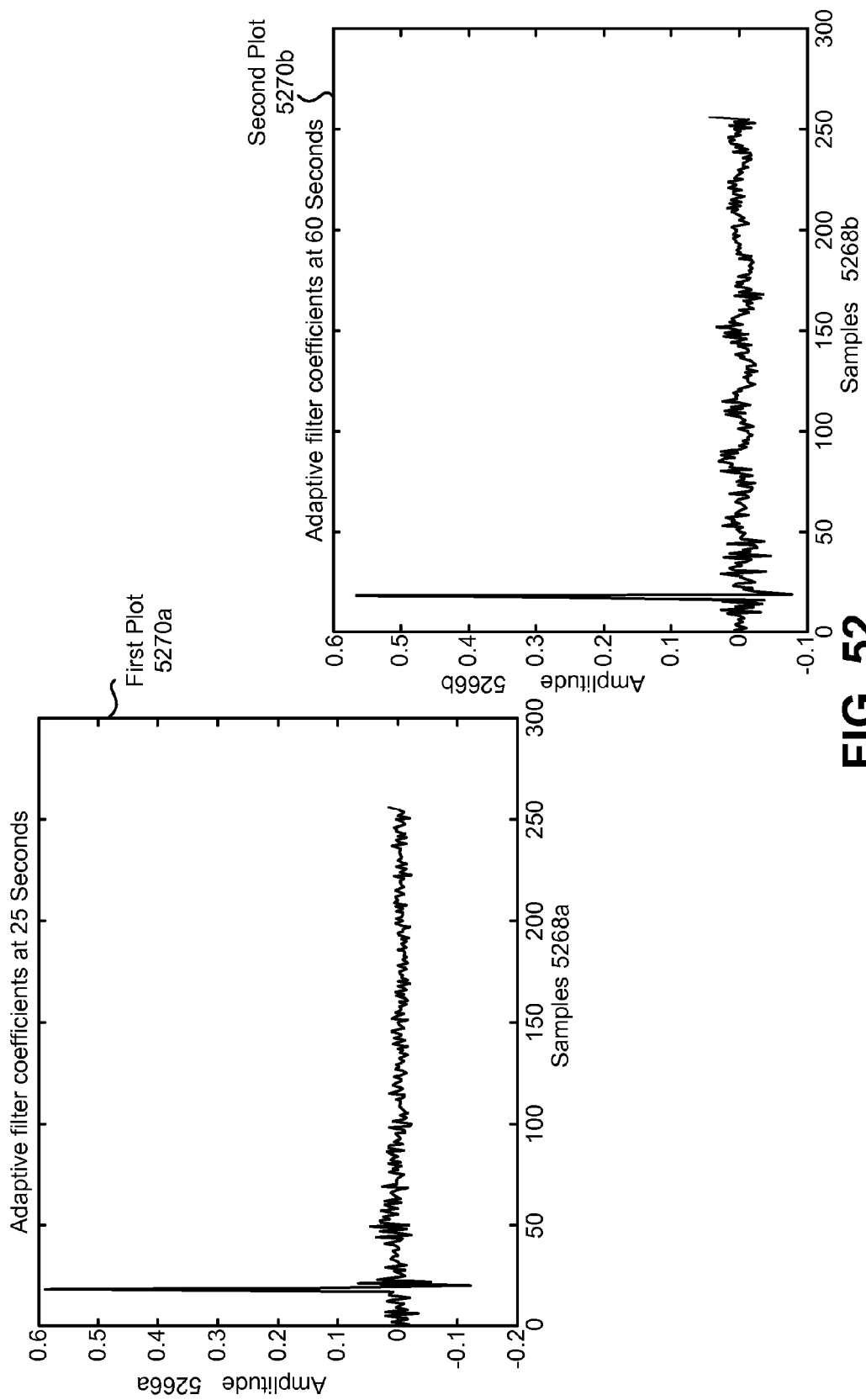
FIG. 52 includes plots that illustrate more examples of filter coefficients at different time instances for an actual 5.1 system.

FIG. 52 includes plots 5270a-b that illustrate more examples of filter coefficients at different time instances for an actual 5.1 system. In this instance, however, calibration is done on a fourth microphone and the impulse is tracked for a third microphone. More specifically, the plots 5270a-b illustrate learned mono far-end adaptive filter coefficients for a 5.1 system at different time instances based on actual recordings. In particular, the first plot 5270a illustrates filter coefficients after 25 seconds and the second plot 5270b illustrates the filter coefficients at 60 seconds. The plots 5270a-b are shown in amplitude 5266a-b in dB in the vertical axes and in seconds 5268a-b on the horizontal axes.

Figure 53:
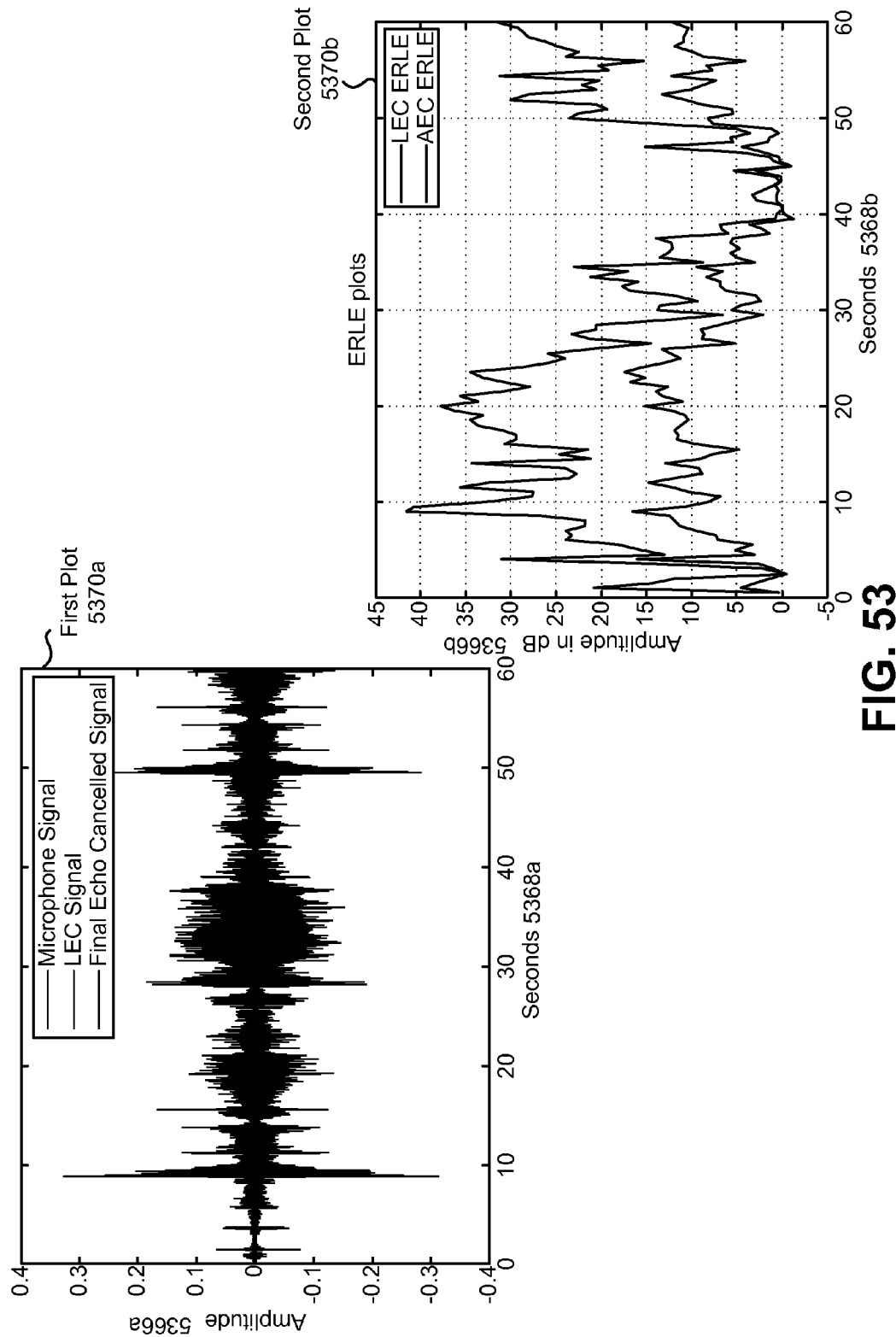
FIG. 53 includes plots that illustrate more examples of an echo cancelled signal based on recordings of a 5.1 system.

FIG. 53 includes plots 5370a-b that illustrate more examples of an echo cancelled signal based on recordings of a 5.1 system. In this instance, however, calibration is done on a fourth microphone and echo cancellation is run on a second microphone. As described above, applying a calibration from one microphone to a filter corresponding to another microphone may include sharing coefficients (e.g., acoustic paths) and may be beneficial as it may reduce the processing complexity and time in one or more of calibration and/or runtime.

This illustrates a configuration of the systems and methods disclosed herein, where calibration that is performed on one microphone may be applied to one or more different microphones. In particular, the first plot 5370a illustrates a microphone signal, a linear echo cancelled signal and a final echo cancelled signal. The second plot 5370b illustrates corresponding ERLE plots. The first plot 5370a is shown in amplitude 5366a on the vertical axis and in seconds 5368a on the horizontal axis. The second plot 5370b is shown in amplitude 5366b in dB in the vertical axis and in seconds 5368b on the horizontal axis.

Figure 54:
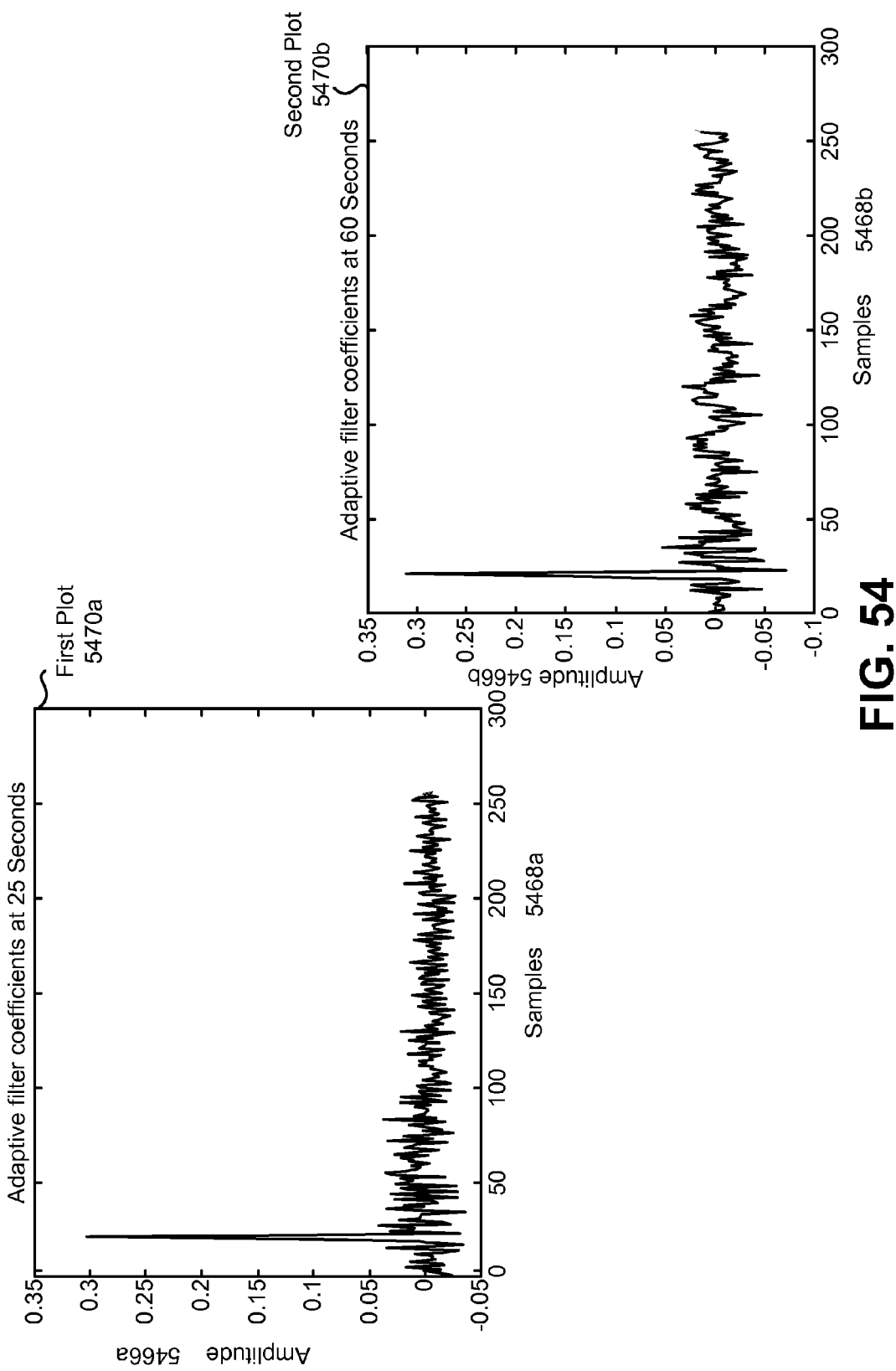
FIG. 54 includes plots that illustrate more examples of filter coefficients at different time instances for an actual 5.1 system.

FIG. 54 includes plots 5470a-b that illustrate more examples of filter coefficients at different time instances for an actual 5.1 system. In this instance, however, calibration is done on a fourth microphone and the impulse is tracked for a second microphone. More specifically, the plots 5740a-b illustrate learned mono far-end adaptive filter coefficients at different time instances based on actual recordings. In particular, the first plot 5470a illustrates filter coefficients after 25 seconds and the second plot 5470b illustrates the filter coefficients at 60 seconds. The plots 5470a-b are shown in amplitude 5466a-b in dB in the vertical axes and in seconds 5468a-b on the horizontal axes.

Figure 55:
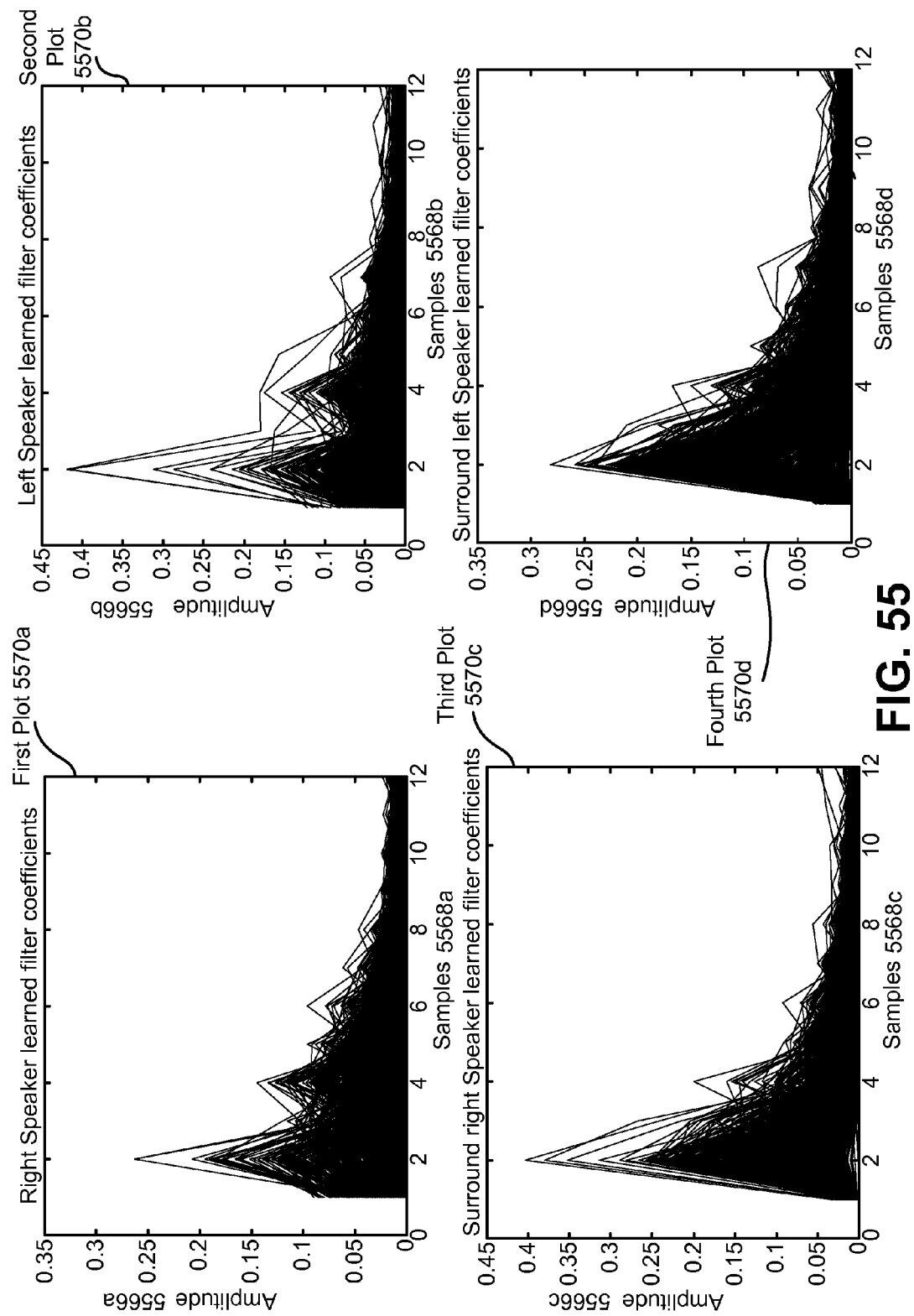
FIG. 55 includes plots that illustrate another example of several acoustic paths.

FIG. 55 includes plots 5570a-d that illustrate another example of several acoustic paths. In this example, a four-speaker system is used. In particular, four surround sound speakers are excited: right 3605, left 3604, surround right 3607 and surround left 3606. The plots 5570a-b illustrate learned acoustic paths or filter coefficients corresponding to the speakers. For example, a first plot 5570a illustrates learned acoustic paths or filter coefficients corresponding to a right speaker 3605, a second plot 5570b illustrates learned acoustic paths or filter coefficients corresponding to a left speaker 3604, a third plot 5570c illustrates learned acoustic paths or filter coefficients corresponding to a surround right speaker 3607 a fourth plot 5570d illustrates learned acoustic paths or filter coefficients corresponding to a surround left speaker 3606. The plots 5570a-d are illustrated in amplitude 5566a-d on the vertical axes and samples 5568a-d on the horizontal axes. In this instance, the coefficients are established in order to illustrate the effect of path changes. Specifically, FIGS. 55-59 are used to illustrate the effect of path changes (e.g., results for path changes) on the systems and methods disclosed herein. In particular, after double-talk, every loudspeaker is sequentially covered by walking around within the circumference of the surround speakers and blocking each.

Figure 56:
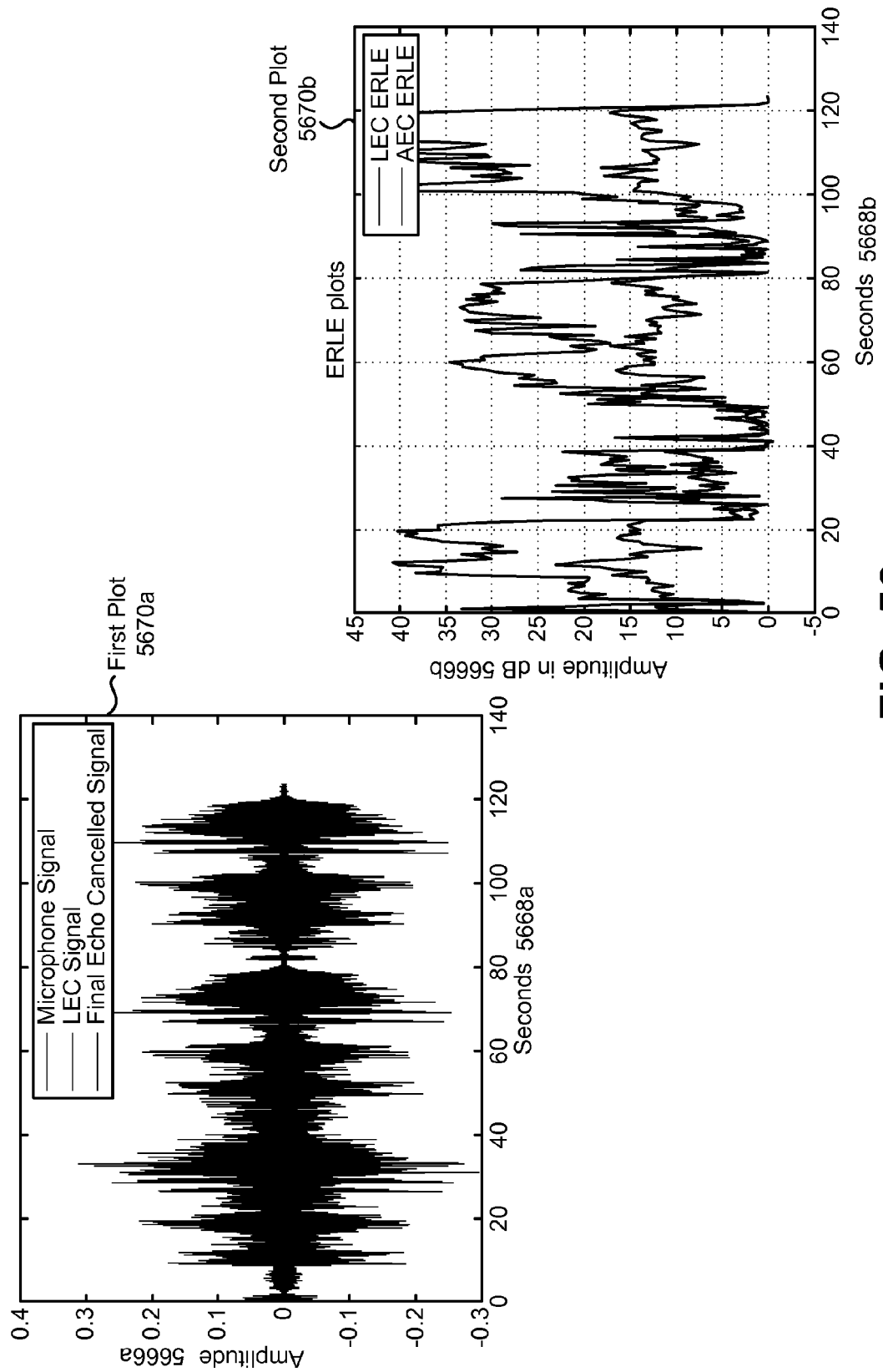
FIG. 56 includes plots that illustrate examples of echo cancellation performance with path changes.

FIG. 56 includes plots 5670a-b that illustrate examples of echo cancellation performance with path changes. As illustrated by the plots 5670a-b, the systems and methods disclosed herein perform well even with path changes. The first plot 5670a illustrates a microphone signal, a linear echo cancelled signal and a final echo cancelled signal. The second plot 5670b illustrates corresponding ERLE plots. The first plot 5670a is shown in amplitude 5666a on the vertical axis and in seconds 5668a on the horizontal axis. The second plot 5670b is shown in amplitude 5666b in dB in the vertical axis and in seconds 5668b on the horizontal axis.

Figure 57:
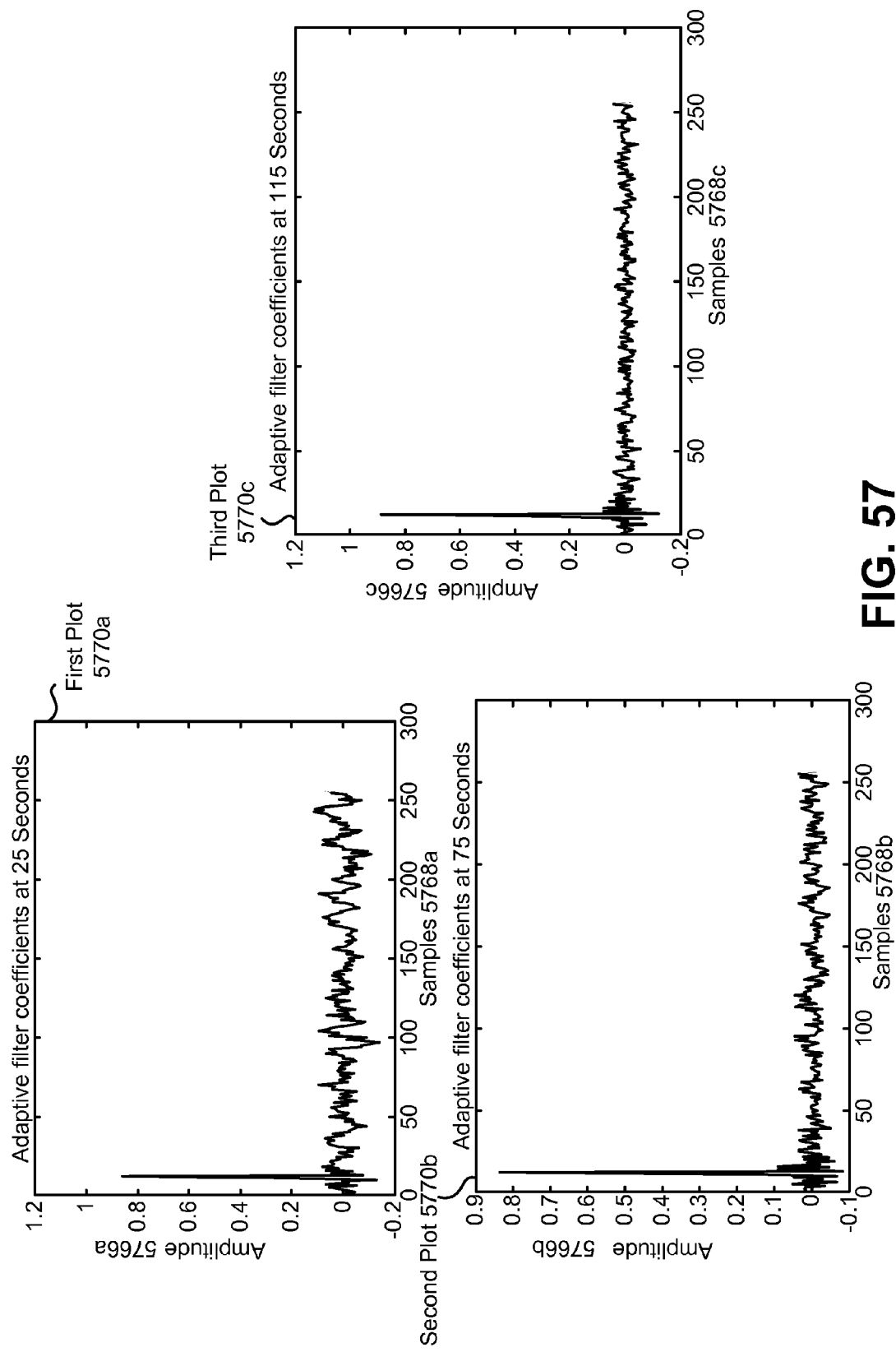
FIG. 57 includes plots that illustrate examples of filter coefficients at different time instances.

FIG. 57 includes plots 5770a-c that illustrate examples of filter coefficients at different time instances. More specifically, the plots 5770a-c illustrate learned adaptive filter coefficients at different time instances with path changes. As illustrated by the plots 5770a-c, the surround echo cancellation systems and methods disclosed herein perform well, even with path changes. In particular, the first plot 5770a illustrates adaptive filter coefficients after 25 seconds, the second plot 5770b illustrates the adaptive filter coefficients after 75 seconds and the third 5770c illustrates the filter coefficients at 115 seconds. The plots 5770a-c are illustrated in amplitude 5766a-c on the vertical axes and samples 5768a-c on the horizontal axes.

Figure 58:
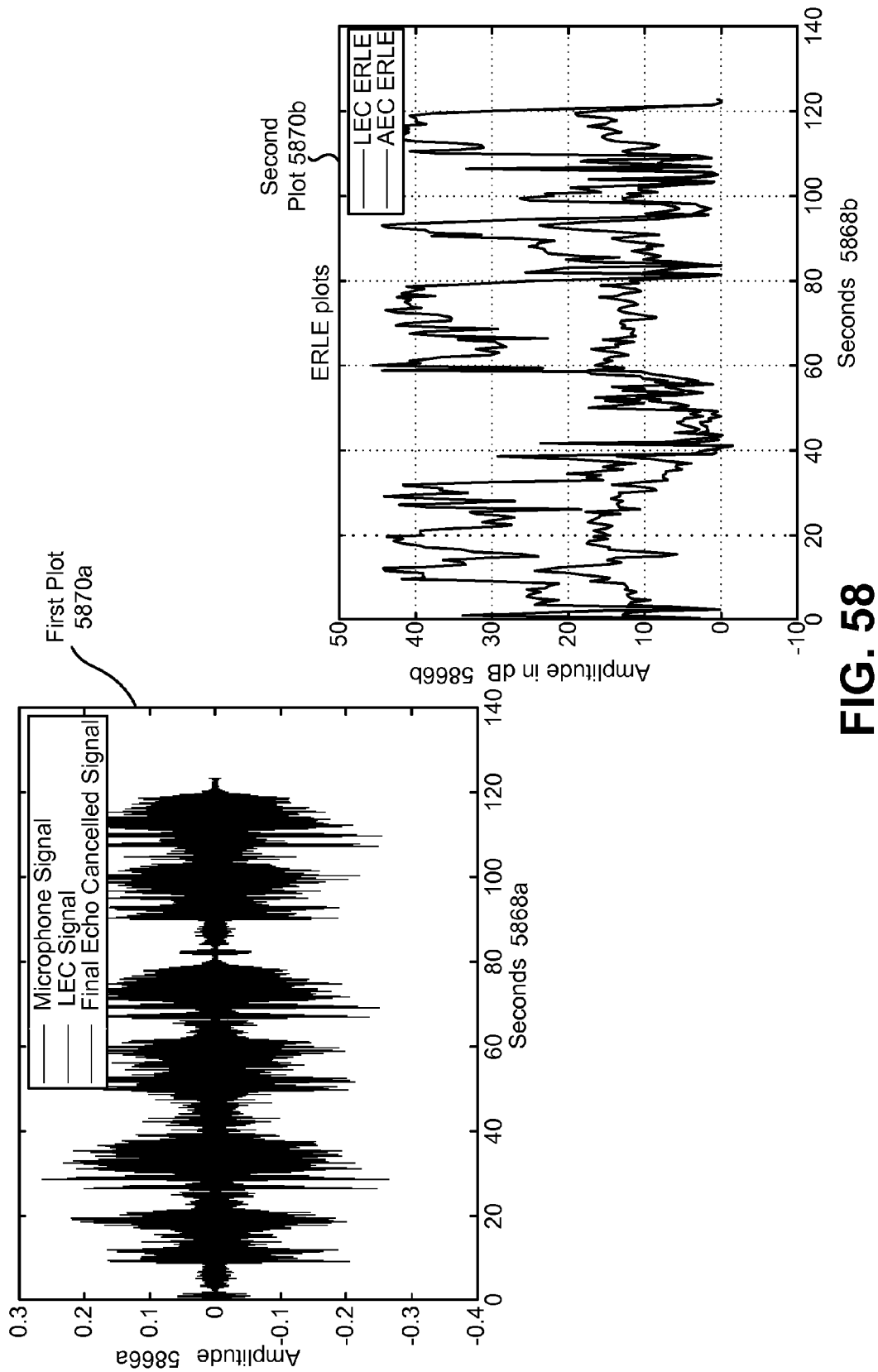
FIG. 58 includes plots that illustrate additional examples of echo cancellation performance with path changes.

FIG. 58 includes plots 5870a-b that illustrate additional examples of echo cancellation performance with path changes. In particular, FIG. 58 illustrates results from another data set. As illustrated by the plots 5870a-b, the systems and methods disclosed herein perform well even with path changes. The first plot 5870a illustrates a microphone signal, a linear echo cancelled signal and a final echo cancelled signal. The second plot 5870b illustrates corresponding ERLE plots. The first plot 5870a is shown in amplitude 5866a on the vertical axis and in seconds 5868a on the horizontal axis. The second plot 5870b is shown in amplitude 5866b in dB in the vertical axis and in seconds 5868b on the horizontal axis.

Figure 59:
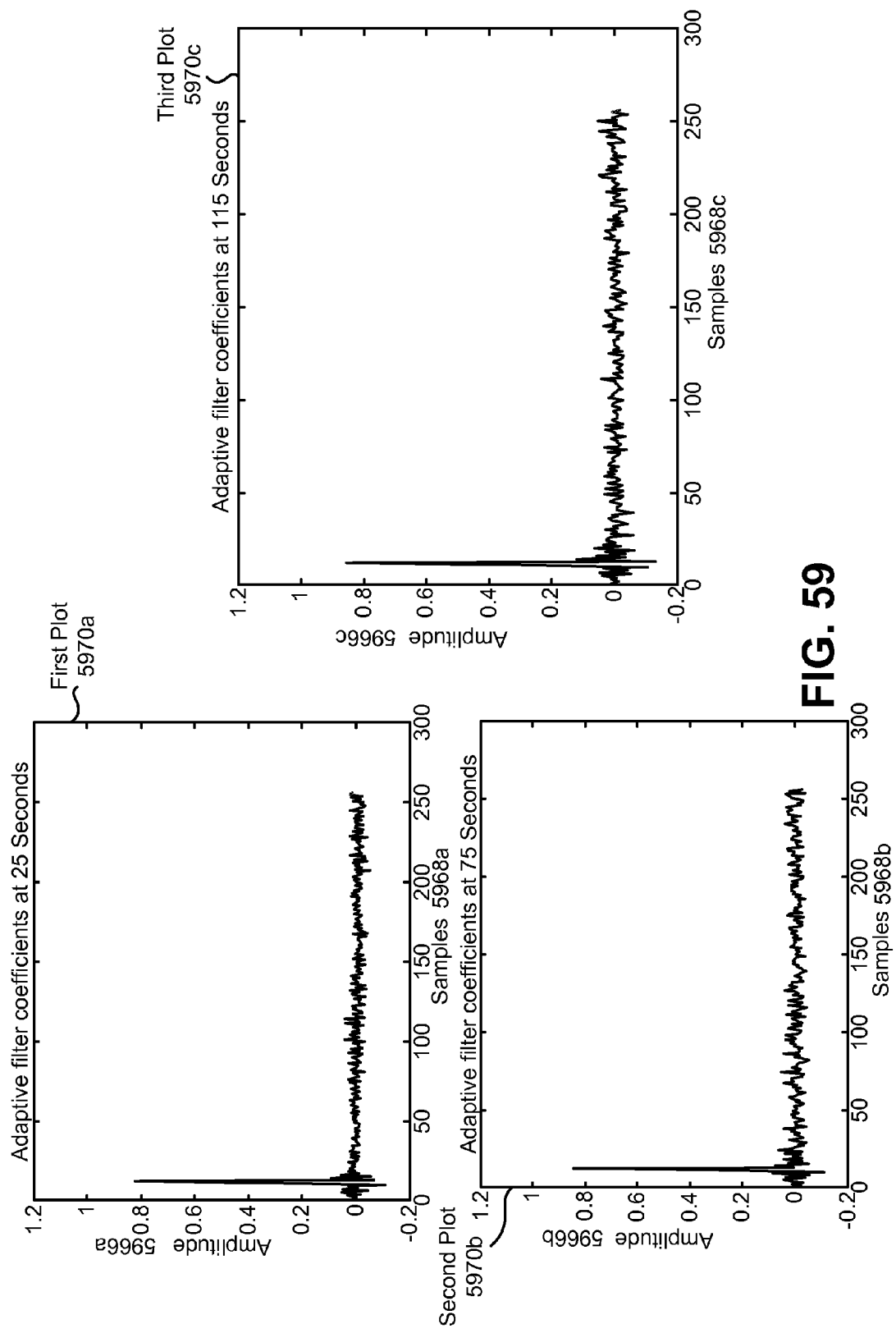
FIG. 59 includes plots that illustrate additional examples of filter coefficients at different time instances.

FIG. 59 includes plots 5970a-c that illustrate additional examples of filter coefficients at different time instances. More specifically, the plots 5970a-c illustrate learned adaptive filter coefficients at different time instances with path changes for another data set. As illustrated by the plots 5970a-c, the surround echo cancellation systems and methods disclosed herein perform well, even with path changes. In particular, the first plot 5970a illustrates adaptive filter coefficients after 25 seconds, the second plot 5970b illustrates the adaptive filter coefficients after 75 seconds and the third plot 5970c illustrates the filter coefficients at 115 seconds. The plots 5970a-c are illustrated in amplitude 5966a-c on the vertical axes and samples 5968a-c on the horizontal axes.

Figure 60:
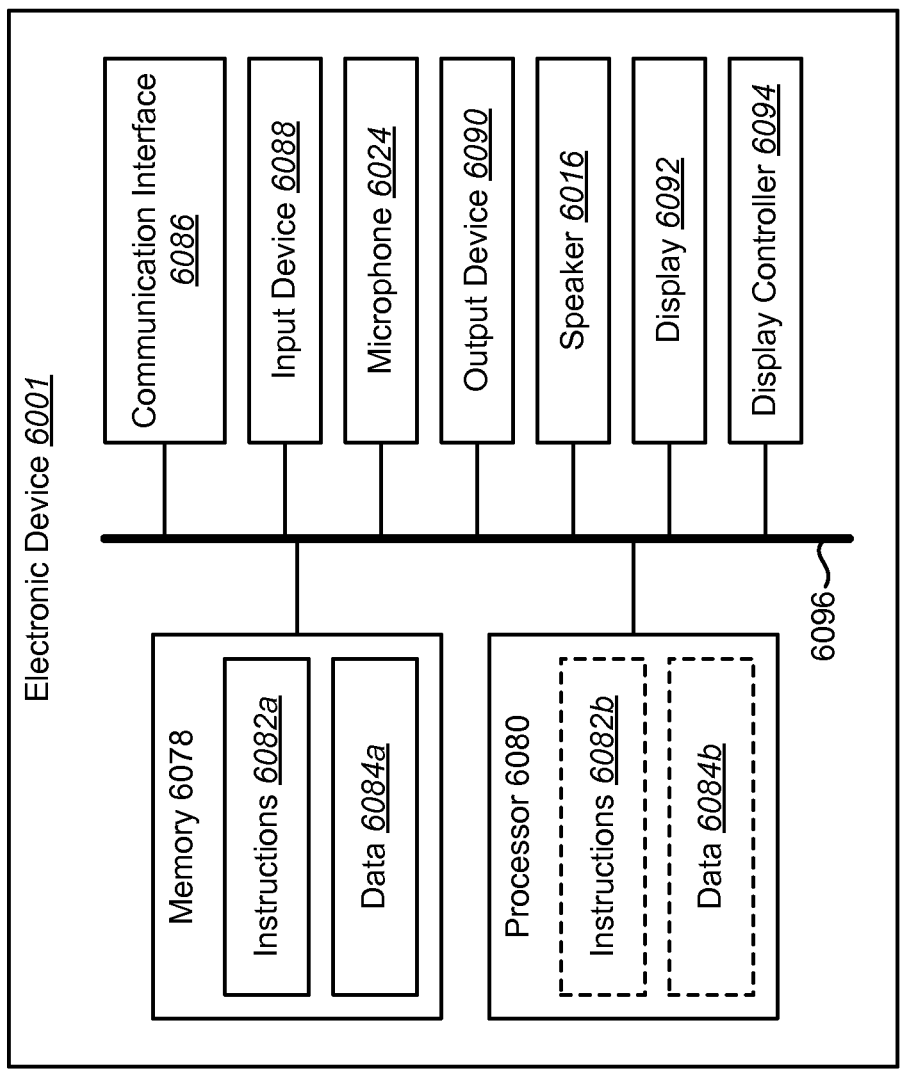
FIG. 60 illustrates various components that may be utilized in an electronic device.

FIG. 60 illustrates various components that may be utilized in an electronic device 6001. The illustrated components may be located within the same physical structure or in separate housings or structures. The electronic device 6001 described in connection with FIG. 60 may be implemented in accordance with one or more of the electronic devices and audio processing device described herein. The electronic device 6001 includes a processor 6080. The processor 6080 may be a general purpose single- or multi-chip microprocessor (e.g., an ARM), a special purpose microprocessor (e.g., a digital signal processor (DSP)), a microcontroller, a programmable gate array, etc. The processor 6080 may be referred to as a central processing unit (CPU). Although just a single processor 6080 is shown in the electronic device 6001 of FIG. 60, in an alternative configuration, a combination of processors (e.g., an ARM and DSP) could be used.

The electronic device 6001 also includes memory 6078 in electronic communication with the processor 6080. That is, the processor 6080 can read information from and/or write information to the memory 6078. The memory 6078 may be any electronic component capable of storing electronic information. The memory 6078 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 6084a and instructions 6082a may be stored in the memory 6078. The instructions 6082a may include one or more programs, routines, sub-routines, functions, procedures, etc. The instructions 6082a may include a single computer-readable statement or many computer-readable statements. The instructions 6082a may be executable by the processor 6080 to implement one or more of the methods, functions and procedures described above. Executing the instructions 6082a may involve the use of the data 6084a that is stored in the memory 6078. FIG. 60 shows some instructions 6082b and data 6084b being loaded into the processor 6080 (which may come from instructions 6082a and data 6084a).

The electronic device 6001 may also include one or more communication interfaces 6086 for communicating with other electronic devices. The communication interfaces 6086 may be based on wired communication technology, wireless communication technology, or both. Examples of different types of communication interfaces 6086 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The electronic device 6001 may also include one or more input devices 6088 and one or more output devices 6090. Examples of different kinds of input devices 6088 include a keyboard, mouse, microphone, remote control device, button, joystick, trackball, touchpad, lightpen, etc. For instance, the electronic device 6001 may include two or more microphones 6024 for capturing acoustic signals. In one configuration, a microphone 6024 may be a transducer that converts acoustic signals (e.g., voice, speech) into electrical or electronic signals. Examples of different kinds of output devices 6090 include a speaker, printer, etc. For instance, the electronic device 6001 may include one or more speakers 6016. In one configuration, a speaker 6016 may be a transducer that converts electrical or electronic signals into acoustic signals. One specific type of output device which may be typically included in an electronic device 6001 is a display device 6092. Display devices 6092 used with configurations disclosed herein may utilize any suitable image projection technology, such as a cathode ray tube (CRT), liquid crystal display (LCD), light-emitting diode (LED), gas plasma, electroluminescence, or the like. A display controller 6094 may also be provided, for converting data stored in the memory 6078 into text, graphics, and/or moving images (as appropriate) shown on the display device 6092.

The various components of the electronic device 6001 may be coupled together by one or more buses, which may include a power bus, a control signal bus, a status signal bus, a data bus, etc. For simplicity, the various buses are illustrated in FIG. 60 as a bus system 6096. It should be noted that FIG. 60 illustrates only one possible configuration of an electronic device 6001. Various other architectures and components may be utilized.

In accordance with the systems and methods disclosed herein, a circuit, in an electronic device, may be adapted to null at least one speaker. The same circuit, a different circuit or a second section of the same or different circuit may be adapted to mix a set of runtime audio signals based on a set of acoustic paths to determine a reference signal. In addition, the same circuit, a different circuit or a third section of the same or different circuit may be adapted to receive at least one composite audio signal that is based on the set of runtime audio signals. In addition, the same circuit, a different circuit or a fourth section of the same or different circuit may be adapted to reduce echo in the at least one composite audio signal based on the reference signal.

In accordance with the systems and methods disclosed herein, a circuit, in an electronic device, may be adapted to perform calibration for surround sound echo cancellation. The same circuit, a different circuit or a second section of the same or different circuit may be adapted to determine an inter-loudspeaker delay based on the calibration. The same circuit, a different circuit or a third section of the same circuit or different circuit may be adapted to null at least one speaker based on the inter-loudspeaker delay.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

It should be noted that one or more of the features, functions, procedures, components, elements, structures, etc., described in connection with any one of the configurations described herein may be combined with one or more of the functions, procedures, components, elements, structures, etc., described in connection with any of the other configurations described herein, where compatible. In other words, any compatible combination of the functions, procedures, components, elements, etc., described herein may be implemented in accordance with the systems and methods disclosed herein.

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for echo reduction by an electronic device, comprising:
    mixing a set of runtime audio signals based on a set of acoustic paths to determine a reference signal, wherein mixing the set of runtime audio signals comprises applying one of the set of acoustic paths between a first speaker and a first microphone to a second microphone;
    receiving at least one composite audio signal that is based on the set of runtime audio signals;
    nulling in a direction that is in an acoustic path between a microphone array and at least one speaker based on the at least one composite audio signal; and
    reducing echo in the at least one composite audio signal based on the reference signal.

2. The method of claim 1, further comprising:
    outputting a set of output calibration audio signals;
    receiving a set of input calibration audio signals based on the set of output calibration audio signals; and
    determining the set of acoustic paths based on the set of input calibration audio signals.

3. The method of claim 2, wherein each of the set of output calibration audio signals is output individually in an output sequence, and wherein each of the set of input calibration audio signals is received individually in an input sequence.

4. The method of claim 1, wherein the at least one composite audio signal is received by two or more microphones in a wireless communication device, and wherein mixing the set of runtime audio signals and reducing the echo is performed by an audio processing device.

5. The method of claim 1, further comprising applying a first acoustic path to multiple runtime audio signals.

6. The method of claim 1, wherein the at least one composite audio signal is received by two or more microphones in a wireless communication device, wherein a mixed-down source per each microphone is communicated, and wherein enhanced speech with echo cancellation/noise suppression is communicated.

7. The method of claim 1, further comprising determining coefficients for a set of filters that filter speaker audio signals.

8. The method of claim 7, wherein at least two filters share coefficients.

9. The method of claim 7, wherein coefficients from a first filter are utilized as coefficients for a second filter.

10. The method of claim 7, wherein at least one filter is configured to only change an amplitude and delay of an input signal.

11. The method of claim 7, wherein at least one filter is based on an impulse response.

12. The method of claim 1, further comprising determining whether to recalibrate based on an adaptive filter.

13. An electronic device for echo reduction, comprising:
mixing circuitry configured to mix a set of runtime audio signals based on a set of acoustic paths to determine a reference signal, wherein the mixing circuitry is configured to apply one of the set of acoustic paths between a first speaker and a first microphone to a second microphone;
two or more microphones configured to receive at least one composite audio signal that is based on the set of runtime audio signals;
beamformer circuitry configured to null in a direction that is in an acoustic path between a microphone array and at least one speaker based on the at least one composite audio signal; and
echo reduction circuitry configured to reduce echo in the at least one composite audio signal based on the reference signal.

14. The electronic device of claim 13, further comprising:
speakers configured to output a set of output calibration audio signals, wherein the two or more microphones are configured to receive a set of input calibration audio signals based on the set of output calibration audio signals; and
acoustic path determination circuitry configured to determine the set of acoustic paths based on the set of input calibration audio signals.

15. The electronic device of claim 14, wherein the speakers are configured to output each of the set of output calibration audio signals individually in an output sequence, and wherein the two or more microphones are configured to receive each of the set of input calibration audio signals individually in an input sequence.

16. The electronic device of claim 13, comprising an audio processing device, wherein the audio processing device is configured to mix the set of runtime audio signals and to reduce the echo.

17. The electronic device of claim 13, further comprising acoustic path application circuitry configured to apply a first acoustic path to multiple runtime audio signals.

18. The electronic device of claim 13, wherein the electronic device is configured to communicate a mixed-down source per each microphone and to communicate enhanced speech with echo cancellation/noise suppression.

19. The electronic device of claim 13, further comprising acoustic path determination circuitry configured to determine coefficients for a set of filters that filter speaker audio signals.

20. The electronic device of claim 19, wherein at least two filters are configured to share coefficients.

21. The electronic device of claim 19, wherein a second filter is configured to utilize coefficients from a first filter.

22. The electronic device of claim 19, wherein at least one filter is configured to only change an amplitude and delay of an input signal.

23. The electronic device of claim 19, wherein at least one filter is based on an impulse response.

24. The electronic device of claim 13, further comprising recalibration circuitry configured to determine whether to recalibrate based on an adaptive filter.

25. An apparatus for echo reduction, comprising:
means for mixing a set of runtime audio signals based on a set of acoustic paths to determine a reference signal, wherein the means for mixing the set of runtime audio signals comprises means for applying one of the set of acoustic paths between a first speaker and a first microphone to a second microphone;
means for receiving at least one composite audio signal that is based on the set of runtime audio signals;
means for nulling in a direction that is in an acoustic path between a microphone array and at least one speaker based on the at least one composite audio signal; and
means for reducing echo in the at least one composite audio signal based on the reference signal.

26. The apparatus of claim 25, further comprising:
means for outputting a set of output calibration audio signals;
means for receiving a set of input calibration audio signals based on the set of output calibration audio signals; and
means for determining the set of acoustic paths based on the set of input calibration audio signals.

27. The apparatus of claim 26, wherein each of the set of output calibration audio signals is output individually in an output sequence, and wherein each of the set of input calibration audio signals is received individually in an input sequence.

28. The apparatus of claim 25, wherein the means for mixing the set of runtime audio signals and the means for reducing the echo are included in an audio processing device.

29. The apparatus of claim 25, further comprising means for applying a first acoustic path to multiple runtime audio signals.

30. The apparatus of claim 25, wherein a mixed-down source per each microphone is communicated, and wherein enhanced speech with echo cancellation/noise suppression is communicated.

31. The apparatus of claim 25, further comprising means for determining coefficients for a set of filters that filter speaker audio signals.

32. The apparatus of claim 31, wherein at least two filters share coefficients.

33. The apparatus of claim 31, wherein coefficients from a first filter are utilized as coefficients for a second filter.

34. The apparatus of claim 31, wherein at least one filter is configured to only change the amplitude and delay of an input signal.

35. The apparatus of claim 31, wherein at least one filter is based on an impulse response.

36. The apparatus of claim 25, further comprising means for determining whether to recalibrate based on an adaptive filter.

37. A computer-program product for echo reduction, comprising a non-transitory tangible computer-readable medium having instructions thereon, the instructions comprising:
   code for causing an electronic device to mix a set of runtime audio signals based on a set of acoustic paths to determine a reference signal, wherein the code for causing the electronic device to mix the set of runtime audio signals comprises code for causing the electronic device to apply one of the set of acoustic paths between a first speaker and a first microphone to a second microphone;
   code for causing the electronic device to receive at least one composite audio signal that is based on the set of runtime audio signals;
   code for causing the electronic device to null in a direction that is in an acoustic path between a microphone array and at least one speaker based on the at least one composite audio signal; and
   code for causing the electronic device to reduce echo in the at least one composite audio signal based on the reference signal.

38. The computer-program product of claim 37, further comprising:
   code for causing the electronic device to output a set of output calibration audio signals;
   code for causing the electronic device to receive a set of input calibration audio signals based on the set of output calibration audio signals; and
   code for causing the electronic device to determine the set of acoustic paths based on the set of input calibration audio signals.

39. The computer-program product of claim 38, wherein each of the set of output calibration audio signals is output individually in an output sequence, and wherein each of the set of input calibration audio signals is received individually in an input sequence.

40. The computer-program product of claim 37, wherein the code for causing the electronic device to mix the set of runtime audio signals and the code for causing the electronic device to reduce the echo are included in an audio processing device.

41. The computer-program product of claim 37, further comprising code for causing the electronic device to apply a first acoustic path to multiple runtime audio signals.

42. The computer-program product of claim 37, wherein a mixed-down source per each microphone is communicated, and wherein enhanced speech with echo cancellation/noise suppression is communicated.

43. The computer-program product of claim 37, further comprising code for causing the electronic device to determine coefficients for a set of filters that filter speaker audio signals.

44. The computer-program product of claim 43, wherein at least two filters share coefficients.

45. The computer-program product of claim 43, wherein coefficients from a first filter are utilized as coefficients for a second filter.

46. The computer-program product of claim 43, wherein at least one filter is configured to only change an amplitude and delay of an input signal.

47. The computer-program product of claim 43, wherein at least one filter is based on an impulse response.

48. The computer-program product of claim 37, wherein the instructions further comprise code for causing the electronic device to determine whether to recalibrate based on an adaptive filter.

49. A method for determining a delay by an electronic device, comprising:
   performing calibration by running an adaptive filter for surround sound echo reduction;
   determining a delay based on an acoustic path between a microphone array and at least one speaker and based on identifying a tap number location of the adaptive filter where there is a maximum amplitude value; and
   nulling the at least one speaker based on the delay, wherein the nulling is in a direction that is in the acoustic path between the microphone array and the at least one speaker.

50. The method of claim 49, wherein nulling the at least one speaker is further based on an inter-loudspeaker delay, wherein the inter-loudspeaker delay is a difference between a time of arrival of a speaker audio signal and a time of arrival of a reference speaker audio signal.

51. The method of claim 50, wherein the reference speaker audio signal corresponds to a speaker with a shortest delay.

52. The method of claim 50, further comprising mixing at least two signals based on the inter-loudspeaker delay.

53. An electronic device for determining a delay, comprising:
   calibration circuitry configured to perform calibration by running an adaptive filter for surround sound echo reduction and to determine a delay based on an acoustic path between a microphone array and at least one speaker and based on identifying a tap number location of the adaptive filter where there is a maximum amplitude value; and
   beamforming circuitry configured to null the at least one speaker based on the delay, wherein the nulling is in a direction that is in the acoustic path between the microphone array and the at least one speaker.

54. The electronic device of claim 53, wherein the beamforming circuitry is configured to null the at least one speaker further based on an inter-loudspeaker delay, wherein the inter-loudspeaker delay is a difference between a time of arrival of a speaker audio signal and a time of arrival of a reference speaker audio signal.

55. The electronic device of claim 54, wherein the reference speaker audio signal corresponds to a speaker with a shortest delay.

56. The electronic device of claim 54, further comprising mixing circuitry configured to mix at least two signals based on the inter-loudspeaker delay.

57. An apparatus for determining a delay, comprising:
   means for performing calibration by running an adaptive filter for surround sound echo reduction;
   means for determining a delay based on an acoustic path between a microphone array and at least one speaker and based on identifying a tap number location of the adaptive filter where there is a maximum amplitude value; and
   means for nulling at least one speaker based on the delay, wherein the nulling is in a direction that is in the acoustic path between the microphone array and the at least one speaker.

58. The apparatus of claim 57, wherein nulling the at least one speaker is further based on an inter-loudspeaker delay, wherein the inter-loudspeaker delay is a difference between a time of arrival of a speaker audio signal and a time of arrival of a reference speaker audio signal.

59. The apparatus of claim 58, wherein the reference speaker audio signal corresponds to a speaker with a shortest delay.

60. The apparatus of claim 58, further comprising means for mixing at least two signals based on the inter-loudspeaker delay.

61. A computer-program product for determining a delay, comprising a non-transitory tangible computer-readable medium having instructions thereon, the instructions comprising:
   code for causing an electronic device to perform calibration by running an adaptive filter for surround sound echo reduction;
   code for causing the electronic device to determine a delay based on an acoustic path between a microphone array and at least one speaker and based on identifying a tap number location of the adaptive filter where there is a maximum amplitude value; and
   code for causing the electronic device to null the at least one speaker based on the delay, wherein the nulling is in a direction that is in the acoustic path between the microphone array and the at least one speaker.

62. The computer-program product of claim 61, wherein nulling the at least one speaker is further based on an inter-loudspeaker delay, wherein the inter-loudspeaker delay is a difference between a time of arrival of a speaker audio signal and a time of arrival of a reference speaker audio signal.

63. The computer-program product of claim 62, wherein the reference speaker audio signal corresponds to a speaker with a shortest delay.

64. The computer-program product of claim 62, further comprising code for causing the electronic device to mix at least two signals based on the inter-loudspeaker delay.

* * * * *